(12) United States Patent
Yun

(10) Patent No.: US 10,534,442 B2
(45) Date of Patent: *Jan. 14, 2020

(54) METHOD AND WEARABLE DEVICE FOR PROVIDING A VIRTUAL INPUT INTERFACE

(71) Applicant: SAMSUNG ELECTRONICS CO., LTD., Suwon-si (KR)

(72) Inventor: In-kuk Yun, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/237,055

(22) Filed: Dec. 31, 2018

(65) Prior Publication Data

US 2019/0138108 A1 May 9, 2019

Related U.S. Application Data

(63) Continuation of application No. 15/782,505, filed on Oct. 12, 2017, now Pat. No. 10,168,792, which is a (Continued)

(30) Foreign Application Priority Data

Mar. 21, 2014 (KR) .......... 10-2014-0033705
Jul. 31, 2014 (KR) .......... 10-2014-0098653
Dec. 12, 2014 (KR) .......... 10-2014-0179354

(51) Int. Cl.
*G06F 3/01* (2006.01)
*G02B 27/01* (2006.01)
(Continued)

(52) U.S. Cl.
CPC ......... *G06F 3/017* (2013.01); *G02B 27/0172* (2013.01); *G06F 1/1626* (2013.01); (Continued)

(58) Field of Classification Search
CPC ...... G06F 1/1626; G06F 3/017; G06F 3/0426; G06F 3/011
See application file for complete search history.

(56) References Cited

U.S. PATENT DOCUMENTS 6,611,252 B1  8/2003 DuFaux
6,771,294 B1  8/2004 Pulli et al.
(Continued)

FOREIGN PATENT DOCUMENTS

CN  103019377 A  4/2013
JP  2002-318652 A  10/2002
(Continued)

OTHER PUBLICATIONS

Communication dated Sep. 28, 2016, issued by the European Patent Office in counterpart European Patent Application No. 15733329.5.
(Continued)

*Primary Examiner* — Ryan R Yang
(74) *Attorney, Agent, or Firm* — Sughrue Mion, PLLC

(57) ABSTRACT

Provided is a wearable device including: an image sensor configured to sense a gesture image of a user setting a user input region; and a display configured to provide a virtual input interface corresponding to the set user input region.

20 Claims, 40 Drawing Sheets

Related U.S. Application Data continuation of application No. 14/665,678, filed on Mar. 23, 2015, now Pat. No. 9,829,986.

(51) Int. Cl.
*G06F 1/16* (2006.01)
*G06F 3/03* (2006.01)
*G06F 3/042* (2006.01)

(52) U.S. Cl.
CPC ............ *G06F 3/011* (2013.01); *G06F 3/0304* (2013.01); *G06F 3/0426* (2013.01); *G02B 2027/0178* (2013.01)

(56) References Cited

U.S. PATENT DOCUMENTS

| 8,482,527 | B1 | 7/2013 | Kim |
| 9,195,322 | B2 | 11/2015 | Jeong |
| 2009/0077504 | A1 | 3/2009 | Bell et al. |
| 2009/0219251 | A1 | 9/2009 | Jung et al. |
| 2010/0103104 | A1 | 4/2010 | Son et al. |
| 2011/0214082 | A1 | 9/2011 | Osterhout et al. |
| 2013/0016070 | A1 | 1/2013 | Starner et al. |
| 2013/0141421 | A1 | 6/2013 | Mount et al. |
| 2013/0257748 | A1 | 10/2013 | Ambrus et al. |
| 2014/0006997 | A1 | 1/2014 | Kim et al. |
| 2014/0055343 | A1 | 2/2014 | Kim |
| 2014/0062965 | A1 | 3/2014 | Lee |
| 2014/0078176 | A1 | 3/2014 | Kim et al. |
| 2014/0085289 | A1 | 3/2014 | Liang et al. |
| 2014/0096084 | A1 | 4/2014 | Kwon et al. |
| 2015/0241958 | A1 | 8/2015 | Chang et al. |

FOREIGN PATENT DOCUMENTS

| KR | 10-2010-0047793 A | 5/2010 |
| WO | 2012/124844 A1 | 9/2012 |

OTHER PUBLICATIONS

Communication dated Nov. 28, 2017 by the State Intellectual Property Office of P.R. China in counterpart Chinese Patent Application No. 201580001071.6.

Communication dated May 28, 2015, issued by the International Search Authority in counterpart International application No. PCT/KR2015/002554.

| CONTENT | VIRTUAL INPUT INTERFACE |
|---|---|
| GAME CONTENT (2110) |  2115 |
| MUSIC CONTENT (2120) |  2125 |
| WEBPAGE (2130) |  2135 |
| ⋮ | ⋮ |

METHOD AND WEARABLE DEVICE FOR PROVIDING A VIRTUAL INPUT INTERFACE

RELATED APPLICATIONS

This application is a Continuation Application of U.S. application Ser. No. 15/782,505, filed Oct. 12, 2017, which is a Continuation application of U.S. application Ser. No. 14/665,678, filed Mar. 23, 2015, which claims priority from Korean Patent Application No. 10-2014-0033705, filed on Mar. 21, 2014, Korean Patent Application No. 10-2014-0098653, filed on Jul. 31, 2014, and Korean Patent Application No. 10-2014-0179354, filed on Dec. 12, 2014, in the Korean Intellectual Property Office, the disclosures of which are incorporated herein by reference in their entireties.

BACKGROUND

1. Field

One or more exemplary embodiments relate to a method and wearable device for providing a virtual input interface.

2. Description of Related Art

The real world is a space consisting of 3-dimensional (3D) coordinates. People are able to recognize 3D space by combining visual information obtained using two eyes. However, a photograph or a moving image captured by a general digital device is expressed in 2D coordinates, and thus does not include information about space. In order to give a feeling of space, 3D cameras or display products that capture and display 3D images by using two cameras have been introduced.

Meanwhile, a current input method of smart glasses is limited. A user basically controls the smart glasses by using a voice command. However, it is difficult for the user to control the smart glasses by using only a voice command if a text input is required. Thus, a wearable system that provides various input interaction methods is required.

SUMMARY

Methods and apparatuses consistent with exemplary embodiments include a method and wearable device for setting an input region in the air or on an actual object based on a user motion, and providing a virtual input interface in the set input region.

Additional aspects will be set forth in part in the description which follows and, in part, will be apparent from the description, or may be learned by practice of the presented exemplary embodiments.

According to one or more exemplary embodiments, a wearable device includes: an image sensor configured to sense a gesture image of a user setting a user input region; and a display configured to provide a virtual input interface corresponding to the user input region set by using the sensed gesture image.

The sensed gesture image may correspond to a figure drawn by the user, and the virtual input interface may be displayed to correspond to the sensed figure.

The virtual input interface may be displayed to correspond to a size of the user input region.

The virtual input interface may be determined based on a type of an application being executed by the glasses type wearable device.

The display may include a transparent display configured to provide the virtual input interface on a region of the transparent display corresponding to the user input region as observed through the transparent display.

The image sensor may be configured to capture a first image of the user input region, and the display may be configured to display a second image of the virtual input interface over the user input region of the first image.

The glasses type wearable device may further include: a depth sensor configured to sense a first depth value corresponding to a distance from the wearable device to the user input region, and a second depth value corresponding to a distance from the wearable device to an input tool; and a controller configured to determine whether an input is generated through the virtual input interface based on the first depth value and the second depth value.

The displayed size of the virtual input interface may be determined based the first depth value.

The controller may be configured to determine that an input is generated through the virtual input interface when a difference between the first and second depth values is less than a threshold value.

The controller may be configured to determine that an input is generated through the virtual input interface when the second depth value is greater than the first depth value.

According to one or more exemplary embodiments, a method of providing, by a wearable device, a virtual input interface, includes: obtaining a gesture image of a user for setting a user input region; and providing a virtual input interface corresponding to the user input region such that the virtual input interface corresponds to a size of the user input region.

The obtaining of the gesture image may include: obtaining the gesture image by recognizing a figure drawn by the user; and setting a region corresponding to the figure as the user input region.

The virtual input interface may be determined based on a size of the user input region.

The method may further include determining the virtual input interface based on a type of object where the user input region is set.

The method may further include determining the virtual input interface based on a type of an application being executed by the wearable device.

The virtual input interface may be provided on a transparent display such that the virtual input interface corresponds to the user input region as observed through the transparent display.

The providing of the virtual input interface may include: capturing a first image of the user input region by using an image sensor; generating a second image of the virtual input interface; and displaying the second image over the user input region of the first image.

The method may further include: obtaining a first depth value corresponding to a distance from the wearable device to the user input region, and a second depth value corresponding to a distance from the wearable device to an input tool; and determining whether an input is generated through the virtual input interface based on the first depth value and the second depth value.

A displayed size of the virtual input interface may be determined based on a size of the user input region.

The determining of whether the input is generated may include determining that a difference between the first and second depth values is less than a threshold value.

The determining of whether the input is generated may include determining the second depth value is greater than the first depth value.

According to one or more exemplary embodiments, a wearable input device includes: a sensor configured to sense a plurality of gestures and a real world image; a display configured to display a graphic user interface; and a controller configured to determine an input region of the real world image, control the display to display the graphic user interface on an area corresponding to the determined input region, and determine an input based on an input gesture of the plurality of gestures.

The wearable input device may include a communicator configured to receive a touch signal from an external device. The controller may be further configured to determine the input based on the touch signal.

The may be further determined based on an input region defining gesture of the plurality of gestures.

The sensor may be further configured to determine a distance between the wearable input device and the input region.

The controller may be further configured to continuously update a display region of the graphic user interface based on the real world image.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1A:
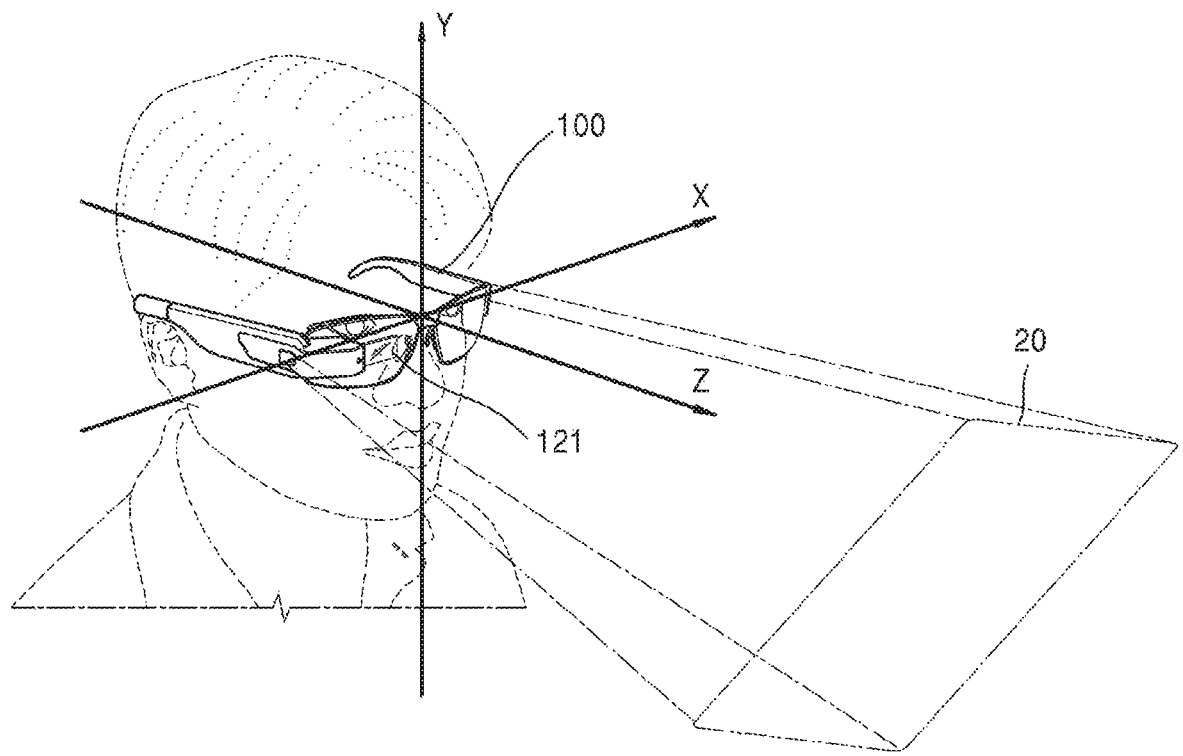
FIGS. 1A through 1E are diagrams describing a system for providing, by a wearable device, a virtual input interface, according to an exemplary embodiment.

Terms used in the present specification will be briefly described and one or more exemplary embodiments will be described in detail.

All terms including descriptive or technical terms which are used herein should be construed as having meanings that are obvious to one of ordinary skill in the art. However, the terms may have different meanings according to an intention of one of ordinary skill in the art, precedent cases, or the appearance of new technologies. Also, some terms may be arbitrarily selected by the applicant, and in this case, the meaning of the selected terms will be described in detail in the detailed description of the invention. Thus, the terms used herein have to be defined based on the meaning of the terms together with the description throughout the specification.

Also, when a part "includes" or "comprises" an element, unless there is a particular description contrary thereto, the part can further include other elements, not excluding the other elements. In the following description, terms such as "unit" and "module" indicate a unit for processing at least one function or operation, wherein the unit and the block may be embodied as hardware or software or embodied by combining hardware and software.

As used herein, the term "and/or" includes any and all combinations of one or more of the associated listed items. Expressions such as "at least one of," when preceding a list of elements, modify the entire list of elements and do not modify the individual elements of the list.

One or more exemplary embodiments will now be described more fully with reference to the accompanying drawings. However, the one or more exemplary embodiments may be embodied in many different forms, and should not be construed as being limited to the exemplary embodiments set forth herein; rather, these exemplary embodiments are provided so that this disclosure will be thorough and complete, and will fully convey the concept of the one or more exemplary embodiments to those of ordinary skill in the art. In the following description, well-known functions or constructions are not described in detail because they would obscure the one or more exemplary embodiments with unnecessary detail. Like reference numerals in the drawings denote like or similar elements throughout the specification.

FIGS. 1A through 1E are diagrams describing a system for providing, by a wearable device 100, a virtual input interface, according to an exemplary embodiment.

The wearable device 100, according to an exemplary embodiment, may include a head mounted display (HMD) that is mountable on a head portion. For example, the HMD may be glasses, a helmet, or a hat, but is not limited thereto. The first wearable device 100, according to an exemplary embodiment, may be a watch, a band, a ring, a necklace, a bracelet, a shoe, an earring, a headband, clothes, a glove, or a thimble.

The wearable device 100, according to an exemplary embodiment, may be one device or a combination of a plurality of devices. For example, the wearable device 100 may be glasses, or a combination of at least two devices, such as glasses and a ring, glasses and a watch, or glasses and a thimble.

The wearable device 100, according to an exemplary embodiment, may provide at least one virtual input interface. For example, the wearable device 100, according to an exemplary embodiment, may display a virtual input interface on an optical display 121, such that the virtual input interface matches the real world observed through the optical display 121.

A structure of the optical display 121 will now be described in detail with reference to FIG. 1B.

Figure 1B:
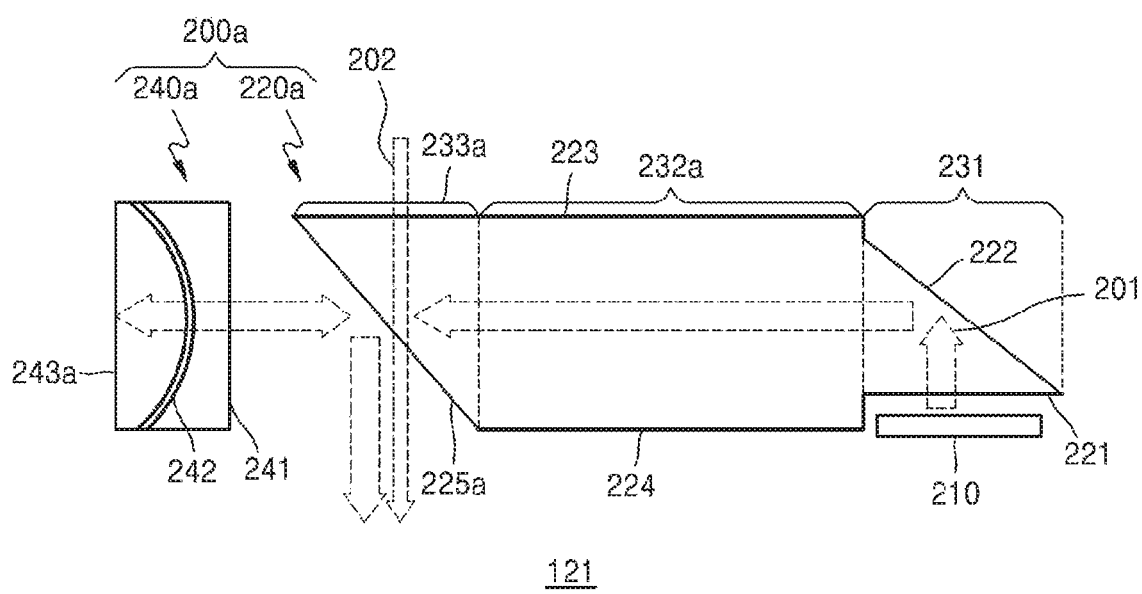

Referring to FIG. 1B, the optical display 121 may include a display device 210 and a light guide 200a. The light guide 200a may include a light guiding device 220a and a variable lens 240a. Also, the display device 210 may output a first light 201 forming an image to the light guiding device 220a. The display device 210 may have a quadrangular plate shape, and may display an image in a pixel unit according to data input from a controller. For example, the display device 210 may be a light-emitting diode (LED), an organic LED (OLED), a liquid crystal display (LCD), or a liquid crystal on silicon (LCOS).

The light guiding device 220a may include first through fifth surfaces 221 through 225a. The light guiding device 220a may guide the first light 201 input from the display device 210 towards the variable lens 240a via internal reflection or total internal reflection.

The first surface 221 corresponds to a part of a rear surface of the light guiding device 220a, which faces the display device 210, and may transmit the first light 201 input from the display device 210 towards the second surface 222. The second surface 222 corresponds to a first side surface of the light guiding device 220a between the first and third surfaces 221 and 223, and may reflect the first light 201 penetrated through the first surface 221 towards the third or fourth surface 223 or 224.

The third surface 223 corresponds to a front surface of the light guiding device 220a, the fourth surface 224 corresponds to a remaining part of the rear surface of the light guiding device 220a, and the third and fourth surfaces 223 and 224 each reflect or totally reflect the first light 201 such that the first light 201 reaches the fifth surface 225a. Here, total reflection means that the first light 201 incident on an interface (i.e., the third or fourth surface 223 or 224) of the light guiding device 220a and an external air layer from an inside of the light guiding device 220a is totally reflected without penetration at the interface.

The fifth surface 225a corresponds to a second side surface of the light guiding device 220a between the third and fourth surfaces 223 and 224, and may transmit the first light 201 towards the variable lens 240a and reflect the first light 201 incident from the variable lens 240a towards eyes of a user. The fifth surface 225a may transmit a second light 202 forming a front view of the first wearable device 100 towards the eyes of the user.

The light guiding device 220a may include a body portion 232a that is disposed between the third and fourth surfaces 223 and 224 and has a uniform thickness, a first slope portion 231 that is disposed between the first and second surfaces 221 and 222 and has a thickness gradually decreasing away from the body portion 232a, and a second slope portion 233a that is disposed between the third and fourth surfaces 223 and 224 and has a thickness gradually decreasing away from the body portion 232a. The second slope portion 233a may have the fifth surface 225a that is an inclined surface facing the variable lens 240a and the eyes of the user.

The variable lens 240a may include a penetration surface 241 through which the first light 201 penetrates, a refraction surface 242 that refracts the first light 201, and the reflection surface 243a that reflects the first light 201. A shape or curvature of the refraction surface 242 may change according to control of the controller. The variable lens 240a may adjust a virtual object distance from the eyes of the user to a virtual object by adjusting an angle (i.e., an incident angle) of the first light 201 incident on the eyes of the user according to a change of the shape or curvature of the refraction surface 242.

Figure 1C:
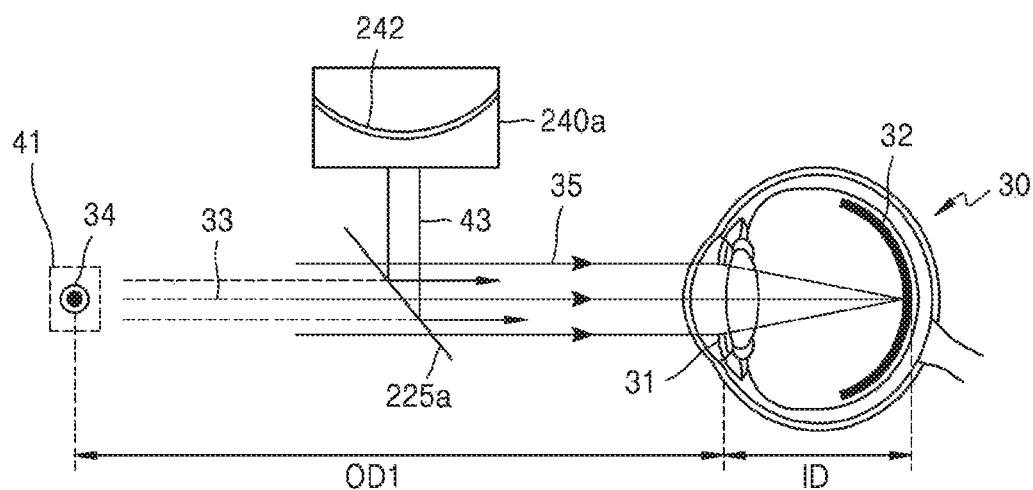
Figure 1D:
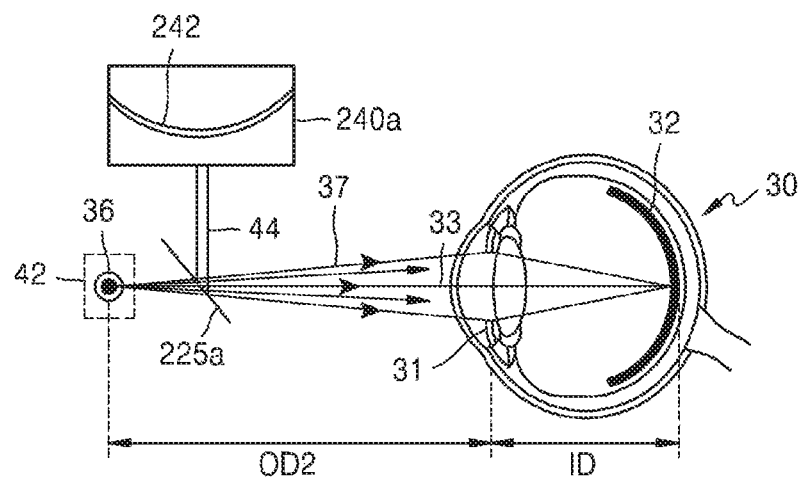

FIGS. 1C and 1D are diagrams describing adjusting a distance of a virtual input interface by using the variable lens 240a, according to an exemplary embodiment.

The variable lens 240a may adjust a distance from an eye 30 of a user to a virtual input interface 41 recognized by the user, by adjusting an incident angle of a first light 43 incident on the eye 30 according to control of the controller.

Referring to FIG. 1C, a thickness of an eye lens 31 decreases to focus the eye 30 on an actual object 34 at a long distance. A second light 35 starting from an actual object 34 moves in parallel to an optical axis 33 of the eye 30, is incident on the eye lens 31 through the fifth surface 225a of the light guiding device 220a, and is converged on a retina 32 by being refracted at the eye lens 31. In other words, the eye lens 31 forms an image of the actual object 34 on the retina 32.

The variable lens 240a may transmit the first light 43 to the fifth surface 225a. The first light 43 reflected at the fifth surface 225a moves in parallel to the optical axis 33 of the eye 30 to be incident on the eye lens 31, and the eye lens 31 may refract the first light 43 to be converged on the retina 32. In other words, the eye lens 31 may form an image of the virtual input interface 41 on the retina 32. For example, when the actual object 34 (or the image of the actual object 34) is in an in-focus state, the actual object 34 (or the image of the actual object 34) and the virtual input interface 41 (or the image of the virtual input interface 41) may have the same first object distance OD1 and the same image distance ID.

Referring to FIG. 1D, the thickness of the eye lens 31 increases to focus the eye 30 on an actual object 36 at a short distance. A second light 37 starting from the actual object 36 moves along the optical axis 33 of the eye 30 while diverging (or diffusing), is incident on the eye lens 31 through the fifth surface 225a of the light guiding device 220a, and is converged on the retina 32 by being refracted by the eye lens 31. In other words, the eye lens 31 forms an image of the actual object 36 on the retina 32. The variable lens 240a may transmit a first light 44 to the fifth surface 225a. The first light 44 reflected from the fifth surface 225a is incident on the eye lens 31 by moving along the optical axis 33 of the eye 30 while diverging (or diffusing), and the eye lens 31 may refract the first light 44 to be converged on the retina 32. In other words, the eye lens 31 may form an image of a virtual input interface 42 on the retina 32. For example, when the actual object 36 (or the image of the actual object 36) is in an in-focus state, the actual object 36 (or the image of the actual object 36) and the virtual input interface 42 (or the image of the virtual input interface 42) may have the same second object distance OD2 and the image distance ID.

Meanwhile, the wearable device 100, according to an exemplary embodiment, may recognize a motion of an input tool for setting an input region, and provide a virtual input interface determined based on attributes of the input region, as will be described in detail later with reference to FIG. 2.

Figure 1E:
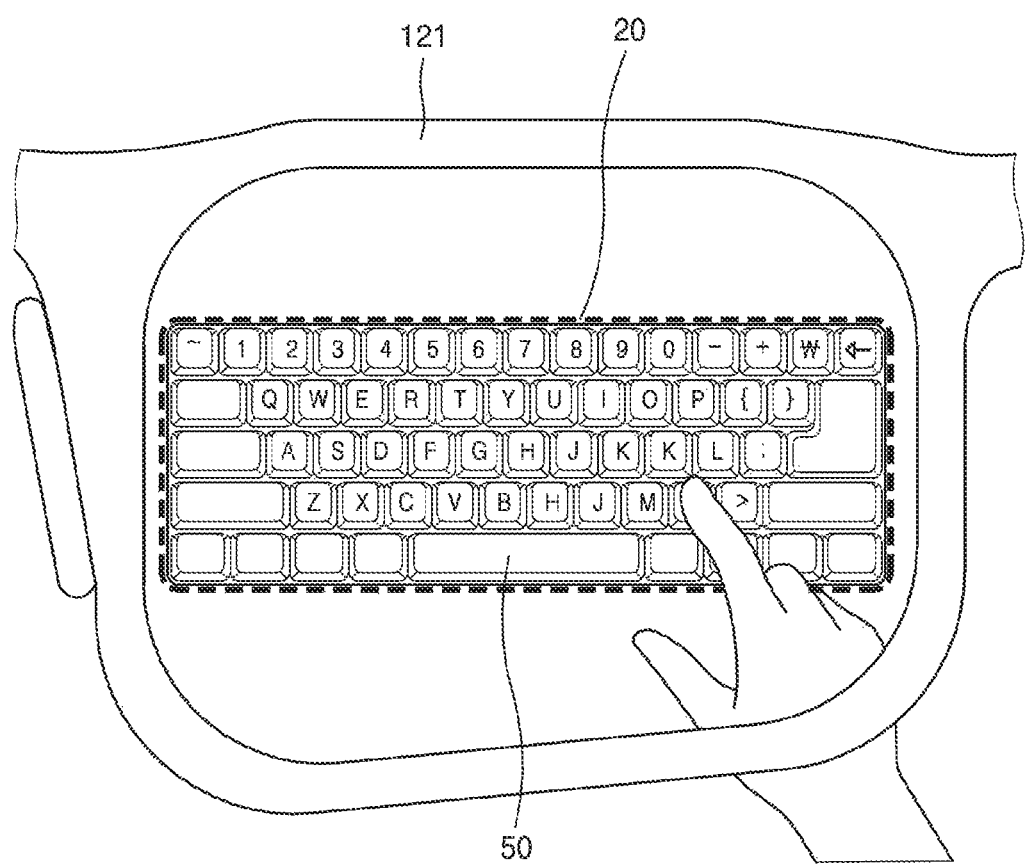

Referring to FIG. 1E, a virtual input interface 50, according to an exemplary embodiment, may be a graphical user interface (GUI) for receiving an input of a user using the first wearable device 100. Alternatively, the virtual input interface 50 may be realized in any one of various forms, and for example, the virtual input interface 50 may be a keyboard (such as a QWERTY keyboard or a portable terminal keyboard), a memo pad, a game controller, a calculator, a plano keyboard, a drum, or a dial pad, but is not limited thereto.

The wearable device 100, according to an exemplary embodiment, may provide the virtual input interface 50 on the input region set by the user. The wearable device 100 may display the virtual input interface 50 on the optical display 121 such that the virtual input interface 50 overlaps the input region.

Here, the wearable device 100 may display the virtual input interface 50 on the optical display 121 in the form of an augmented reality (AR), a mixed reality (MR), or a virtual reality (VR).

For example, when the virtual input interface 50 is provided in the form of AR or MR, the wearable device 100 may display the virtual input interface 50 on a transparent display such that the virtual input interface 50 overlaps the input region observed through the transparent display.

As shown in FIG. 1E, a region 20 defined by a dashed line denotes a region of the real world observed through the optical display 121 of the wearable device 100. The wearable device 100 may display the virtual input interface 50 on the optical display 121 such that the virtual input interface 50 matches the region 20 observed through the optical display 121.

Alternatively, when the virtual input interface 50 is provided in the form of VR, the wearable device 100 may capture a first image including an input region set in the real world, and generate a second image by adding the virtual input interface 50 to the input region of the first image. The wearable device 100 may display the second image in which the virtual input interface 50 overlaps the input region on an opaque display.

The wearable device 100, according to an exemplary embodiment, may include an image sensor 111 and a depth sensor 112.

The image sensor 111 may capture an external image or detect a user motion setting an input region. Also, the image sensor 111 may detect movement of an input tool. Here, the input toll may be a pre-set tool, and examples of the input tool include a pen, a finger, a stylus and a stick, but are not limited thereto.

The depth sensor 112 may measure a depth value of the input region set by the user or a depth value of the input tool. A depth value may correspond to a distance from the depth sensor 112 to a certain object. In the present specification, the depth value increases as the distance from the depth sensor 112 to the certain object increases.

For example, the depth value may be the distance from the depth sensor 112 to the certain object on a Z-axis. As shown in FIG. 1A, in a 3D space, an X-axis may be a reference axis passing the wearable device 100 from left to right, an Y-axis may be a reference axis passing the wearable device 100 from top to bottom, and the Z-axis may be a reference axis passing the wearable device 100 from back to front. Also, the X-, Y-, and Z-axes may be perpendicular to each other.

According to an exemplary embodiment, the depth sensor 112 may obtain a depth value of an object via any one of various methods. For example, the depth sensor 112 may measure a depth value by using at least one of a time of flight (TOF) method, a stereoscopic vision method, and a structured light pattern method.

The TOF method is a method of measuring a distance to an object by analyzing a time consumed before light returns after being reflected at the object. In a TOF system, an infrared LED irradiates an infrared light pulse, and an infrared camera measures a time before the infrared light pulse returns after being reflected at an object. In this case, the depth sensor 112 may include the infrared LED and the infrared camera. The depth sensor 112 may repeatedly irradiate and receive light dozens of times per second to obtain distance information in the form of a moving image. Also, the depth sensor 112 may generate a depth map indicating distance information representing brightness of color of each pixel.

The stereoscopic vision method is a method of obtaining a 3D effect of an object by using two cameras. Accordingly, the depth sensor 112 may include two cameras. The depth sensor 112 may calculate a distance based on triangulation, by using difference information of images captured by the two cameras. A person feels a 3D effect through a difference between images viewed by left and right eyes, and the depth sensor 112 measures a distance in the same manner as eyes of a person. For example, when a distance is short, a difference between images captured by two cameras is high, and when a distance is long, a difference between images captured by two cameras is low.

The structured light pattern method is a method of illuminating an object with a patterned light and measuring a distance to the object by analyzing a location of a pattern on a surface of the object. The depth sensor 112 generally projects a linear pattern or a dot pattern on an object, and the linear pattern or the dot pattern varies based on curves of the object.

The structured light pattern method may be performed by replacing one of the two cameras used in the stereoscopic vision method with a light projector. For example, the depth sensor 112 may calculate a depth map in real-time by analyzing an algorithm of locations of patterns generated as a light emitted from an infrared projector incident on a surface of an object.

Meanwhile, the image sensor 111 and the depth sensor 112 may be separate sensors, or configured as one sensor.

The wearable device 100, according to an exemplary embodiment, may determine whether an input is generated through the virtual input interface 50 by using a depth value of an input region or an input tool obtained through the image sensor.

Figure 2:
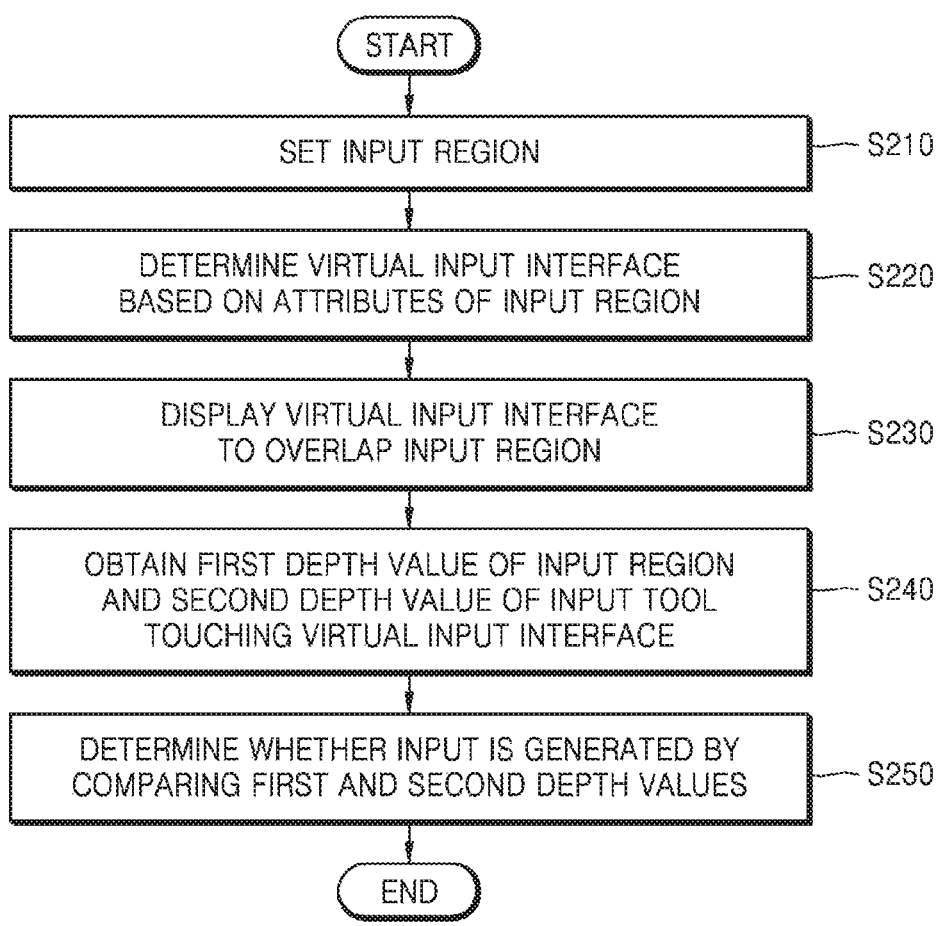
FIG. 2 is a flowchart illustrating a method of providing, by a wearable device, a virtual input interface, according to an exemplary embodiment.

FIG. 2 is a flowchart of a method of providing, by the wearable device 100, a virtual input interface, according to an exemplary embodiment.

Referring to FIG. 2, the wearable device 100 may set an input region in operation S210. The input region may be a 2D or 3D space of the real world on which a virtual input interface overlaps when the virtual input interface is displayed on the optical display 121.

The wearable device 100 may set the input region based on a user motion. For example, the wearable device 100 may recognize a figure drawn by a user in the air or on an actual object, such as a palm, a desk, or a wall, by using an input tool, such as a finger, a pen, a stylus or a stick, and set a region corresponding to the figure as the input region.

Alternatively, the wearable device 100 may recognize a pre-set object and set a region corresponding to the pre-set object as the input region. Alternatively, the wearable device 100 may recognize a movement of the user touching a pre-set object by using the input tool, and set a region corresponding to the pre-set object as the input region.

A method of setting an input region will be described in detail later with reference to FIGS. 3A through 5B.

Also, the wearable device 100, according to an exemplary embodiment, may receive a pre-set voice input or a pre-set key input for entering an input region setting mode. For example, when a voice input or a key input for entering an input mode is received, the wearable device 100 may be controlled to obtain a user gesture image for setting the input region. Alternatively, when an application that requires an input is executed, the wearable device 100 may be controlled to obtain the user gesture image for setting the input region.

When the input region is set, the wearable device 100 may determine a virtual input interface to be displayed based on attributes of the input region, in operation S220.

For example, the wearable device 100 may determine the virtual input interface to be displayed on the optical display 121 based on at least one of a size of the input region, a shape of the input region, a distance between the input region and the wearable device 100 (a depth value of the input region), a type of an actual object where the input region is set, and a gesture of setting the input region.

The wearable device 100 may display the virtual input interface to overlap the input region in operation S230.

Here, the wearable device 100 may display the virtual input interface in the form of AR, MR, or VR.

For example, when the virtual input interface is displayed in the form of AR or MR, the wearable device 100 may display the virtual input interface on a transparent display, such as a see-through type display, such that the virtual input interface overlaps the input region (the 2D or 3D space of the real world) observed through the transparent display.

Alternatively, when the virtual input interface is displayed in the form of VR, the wearable device 100 may capture a first image (an actual image) including the input region (the 2D or 3D space of the real world), and generate a second image by adding the virtual input interface (a virtual image) to the input region of the first image. The wearable device 100 may display the second image in which the virtual input interface overlaps the input region on an opaque display, such as a see-close type display.

The wearable device 100, according to an exemplary embodiment, may obtain a first depth value of the input region and a second depth value of the input tool touching the virtual input interface, in operation S240.

The wearable device 100 may measure a distance (the depth value of the input region, i.e., the first depth value) from the wearable device 100 to the input region by using the depth sensor 112.

Meanwhile, when the input region does not exist on the same plane, a plurality of depth values of the input region may exist. When the plurality of depth values of the input region exist, the first depth value may be one of an average depth value of the plurality of depth values, a minimum depth value of the plurality of depth values, and a maximum depth value of the plurality of depth values, but is not limited thereto.

When the input region is set on an actual object, the first depth value may be a depth value of the actual object.

The wearable device 100 may measure a distance (the depth value of the input tool, i.e., the second depth value) from the wearable device 100 to the input tool by using the depth sensor 112.

When the input tool is a 3D object, a plurality of depth values of the input tool may exist. When the plurality of depth values of the input tool exist, the second depth value may be one of an average depth value of the plurality of depth values, a minimum depth value of the plurality of depth values, and a maximum depth value of the plurality of depth values, but is not limited thereto.

For example, when the virtual input interface is touched by the input tool, a point where the input tool and the virtual input interface contact each other (an end point of the input tool) may be the second depth value.

The wearable device 100 may determine whether an input is generated through the virtual input interface by comparing the first and second depth values in operation S250.

For example, the first depth value of the input region may be a reference value for determining whether an input is generated, and the wearable device 100 may determine that the input is generated through the virtual input interface when a difference between the first and second depth values is less than a threshold value.

Alternatively, the wearable device 100 may determine that the input is generated through the virtual input interface when the second depth value is greater than the first depth value.

The wearable device 100, according to an exemplary embodiment, may set an input region based on a user motion, and determine whether an input is generated by comparing a depth value of the input region and a depth value of an input tool to increase accuracy of the input through a virtual input interface.

FIGS. 3A through 5B are diagrams describing methods of setting an input region, according to exemplary embodiments.

Figure 3A:
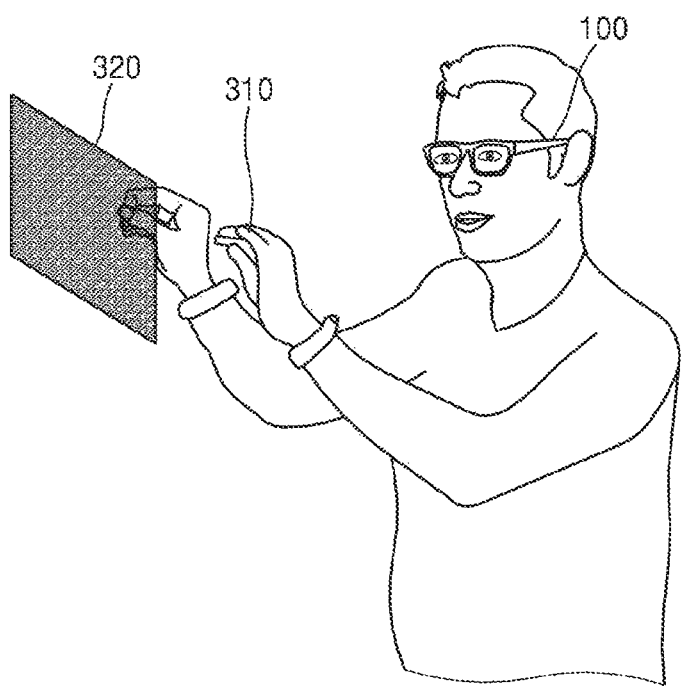
FIGS. 3A through 5B are diagrams describing methods of setting an input region, according to exemplary embodiments.

Referring to FIGS. 3A and B, the wearable device 100, according to an exemplary embodiment, may set an input region by recognizing a figure drawn by a user in the air or on an actual object.

For example, as shown in FIG. 3A, the user may draw a figure, such as a rectangle, in the air by using an input tool 310, such as a pen, a stick, a stylus or a finger. The wearable device 100 may recognize the figure and set a region corresponding to the figure as an input region 320. For example, a region having a depth value of the figure (a distance from the wearable device 100 to the figure), a shape of the figure, and a size of the figure may be set as the input region 320.

As shown in FIG. 3A, the figure may be a rectangle, but a shape of the figure is not limited thereto. Examples of the figure include figures having various shapes and sizes, such as a circle, a polygon, and a free looped curve, a 2D figure, and a 3D figure.

Figure 3B:
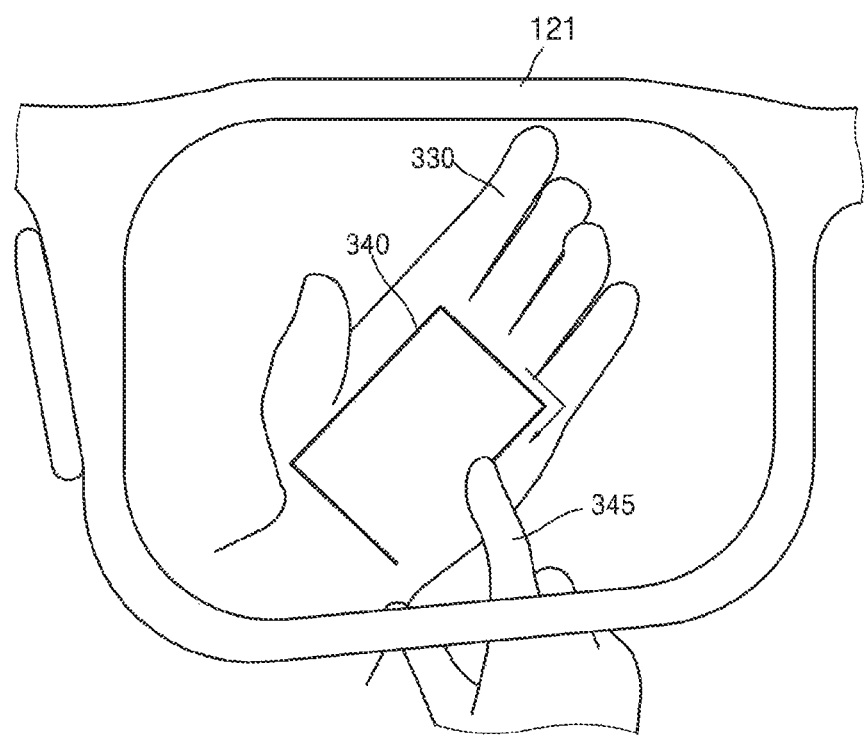

Alternatively, as shown in FIG. 3B, the user may draw a FIG. 340, such as a rectangle, on an actual object 330, such as a palm, by using an input tool 345, such as a pen, a stick, a stylus or a finger. The wearable device 100 may recognize the FIG. 340 drawn by the user and set a region corresponding to the FIG. 340 as an input region. For example, a region having a depth value of the FIG. 340 (a distance from the wearable device 100 to the actual object 330), a shape of the FIG. 340, and a size of the FIG. 340 may be set as the input region.

Figure 4A:
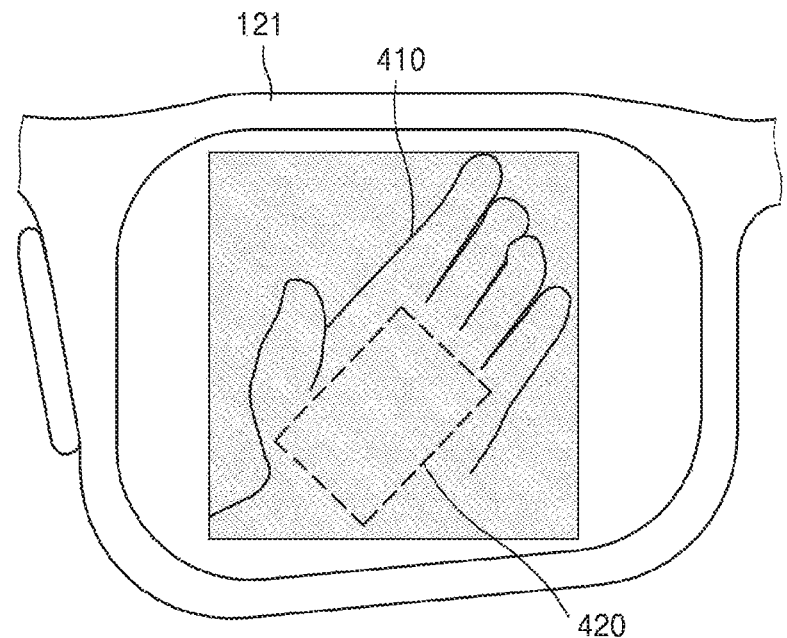
Figure 4B:
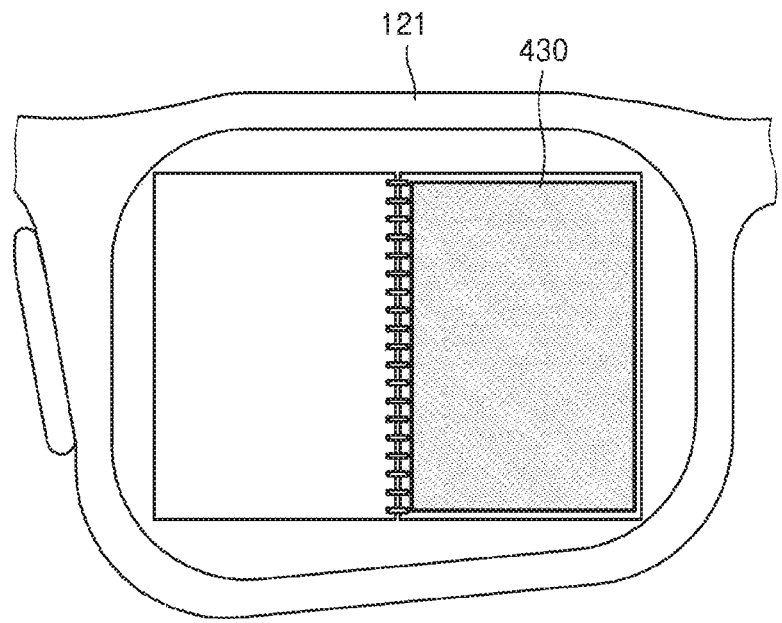

Referring to FIGS. 4A and 4B, the wearable device 100, according to an exemplary embodiment, may set an input region by recognizing a certain object.

For example, as shown in FIG. 4A, the wearable device 100 may recognize a palm 410 by using the image sensor 111. Here, information about a shape or size of the palm 410 may be pre-stored in the wearable device 100. Accordingly, the wearable device 100 may compare the shape and size of the palm 410 with the pre-stored information, and determine whether to set the palm 410 as the input region.

When the shape and size of the palm 410 are the same as the pre-stored information, the wearable device 100 may set a pre-set region 420 of the palm 410 as an input region. Here, a shape and size of the pre-set region 420 may vary.

As shown in FIG. 4A, the wearable device 100 may recognize the palm 410 and sets the input region. Alternatively, the wearable device 100 may set the input region by recognizing any one of various objects, such as a desk and a notepad.

Also, the wearable device 100 may define a certain shape as a marker, and set a plane of an actual object including the marker as an input region when the marker is recognized.

For example, when a rectangle is defined as the marker, the wearable device 100 may recognize the rectangle as the marker by using the image sensor 111. As shown in FIG. 4B, the wearable device 100 may recognize a notepad in a rectangle 430 as the marker.

When the marker is recognized, the wearable device 100 may set a plane of an actual object including the marker as an input region. For example, as shown in FIG. 4B, the wearable device 100 may set a plane of the notepad in the rectangle 430 as an input region. Here, the wearable device 100 may set an entire plane of the notepad as the input region, or a partial region of the plane of the notepad as the input region.

As shown in FIG. 4B, a rectangle may be defined as the marker. Alternatively, any one of various shapes, such as a circle and a polygon, may be defined as the marker.

Figure 5A:
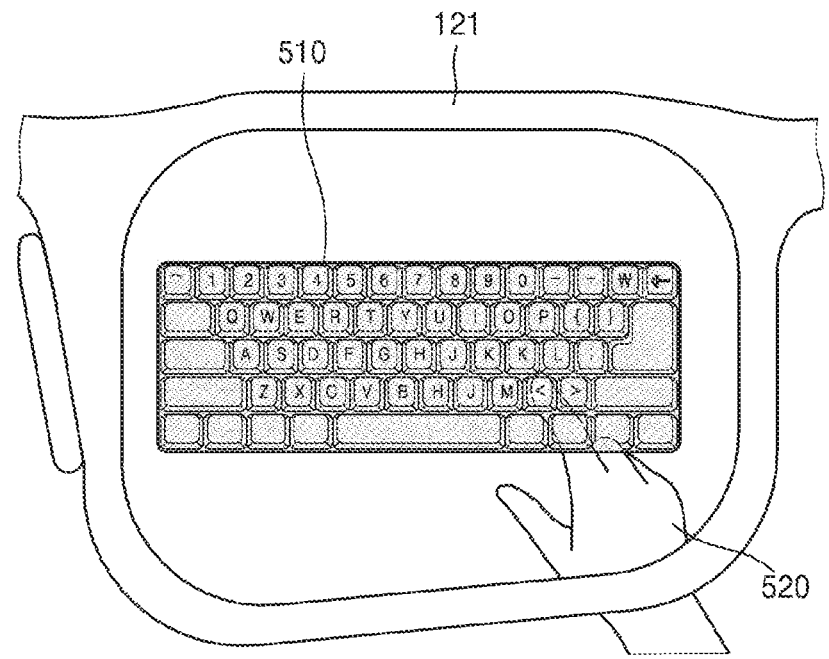

Referring to FIG. 5A, the wearable device 100, according to an exemplary embodiment, may set an input region by recognizing an actual input interface.

The wearable device 100 may recognize the actual input interface and display a virtual input interface having the same type as the actual input interface. Also, the wearable device 100 may receive an input of touching the actual input interface by a user using an input tool 520, such as a pen, a stick, a stylus or a finger, and then recognize the actual input interface.

Examples of the actual input interface include an actual keyboard, an actual keypad, an actual notepad interface, an actual calculator, an actual plano keyboard, an actual game controller, and an actual dial panel, but are not limited thereto. Alternatively, the actual input interface may be a GUI displayed on a mobile terminal.

For example, as shown in FIG. 5A, when the user touches an actual keyboard 510 by using the input tool 520, the wearable device 100 may recognize the actual keyboard 510 touched by the input tool 520. At this time, the wearable device 100 may obtain a depth value of the actual keyboard 510 and a depth value of the input tool 520 by using the depth sensor 112, and determine that the actual keyboard 510 is touched when a difference between the depth value of the actual keyboard 510 and the depth value of the input tool 520 is equal to or less than a threshold value.

Also, information about a type, shape, and size of one or more actual input interfaces may be pre-stored in the wearable device 100. Accordingly, the wearable device 100 may compare a type, shape, and size of the actual keyboard 510 recognized by the image sensor 111 with the pre-stored information, and determine whether the actual keyboard 510 is an actual input interface.

Also, the wearable device 100 may display a virtual input interface that corresponds to the actual input interface. The wearable device 100 may display the virtual input interface having the same size and shape as the actual input interface on the optical display 121 such that the virtual input interface overlaps a region of the actual input interface.

For example, as shown in FIG. 5A, when the actual keyboard 510 is recognized, the wearable device 100 may display a virtual keyboard having the same size and shape as the actual keyboard 510 such that the virtual keyboard overlaps a region where the actual keyboard 510 is displayed.

Figure 5B:
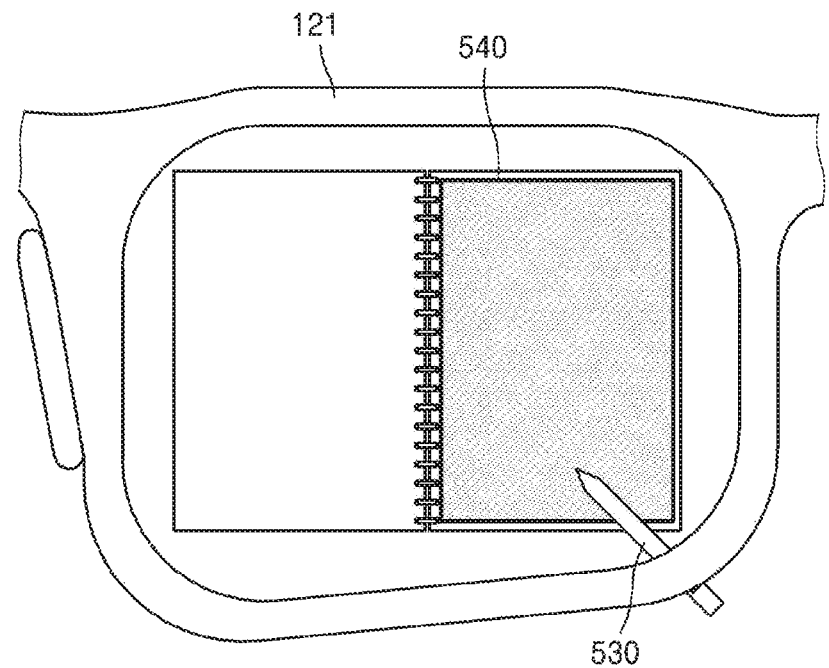

Meanwhile, referring to FIG. 5B, the wearable device 100, according to an exemplary embodiment, may recognize a plane of an actual object and set an input region.

The wearable device 100 may recognize the plane of the actual object, and when the user touches the plane by using an input tool, such as a pen, a stick, a stylus or a finger, the wearable device 100 may set the touched plane as the input region.

For example, as shown in FIG. 5B, when the user touches a plane 540 of a notepad by using an input tool 530, such as a pen, the wearable device 100 may recognize the plane 540 of the notepad touched by the input tool 530. Here, the wearable device 100 may obtain a depth value of the plane 540 and a depth value of the input tool 530 by using the depth sensor 112, and determine that the input tool 530 touched the plane 540 when a difference between the depth value of the plane 540 and the depth value of the input tool 530 is equal to or less than a threshold value.

Accordingly, the wearable device 100 may set the plane 540 touched by the input tool 530 as an input region.

Figure 6:
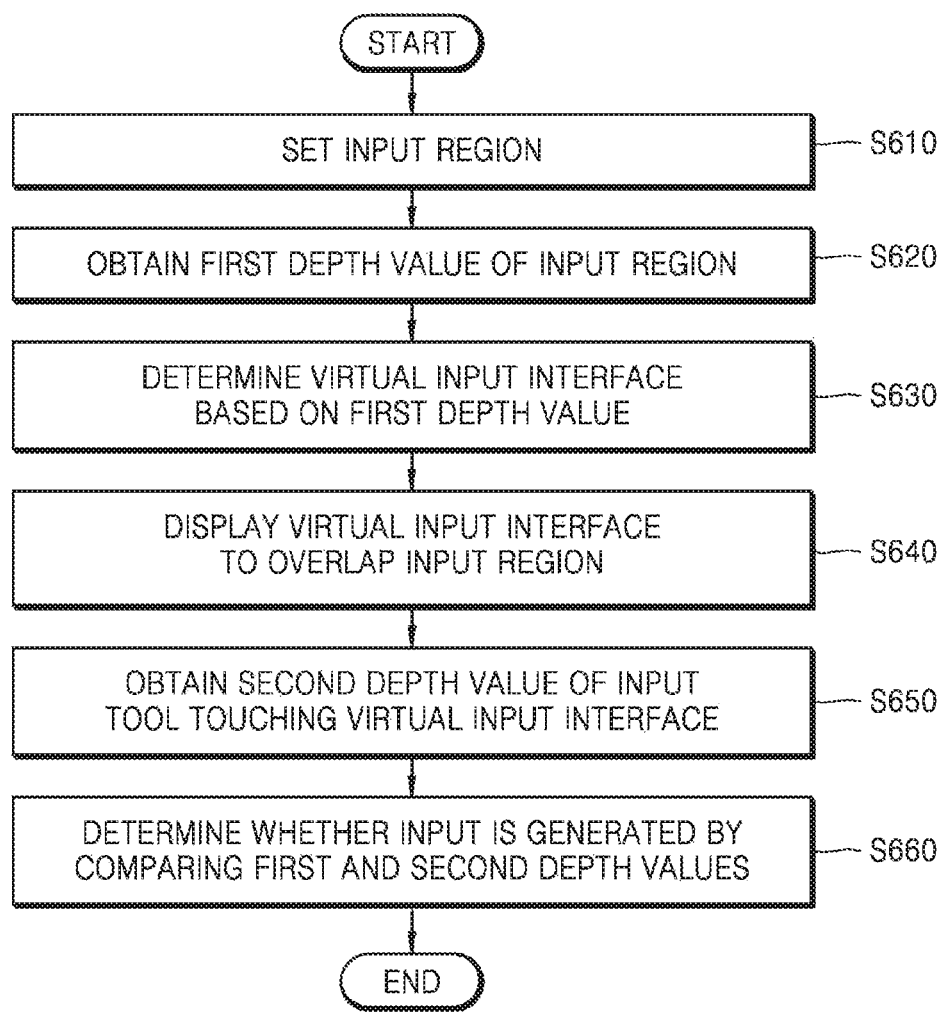
FIG. 6 is a flowchart illustrating a method of providing a virtual input interface according to a depth value of an input region, according to an exemplary embodiment.

FIG. 6 is a flowchart illustrating a method of providing a virtual input interface according to a depth value of an input region, according to an exemplary embodiment.

Referring to FIG. 6, the wearable device 100 may set an input region based on a user motion, in operation S610. Because operation S610 has been described above in detail with reference to operation S210 of FIG. 2, and FIGS. 3A through 5B, details thereof are not repeated.

The wearable device 100 may obtain a first depth value of the input region in operation S620.

When the input region is set in the air, the wearable device 100 may obtain a depth value of the input region based on the user motion of setting the input region. For example, when a user draws a figure in the air by using an input tool, the wearable device 100 may obtain a depth value of the input tool drawing the figure by using the depth sensor 112, and set the depth value of the input tool as the first depth value of the input region.

Alternatively, when the input region is set on an actual object, the wearable device 100 may obtain a depth value of the actual object by using the depth sensor 112, and set the depth value of the actual object as the first depth value of the input region.

The wearable device 100 may determine a type of a virtual input interface to be displayed, based on the first depth value of the input region, in operation S630.

For example, when the first depth value of the input region is equal to or less than a first threshold value, the wearable device 100 may determine a first keyboard having a first size as the virtual input interface to be displayed on the optical display 121.

Also, when the first depth value of the input region is greater than the first threshold value and equal to or less than a second threshold value that is greater than the first threshold value, the wearable device 100 may determine a second keyboard having a second size as the virtual input interface to be displayed on the optical display 121, wherein the second size is smaller than the first size.

Also, when the first depth value of the input region is greater than the second threshold value, the wearable device 100 may determine a third keyboard having a third size as the virtual input interface to be displayed on the optical display 121, wherein the third size is smaller than the second size.

When the first depth value of the input region increases, a size of the input region observed by the user of the wearable device 100 decreases, and thus the wearable device 100 may determine a virtual input interface having a relatively smaller size. However, an exemplary embodiment is not limited thereto.

Also, the wearable device 100 may not only determine the size of the virtual input interface, but also a shape of the virtual input interface based on the first depth value of the input region, as will be described in detail later with reference to FIGS. 7 through 9.

Referring back to FIG. 6, in operation S640, the wearable device 100 may display the virtual input interface determined in operation S630 on the optical display 121 such that the virtual input interface overlaps the input region set in operation S610.

Also, the wearable device 100 may obtain a second depth value of the input tool touching the virtual input interface in operation S650, and compare the first and second depth values to determine whether an input is generated through the virtual input interface in operation S660.

Because operations S640 through S660 of FIG. 6 have been described in detail above with reference to FIGS. S230 through S250, details thereof are not repeated.

Figure 7:
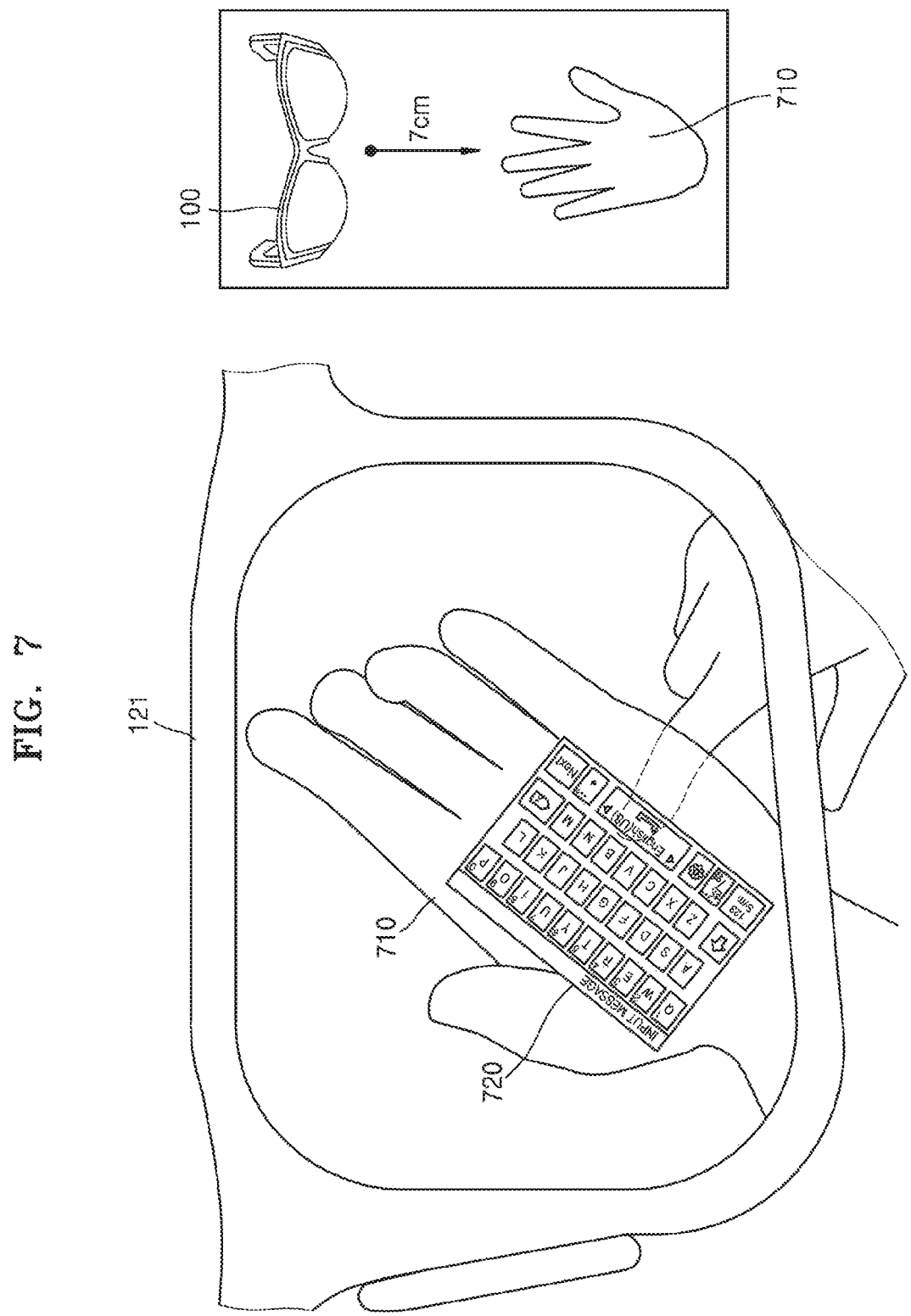
FIGS. 7 through 9 are diagrams describing a type and a size of a virtual input interface being changed according to a depth value of an input region, according to an exemplary embodiment.
Figure 8:
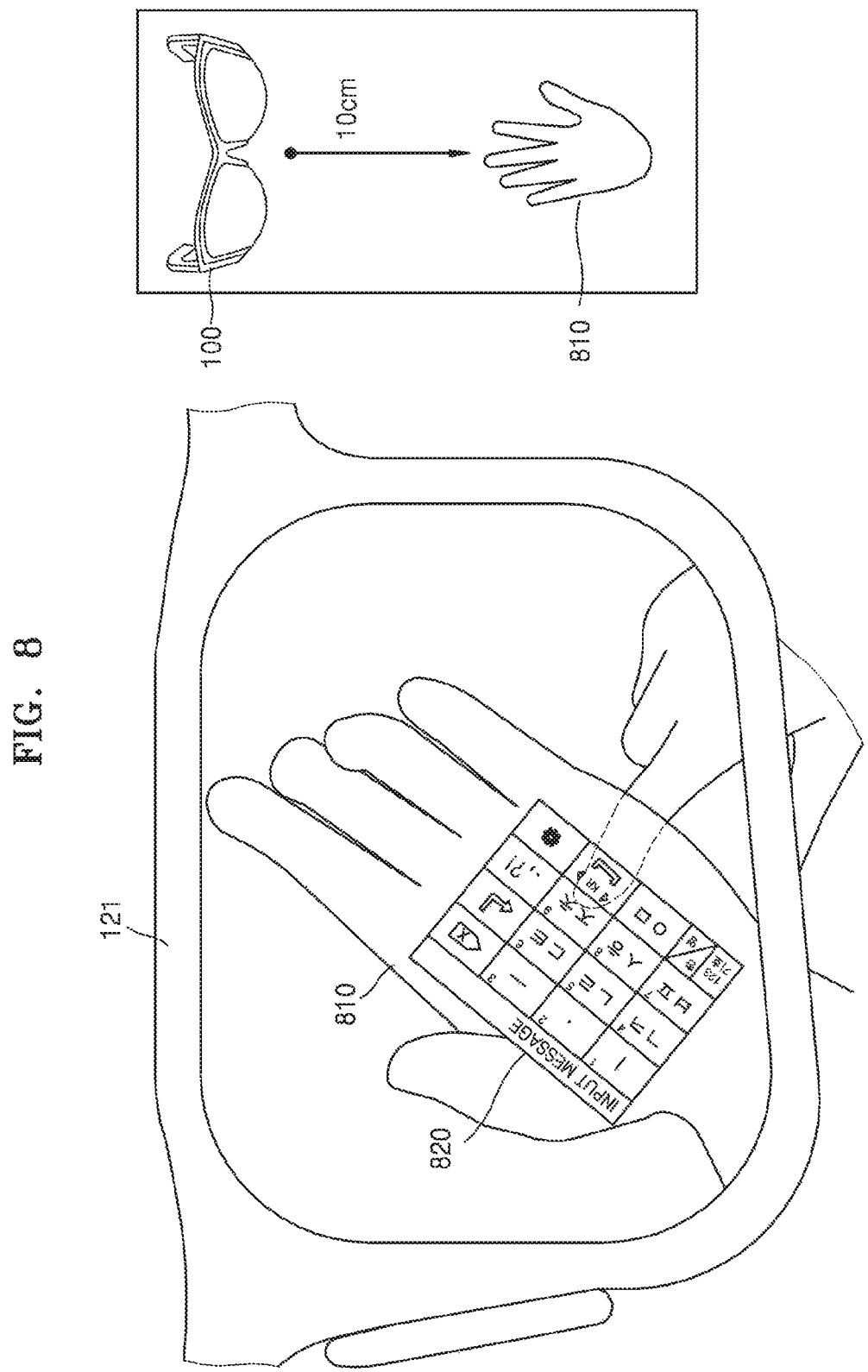
Figure 9:
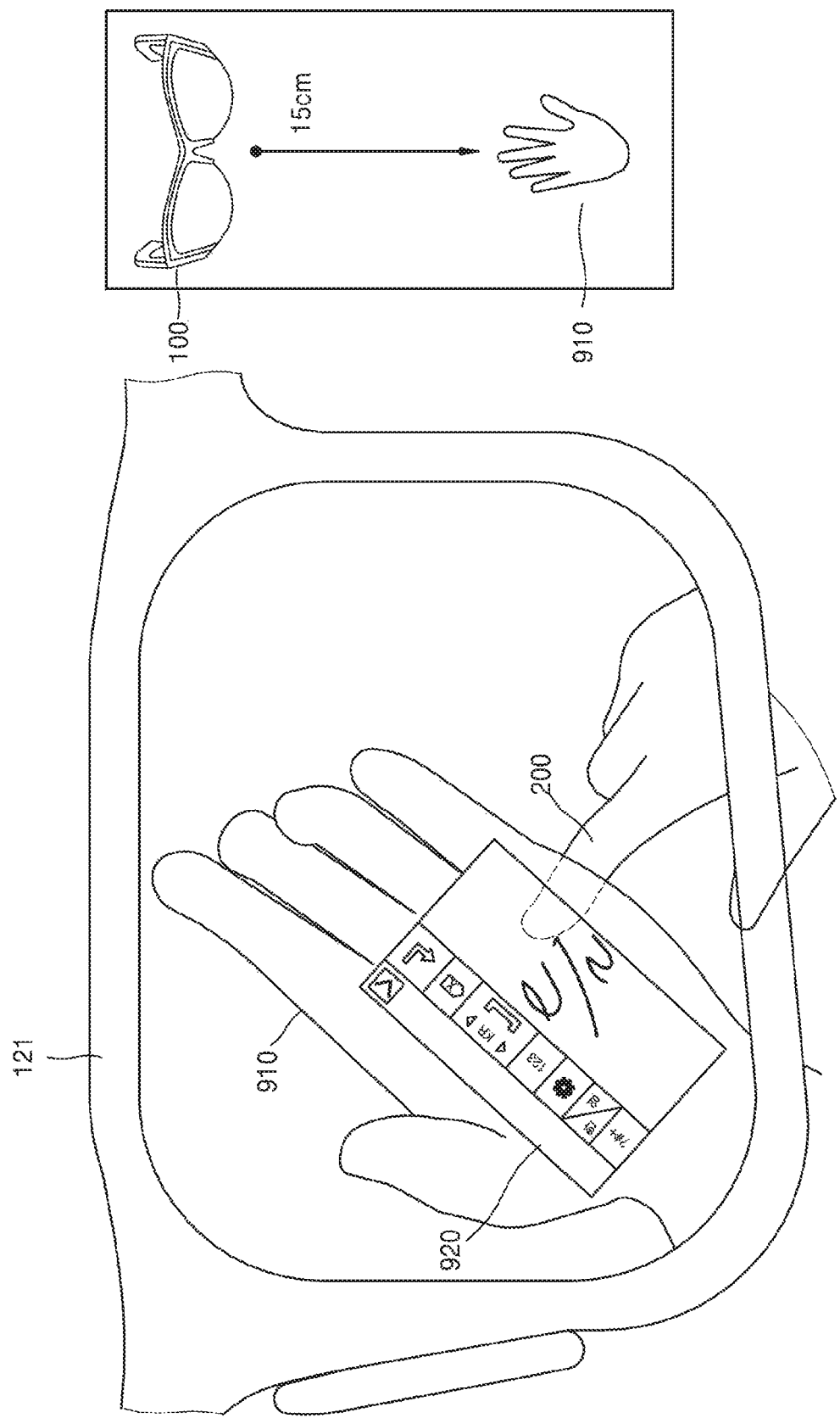

FIGS. 7 through 9 are diagrams describing a type and a size of a virtual input interface displayed on the optical display 121 being changed according to a depth value of an input region.

Referring to FIG. 7, the wearable device 100 may recognize a gesture (for example, a gesture of drawing a rectangle) of a user setting an input region on a palm 710 that is 7 cm away from the wearable device 100, by using an input tool, such as a finger, a pen, a stylus or a stick. The wearable device 100 may display a QWERTY keyboard 720 on the optical display 121 such that the QWERTY keyboard 720 matches the palm 710 observed through the optical display 121, based on the gesture. Here, as shown in FIG. 7, the QWERTY keyboard 720 may include an input window (a window displaying 'input message'), and text input through the QWERTY keyboard 720 may be displayed on the input window.

Also, referring to FIG. 8, the wearable device 100 may recognize a gesture (for example, a gesture of drawing a rectangle) of a user setting an input region on a palm 810 that is 10 cm away from the wearable device 100, by using an input tool, such as a finger, a pen, a stylus or a stick.

When a distance between the palm 810 and the wearable device 100 is 10 cm, a size of the palm 810 observed through the optical display 121 may be smaller than that of the palm 710 of FIG. 7 that is 7 cm away from the wearable device 100. Accordingly, the wearable device 100 may display a mobile terminal keyboard 820, such as Cheonjiin keyboard, on the optical display 121 such that the mobile terminal keyboard 820 matches the palm 810 observed through the optical display 121.

Also, referring to FIG. 9, the wearable device 100 may recognize a gesture (for example, a gesture of drawing a rectangle) of a user setting an input region on a palm 910 that is 15 cm away from the wearable device 100, by using an input tool, such as a finger, a pen, a stylus or a stick.

When a distance between the palm 910 and the wearable device 100 is 15 cm, a size of the palm 910 observed through the optical display 121 may be smaller than that of the palm 810 of FIG. 8 that is 10 cm away from the wearable device 100. Accordingly, the wearable device 100 may display a handwriting input window 920 on the optical display 121 such that the handwriting input window 920 matches the palm 910 observed through the optical display 121.

As shown in FIGS. 7 through 9, a virtual input interface is determined in an order of the QWERTY keyboard 720, the mobile terminal keyboard 820, and the handwriting input window 920 as a distance between a palm (an input region) and the wearable device 100 increases (as a first depth value of the input region increases), but an exemplary embodiment is not limited thereto. A virtual input interface may be determined in an order of the handwriting input window 920, the mobile terminal keyboard 820, and the QWERTY keyboard 720 as the distance between the palm (the input region) and the wearable device 100 decreases (as the first depth value of the input region decreases), and any type of virtual input interface may be determined.

Figure 10A:
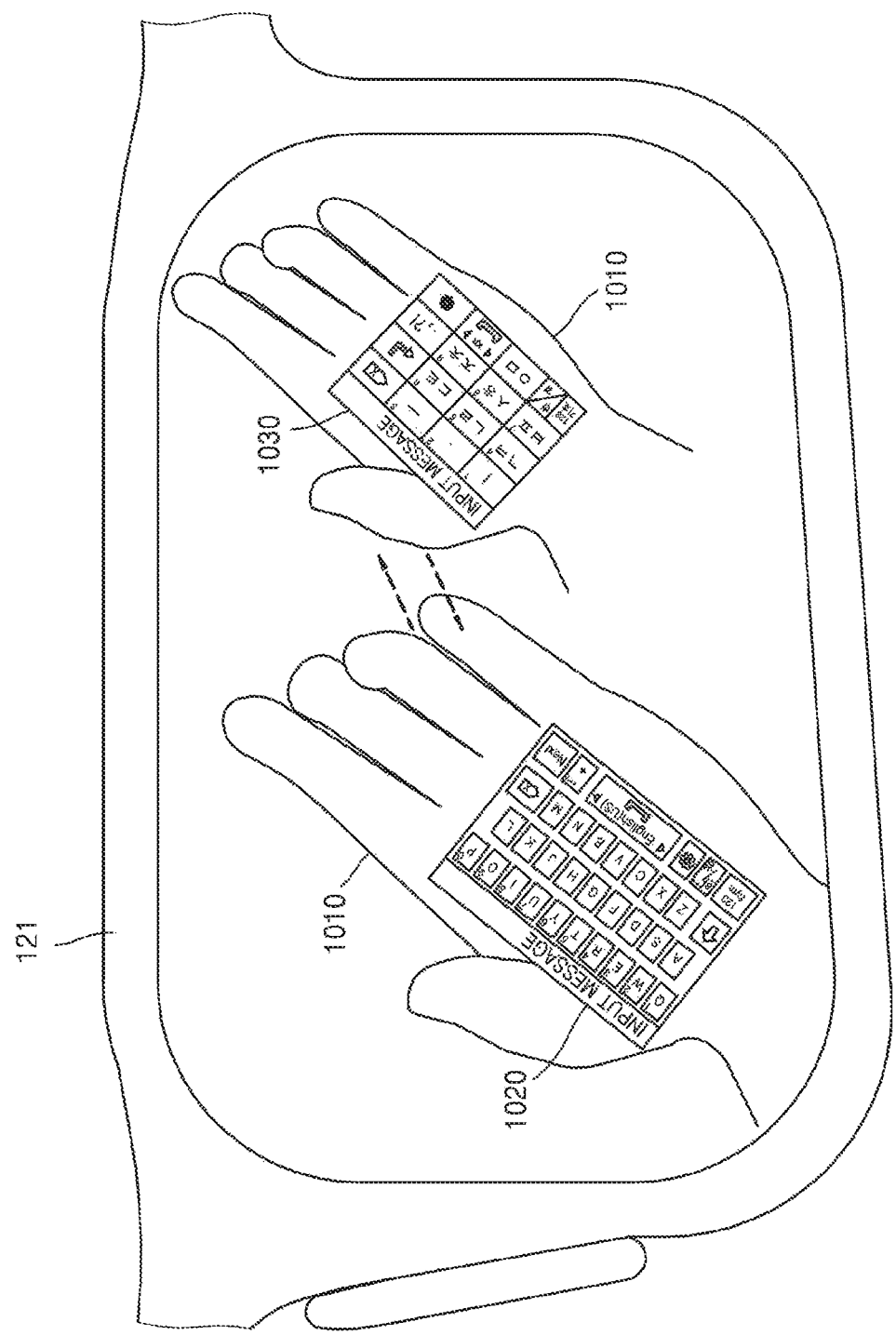
FIGS. 10A and 10B are diagrams describing a type of a virtual input interface being adaptively changed according to a change of a depth value of an actual object where an input region is set, according to exemplary embodiments.
Figure 10B:
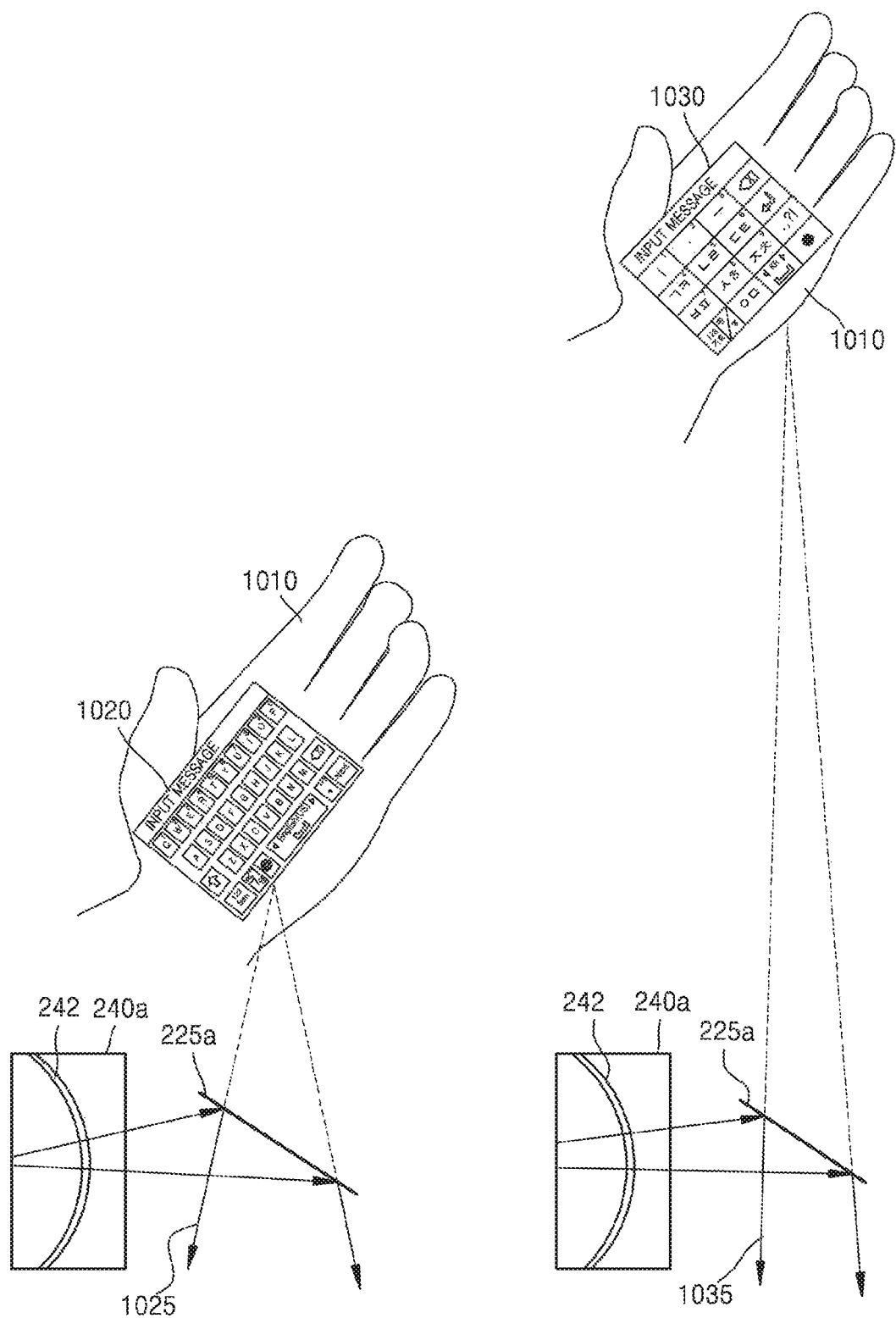

FIGS. 10A and 10B are diagrams describing a type of a virtual input interface being adaptively changed according to a change of a depth value of an actual object where an input region is set, according to exemplary embodiments.

Referring to FIG. 10A, the wearable device 100 may recognize a gesture (for example, a gesture of drawing a rectangle) of a user setting an input region on a palm 1010 that is 7 cm away from the wearable device 100, by using an input tool, such as a finger, a pen, a stylus or a stick. The wearable device 100 may display a QWERTY keyboard 1020 on the optical display 121 such that the QWERTY keyboard 1020 matches the palm 1010 observed through the optical display 121, based on the gesture.

While the QWERTY keyboard 1020 is displayed, the user may move the palm 1010 away from the wearable device 100 such that a distance between the wearable device 100 and the palm 1010 is 10 cm.

When the distance between the wearable device 100 and the palm 1010 is 10 cm, a size of the palm 1010 observed through the optical display 121 may be smaller than that of the palm 1010 that is 7 cm away from the wearable device 100 as shown in FIG. 10A. Accordingly, the wearable device 100 may display a mobile terminal keyboard 1030, such as a Cheonjiin keyboard, on the optical display 121 instead of the QWERTY keyboard 1020 that was previously displayed. Thereby, the mobile terminal keyboard 1030 matches the palm 1010 observed through the optical display 121.

Alternatively, the wearable device 100 may recognize a gesture (for example, a gesture of drawing a rectangle) setting an input region on the palm 1010 that is 10 cm away from the wearable device 100, by using the input tool. The wearable device 100 may display the mobile terminal keyboard 1030 to overlap the palm 1010 based on the gesture.

While the mobile terminal keyboard 1030 is displayed, the user may move the palm 1010 closer to the wearable device 100 such that the distance between the wearable device 100 and the palm 1010 is 7 cm.

When the distance between the wearable device 100 and the palm 1010 is 7 cm, the size of the palm 1010 observed through the optical display 121 may be larger than that of the palm 1010 that is 10 cm away from the wearable device 100. Accordingly, the wearable device 100 may display the QWERTY keyboard 1020 on the optical display 121 instead of the mobile terminal keyboard 1030 that was displayed, such that the QWERTY keyboard 1020 matches the palm 1010 observed through the optical display 121.

As such, a user may change a type of a virtual input interface by changing a location of an actual object (a distance between the actual object and a wearable device) after an input region is set on the actual object.

Referring to FIG. 10B, the wearable device 100 may obtain a first distance (for example, 7 cm) between the wearable device 100 and the palm 1010 (an actual object), and display a first virtual input interface (for example, the QWERTY keyboard 1020) based on the first distance on the palm 1010 observed through the optical display 121. For example, the variable lens 240a of FIG. 1B may be changed (or a curvature of a refracting surface of a variable lens may be changed) to adjust an incident angle of a first light 1025 incident on eyes of the user, such that a distance from the eyes of the user to the QWERTY keyboard 1020 recognized by the user is the first distance.

Also, the wearable device 100 may obtain a second distance (for example, 10 cm) between the wearable device 100 and the palm 1010 (the actual object), and display a second virtual input interface (for example, the mobile terminal keyboard 1030) having the second distance on the palm 1010 observed through the optical display 121. For example, the variable lens 240a of FIG. 1B may be changed (or a curvature of a refracting surface of a variable lens may be changed) to adjust an incident angle of a first light 1035 incident on eyes of the user, such that a distance from the eyes of the user to the mobile terminal keyboard 1030 recognized by the user is the second distance.

Figure 10C:
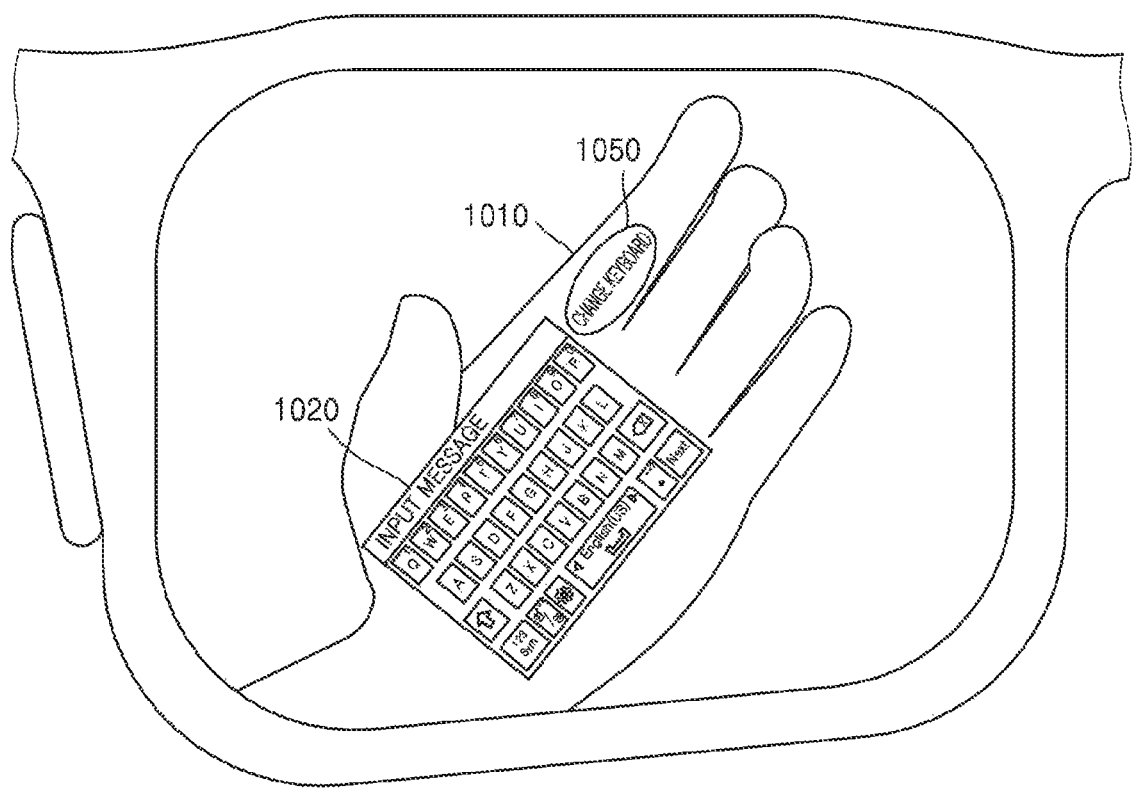
FIGS. 10C and 10D are diagrams describing a type of a virtual input interface being changed based on a user input, according to exemplary embodiments.
Figure 10D:
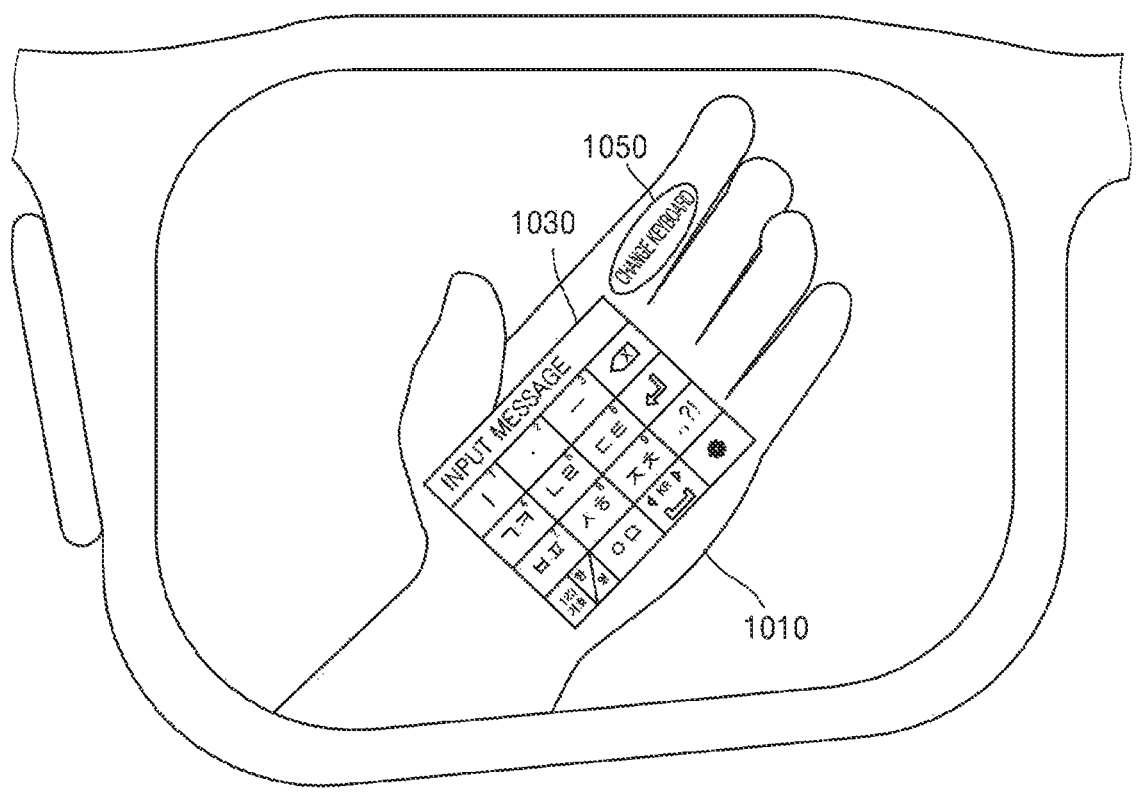

FIGS. 10C and 10D are diagrams describing a type of a virtual input interface being changed based on a user input, according to exemplary embodiments.

Referring to FIG. 10C, the wearable device 100 may display the first virtual input interface, for example, the QWERTY keyboard 1020, on the optical display 121 such that the QWERTY keyboard 1020 matches the palm 1010 observed through the optical display 121 based on a gesture of a user. Here, the wearable device 100 may display a key 1050 for changing a virtual input interface. When an input of selecting the key 1050 is received from the user, the wearable device 100 may display the second virtual input interface, for example, the mobile terminal keyboard 1030, in a region where the first virtual input interface was displayed, as shown in FIG. 10D. Also, the key 1050 for changing a virtual input interface may be displayed. Upon receiving the input of selecting the key 1050 from the user, the wearable device 100 may display a third virtual input interface in a region where the second virtual input interface was displayed, or may display the QWERTY keyboard 1020 as shown in FIG. 10C.

Figure 11:
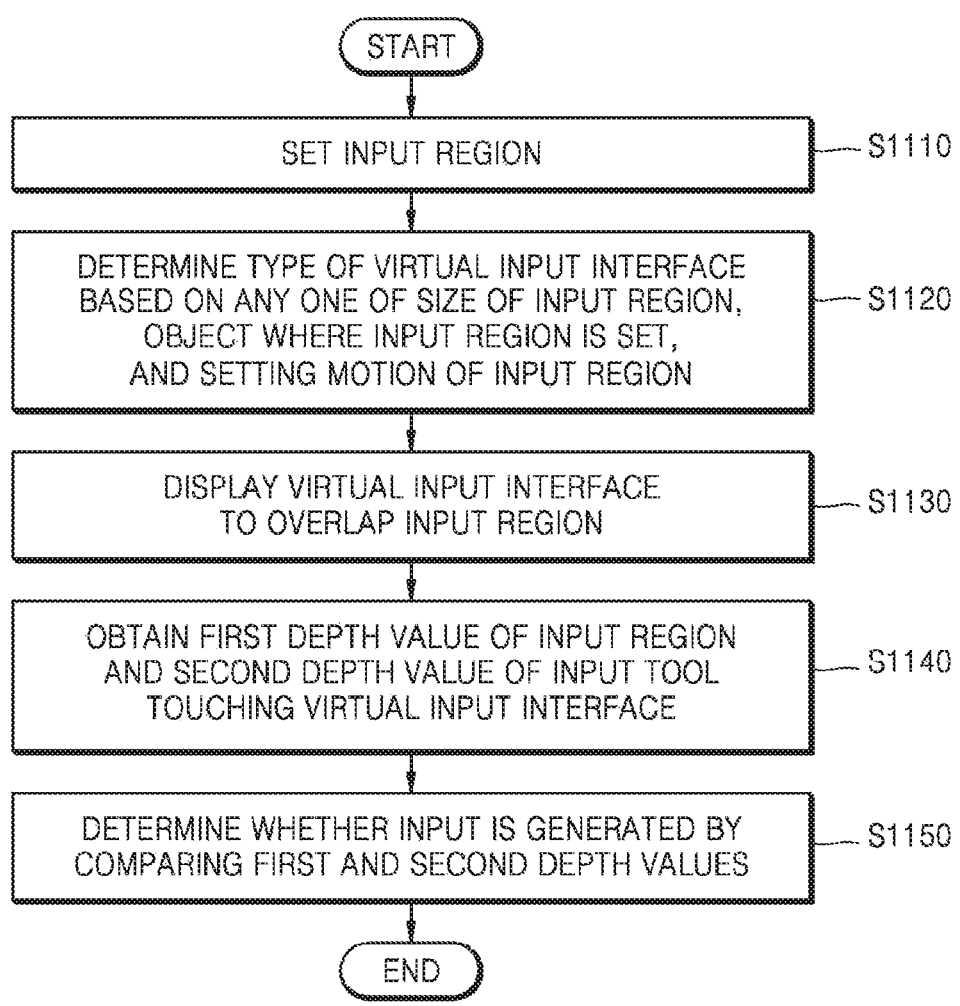
FIG. 11 is a flowchart illustrating a method of providing a virtual input interface determined based on a size of an input region or a setting motion of the input region, according to an exemplary embodiment.

FIG. 11 is a flowchart of a method of providing a virtual input interface determined based on a size of an input region or a setting motion of the input region, according to an exemplary embodiment.

Referring to FIG. 11, the wearable device 100 may set an input region by using a user gesture for assigning a region for displaying a virtual input interface, in operation S1110. Because operation S1110 has been described in detail with reference to operation S210 of FIG. 2, and FIGS. 3A through 5B, details thereof are not repeated.

The wearable device 100 may determine a shape or type of a virtual input interface based on a size of the input region or the user gesture, in operation S1120.

For example, when an area of the input region is equal to or less than a first threshold value, the wearable device 100 may provide a virtual input interface having a first area.

Alternatively, when the area of the input region is greater than the first threshold value and equal to or less than a second threshold value that is greater than the first threshold value, the wearable device 100 may provide a virtual input interface having a second area that is larger than the first area. Here, a size of the input region may be determined by a height, width, diagonal length, or diameter, as well as the area.

Also, the wearable device 100 may provide a different type of virtual input interface based on a figure drawn by the user. The figure may be drawn in the air or on an actual object and may be used to set the input region.

For example, when the user draws a first figure to set the input region, the wearable device 100 may recognize the first figure and provide a virtual input interface corresponding to the first figure. Also, when the user draws a second figure to set the input region, the wearable device 100 may provide a virtual input interface corresponding to the second figure.

This will be described in detail later with reference to FIGS. 12A through 15B.

Referring back to FIG. 11, in operation S1130 the wearable device 100 may display the virtual input interface determined in operation S1120 on the optical display 121 according to a size of the input region set in operation S1110.

For example, the virtual input interface may be displayed on the optical display 121 such that the virtual input interface is shown in the input region. At this time, a shape of the virtual input interface may be the same as a shape of the input region, and a size of the virtual input interface may be the same as or smaller than a size of the input region.

Also, in operation S1140 the wearable device 100 may obtain a first depth value of the input region and a second depth value of an input tool touching or approaching the virtual input interface, and determine whether an input is generated through the virtual input interface by comparing the first and second depth values in operation S1150.

Because operations S1130 through S1150 of FIG. 11 have been described above with reference to FIGS. S230 through S250 of FIG. 2, details thereof are not repeated.

FIGS. 12A through 13B are diagrams describing types of virtual input interfaces being displayed according to dimensions of input regions.

Figure 12A:
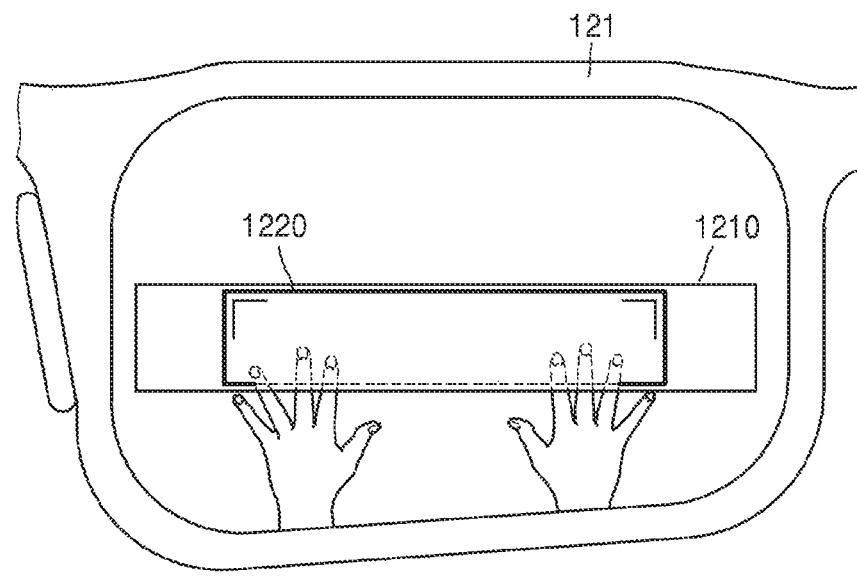
FIGS. 12A through 13B are diagrams describing types of virtual input interfaces being changed according to dimensions of input regions.

As shown in FIG. 12A, the user of the wearable device 100 may draw a figure for setting an input region on a desk 1210. For example, the user may use both hands to draw a rectangle 1220 having a first size (for example, 20 cm×10 cm) on the desk 1210. Here, the wearable device 100 may set an input region by using a gesture of the user drawing the rectangle 1220 by using both hands.

Figure 12B:
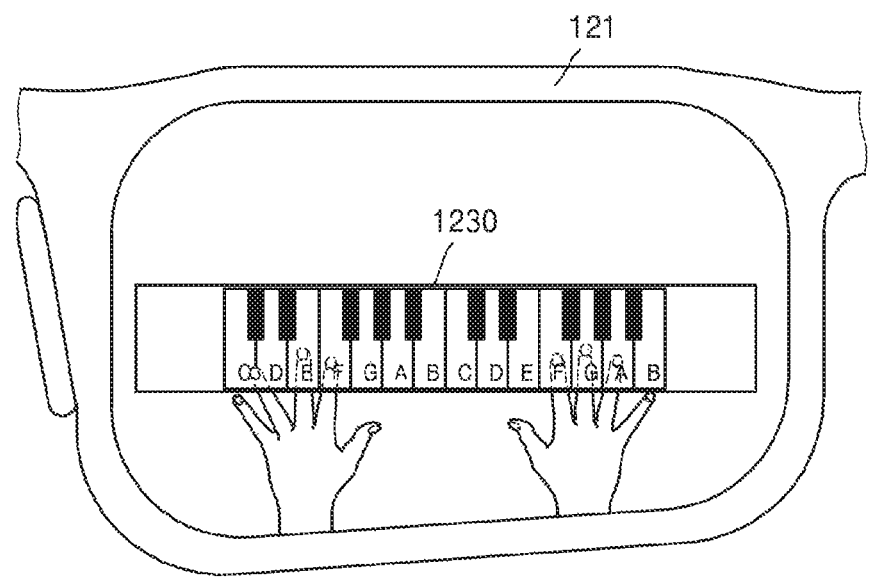

Also, as shown in FIG. 12B, in response to the gesture drawing the rectangle 1220, the wearable device 100 may display a virtual plano keyboard 1230 to overlap a region of the rectangle 1220 observed through the optical display 121. The wearable device 100 may display the virtual plano keyboard 1230 on the optical display 121 such that the virtual plano keyboard 1230 matches the first size of the rectangle 1220. Here, a size of the virtual plano keyboard 1230 may be determined according to the first size of the rectangle 1220.

Figure 13A:
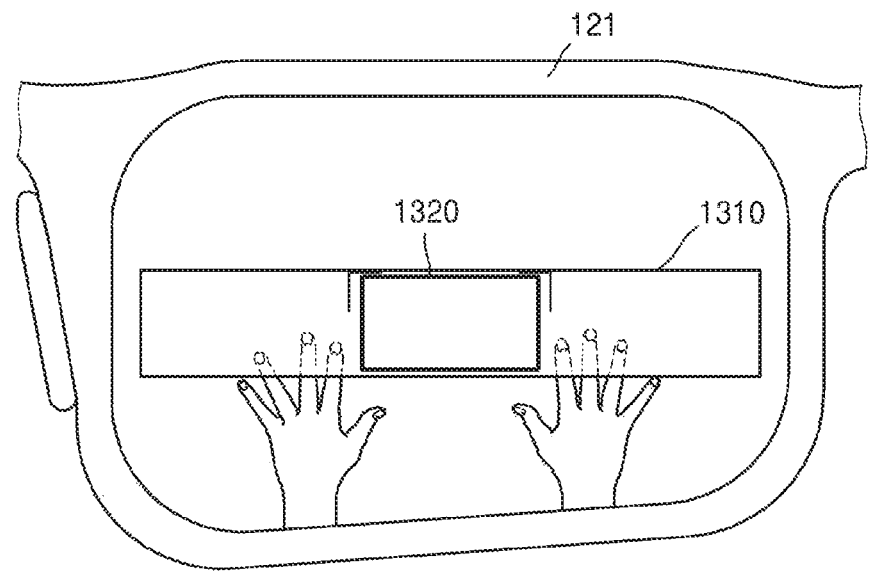

As shown in FIG. 13A, the user may draw a figure for setting an input region on a desk 1310. For example, the user may draw a rectangle 1320 having a second size (for example, 10 cm×10 cm) on the desk 1310 by using both hands. Here, the wearable device 100 may recognize a gesture of the user drawing the rectangle 1320 by using both hands as a gesture of setting an input region.

Also, as shown in FIG. 12B, in response to the gesture of drawing the rectangle 1320, the wearable device 100 may display a virtual plano keyboard 1330 to overlap a region of the rectangle 1320 observed through the optical display 121. The wearable device 100 may display the virtual plano keyboard 1330 on the optical display 121 such that the virtual plano keyboard 1330 matches the second size of the rectangle 1320. Here, a size of the virtual plano keyboard 1330 may be determined according to the second size of the rectangle 1320.

Alternatively, the wearable device 100 may provide a virtual input interface not only having different dimensions, but also different shapes, based on a size of an input region.

Figure 13B:
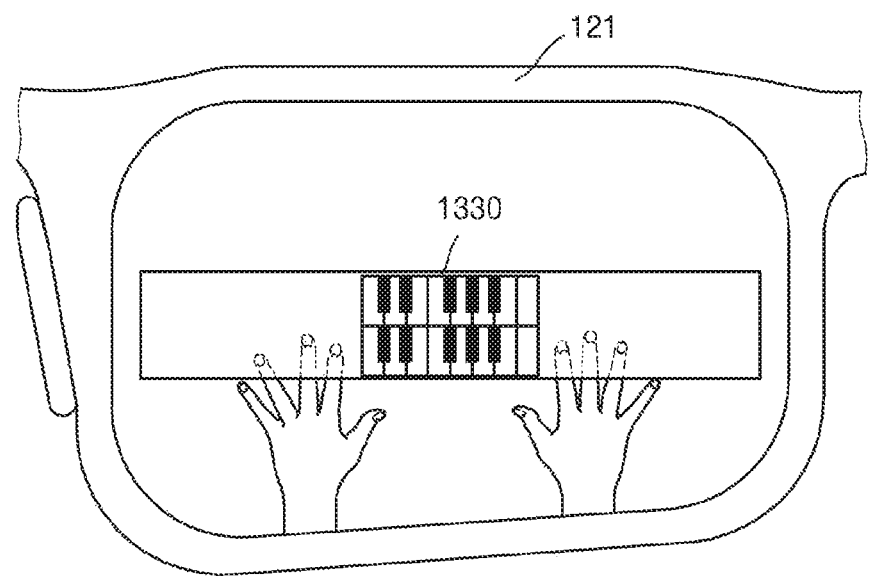

Referring to FIGS. 12B and 13B, the virtual plano keyboard 1230 shown in FIG. 12B may be a plano keyboard displayed in one line, and the virtual plano keyboard 1330 shown in FIG. 13B may be a plano keyboard displayed in two lines, but are not limited thereto.

FIGS. 14A through 15B are diagrams describing types of virtual input interfaces being changed according to gestures setting input regions.

Figure 14A:
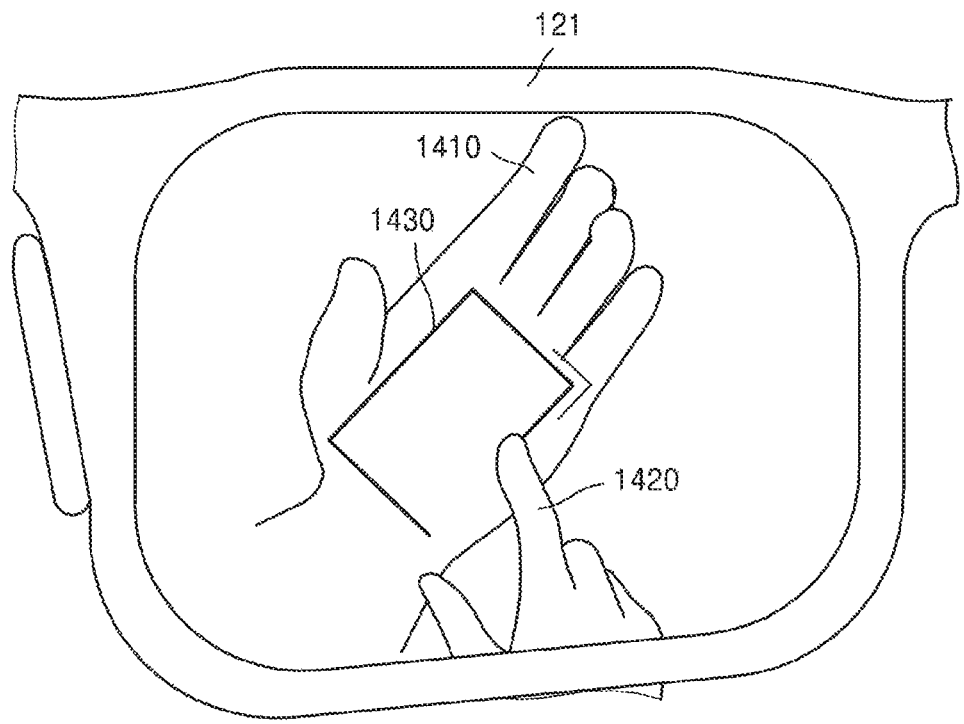
FIGS. 14A through 15B are diagrams describing types of virtual input interfaces being changed according to gestures setting input regions.

As shown in FIG. 14A, when the user draws a rectangle 1430 on a palm 1410 observed through the optical display 121 by using a finger 1420, the wearable device 100 may recognize a gesture of drawing the rectangle 1430 by using the image sensor 111, and set a region corresponding to the rectangle 1430 as an input region.

Figure 14B:
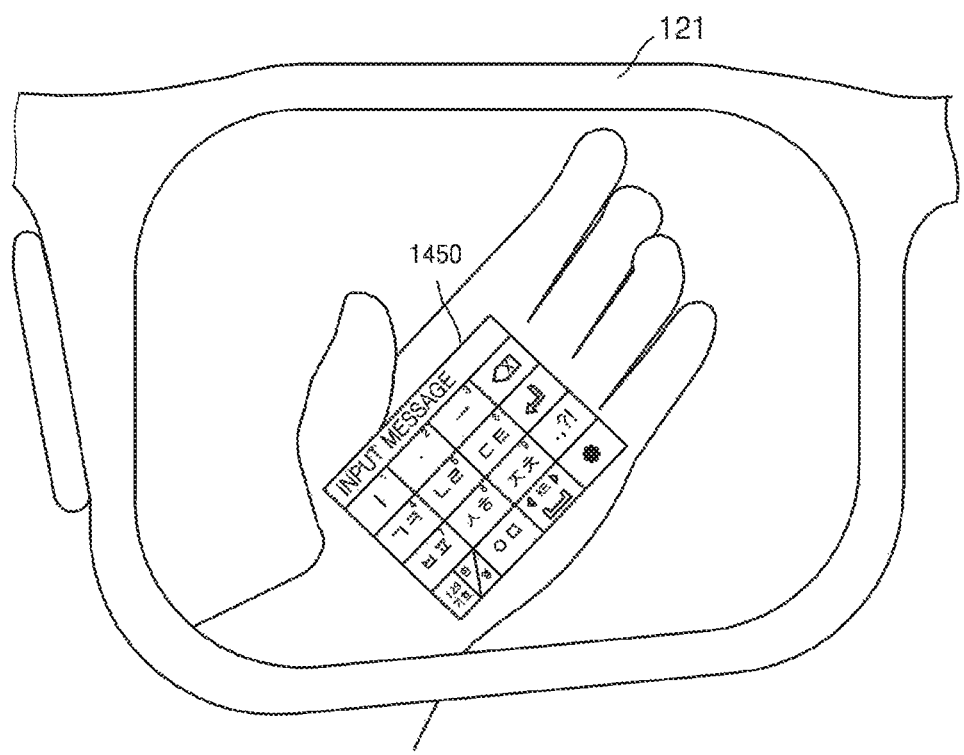

At this time, as shown in FIG. 14B, the wearable device 100 may display a virtual mobile terminal keyboard 1450 on the optical display 121 such that the virtual mobile terminal keyboard 1450 overlaps a rectangular region observed through the optical display 121. For example, the wearable device 100 may display the virtual mobile terminal keyboard 145 on the optical display 121 according to a size of the rectangular region. Alternatively, the wearable device 100 may display the virtual mobile terminal keyboard 1450 on an opaque display.

Figure 15A:
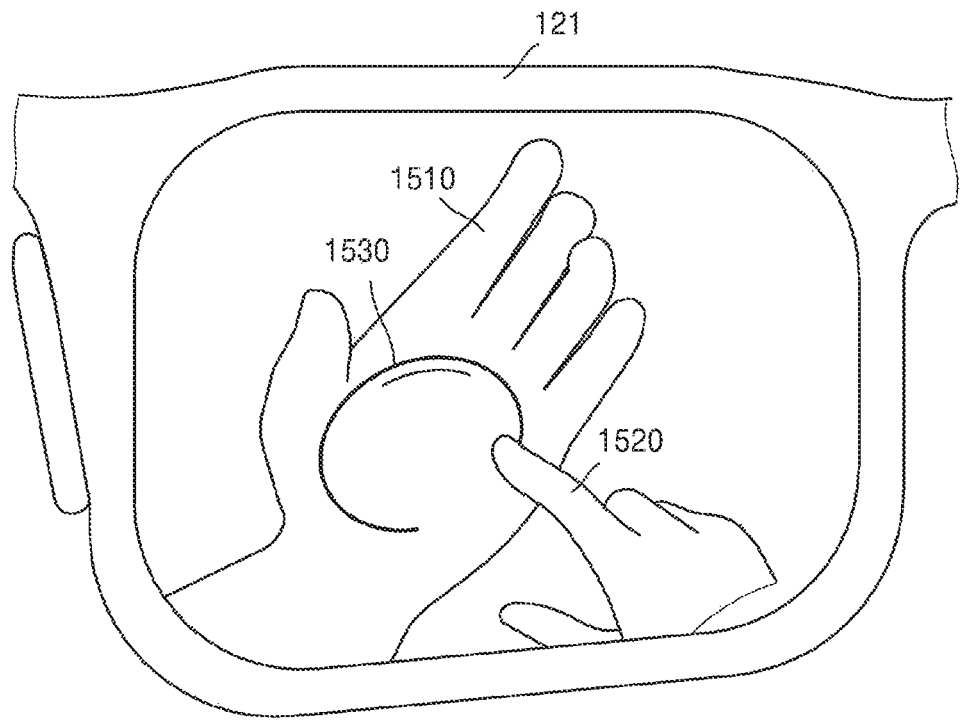

As shown in FIG. 15A, when the user draws a circle 1530 on a palm 1510 observed through the optical display 121 by using a finger 1520, the wearable device 100 may recognize a gesture of drawing the circle 1530 by using the image sensor 111, and set a region corresponding to the circle 1530 as an input region.

Figure 15B:
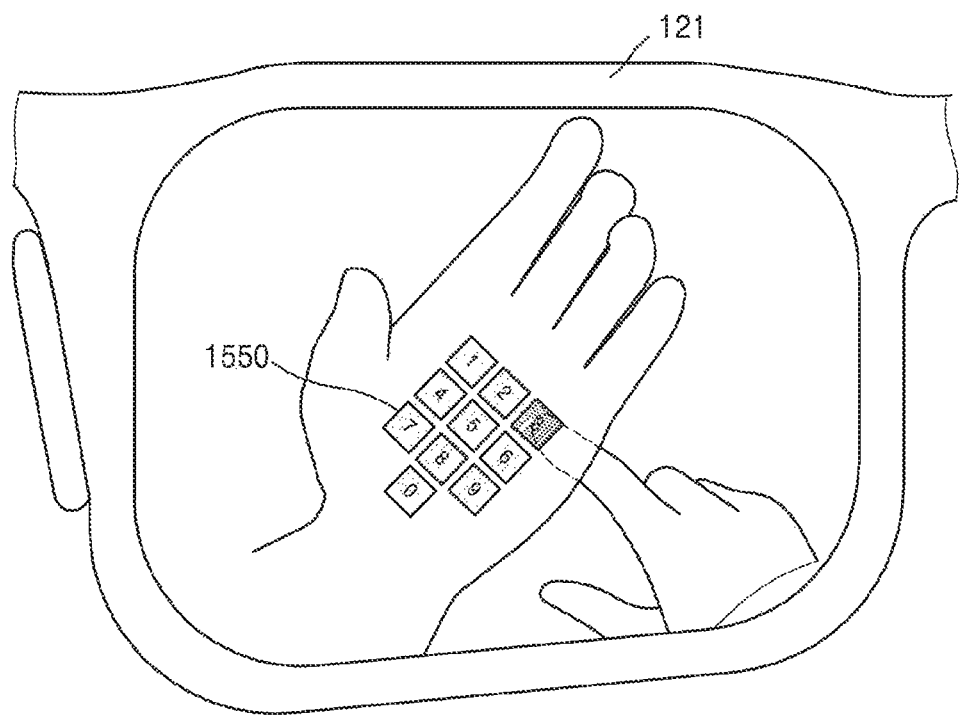

At this time, as shown in FIG. 15B, the wearable device 100 may display a virtual dial pad 1550 on the optical display 121 such that the virtual dial pad overlaps a circular region observed through the optical display 121. For example, the wearable device 100 may display the virtual dial pad 1550 on the optical display 121 to match a size of the circular region. Alternatively, the wearable device 100 may display the virtual dial pad on an opaque display.

As such, the wearable device 100, according to an exemplary embodiment, may provide a virtual input interface having different shapes according to types of a gesture setting an input region, and information about types, dimensions, and shapes of a virtual input interface, provided according to types of a gesture, may be stored in the wearable device 100.

Figure 16A:
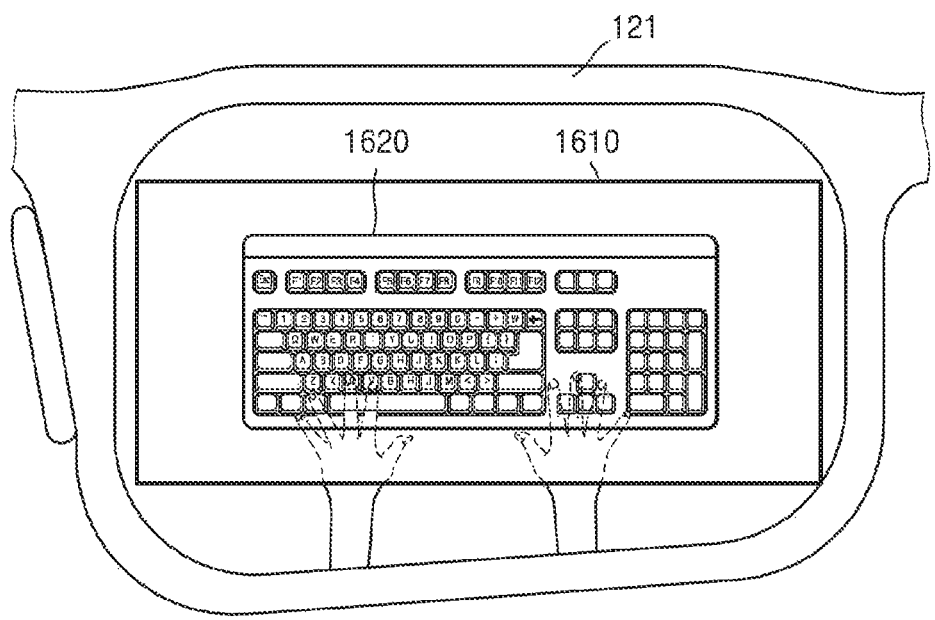
FIGS. 16A and 16B are diagrams describing providing a virtual input interface determined based on an object where an input region is set, according to an exemplary embodiment.
Figure 16B:
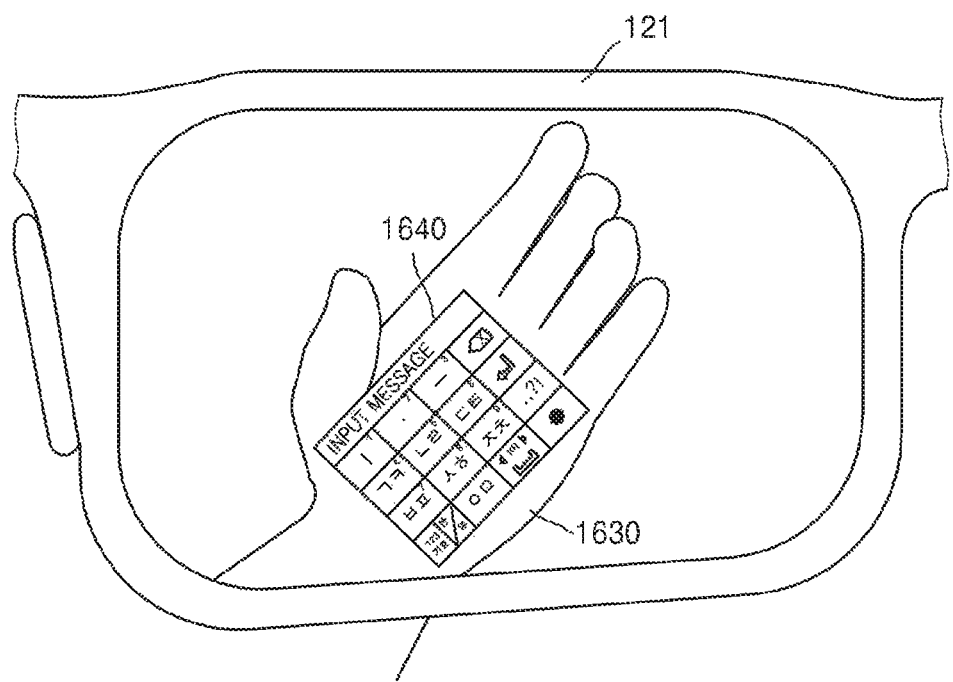

FIGS. 16A and 16B are diagrams describing providing a virtual input interface, determined based on an object where an input region is set, according to an exemplary embodiment.

Referring to FIG. 16A, the user may draw a figure (for example, a rectangle) for setting an input region on a desk 1610 observed through the optical display 121. For example, the user may draw the rectangle on the desk 1610 by using both hands.

The wearable device 100 may recognize a gesture of drawing the rectangle as a gesture of setting an input region, and set a region corresponding to the rectangle drawn on the desk 1610 as an input region.

Here, when the desk 1610 is an actual object where the input region is set, the user is able to use both hands, and thus the wearable device 100 may determine a QWERTY keyboard 1620 as a virtual input interface.

Also, the wearable device 100 may display the QWERTY keyboard 1620 on the optical display 121 such that the QWERTY keyboard 1620 overlaps a rectangular region of the desk 1610 observed through the optical display 121. For example, the wearable device 100 may display the QWERTY keyboard 1620 on the optical display 121 according to a size of the rectangular region. Alternatively, the wearable device 100 may display the QWERTY keyboard 1620 on an opaque display.

Referring to FIG. 16B, the user may draw a figure (for example, a rectangle) for setting an input region on a palm 1630 observed through the optical display 121. For example, the user may draw the rectangle on the palm 1630 by using a finger.

The wearable device 100 may recognize a gesture of drawing the rectangle as a gesture of setting an input region, and set a region corresponding to the rectangle drawn on the palm 1630 as the input region.

Here, when the palm 1630 is an actual object where the input region is set, the user is able to use only one hand, and thus the wearable device 100 may set a mobile terminal keyboard 1640 as a virtual input interface.

Also, the wearable device 100 may display the mobile terminal keyboard 1640 on the optical display 121 to overlap the rectangular region on the palm 1630 observed through the optical display 121. For example, the wearable device 100 may display the mobile terminal keyboard 1640 on the optical display 121 according to a size of the rectangular region. Alternatively, the wearable device 100 may display the mobile terminal keyboard 1640 on an opaque display.

A color of a virtual input interface may be determined according to a color of an input region. For example, when the color of the input region is a first color, the color of the virtual input interface may be determined to be a second color that is different from the first color, or a third color that is a complementary color of the first color. As such, the user may be able to easily distinguish the virtual input interface overlapping the input region observed through the optical display 121, from the input region.

Figure 17A:
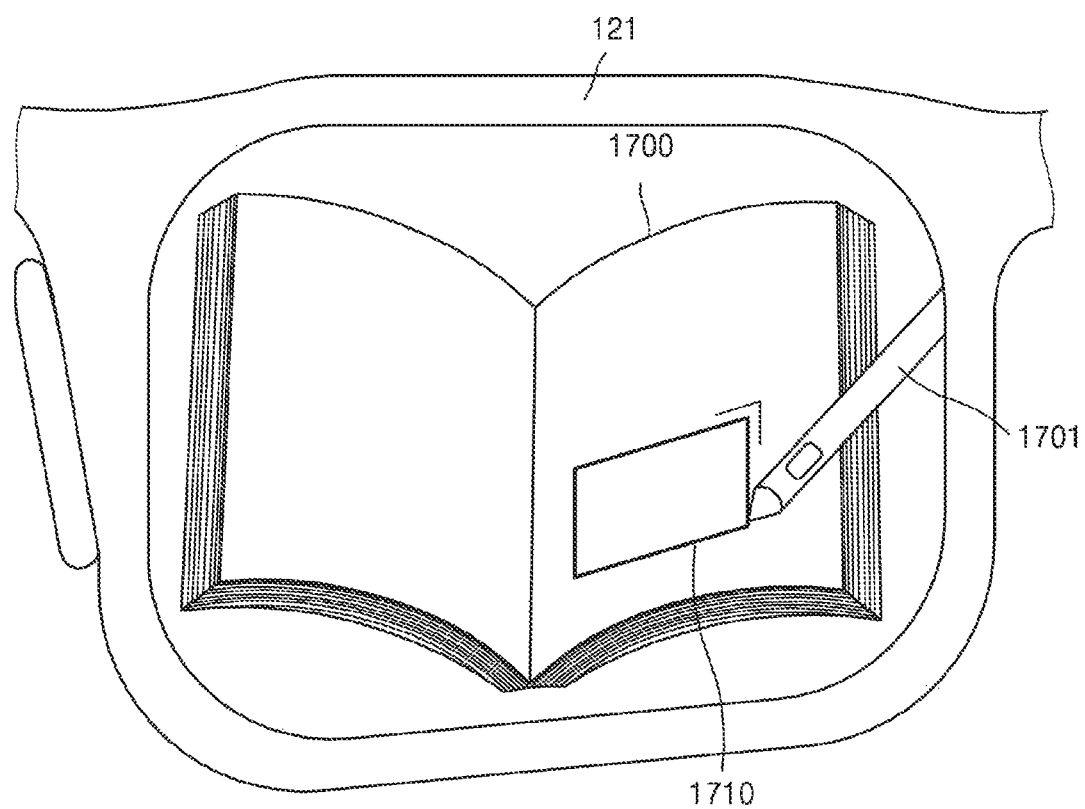
FIGS. 17A through 17C are diagrams describing a virtual input interface provided by a wearable device, the virtual input interface determined based on a type of an actual object where an input region is set, according to an exemplary embodiment.
Figure 17B:
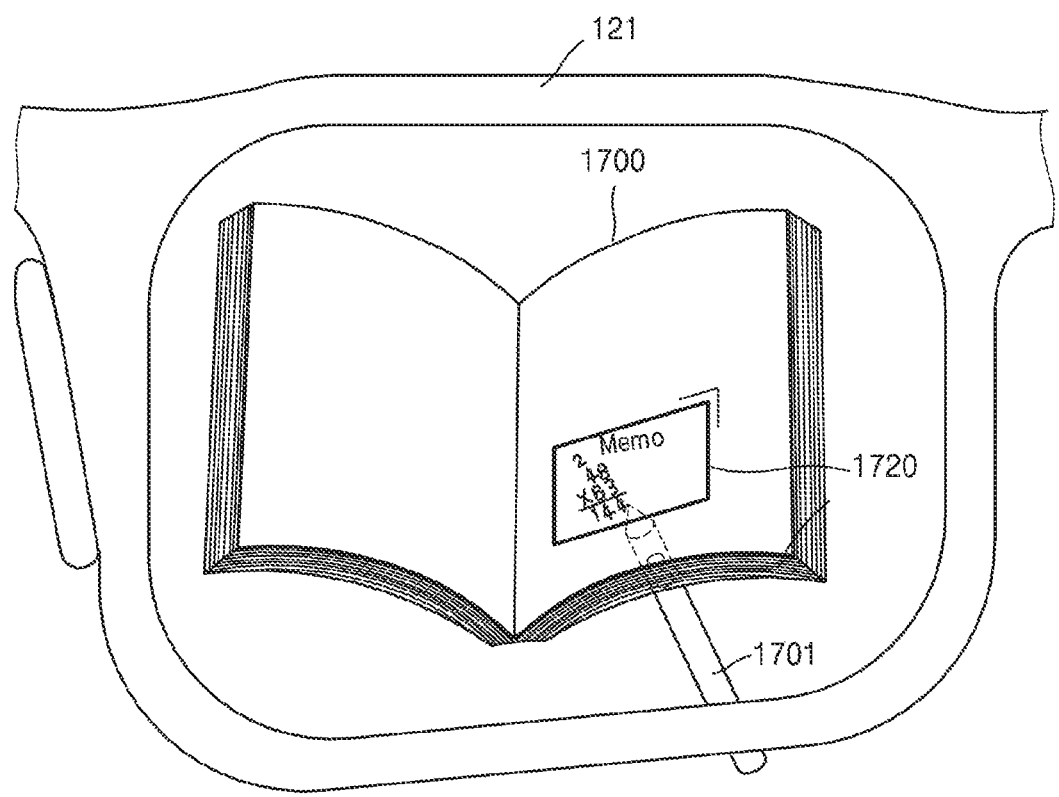
Figure 17C:
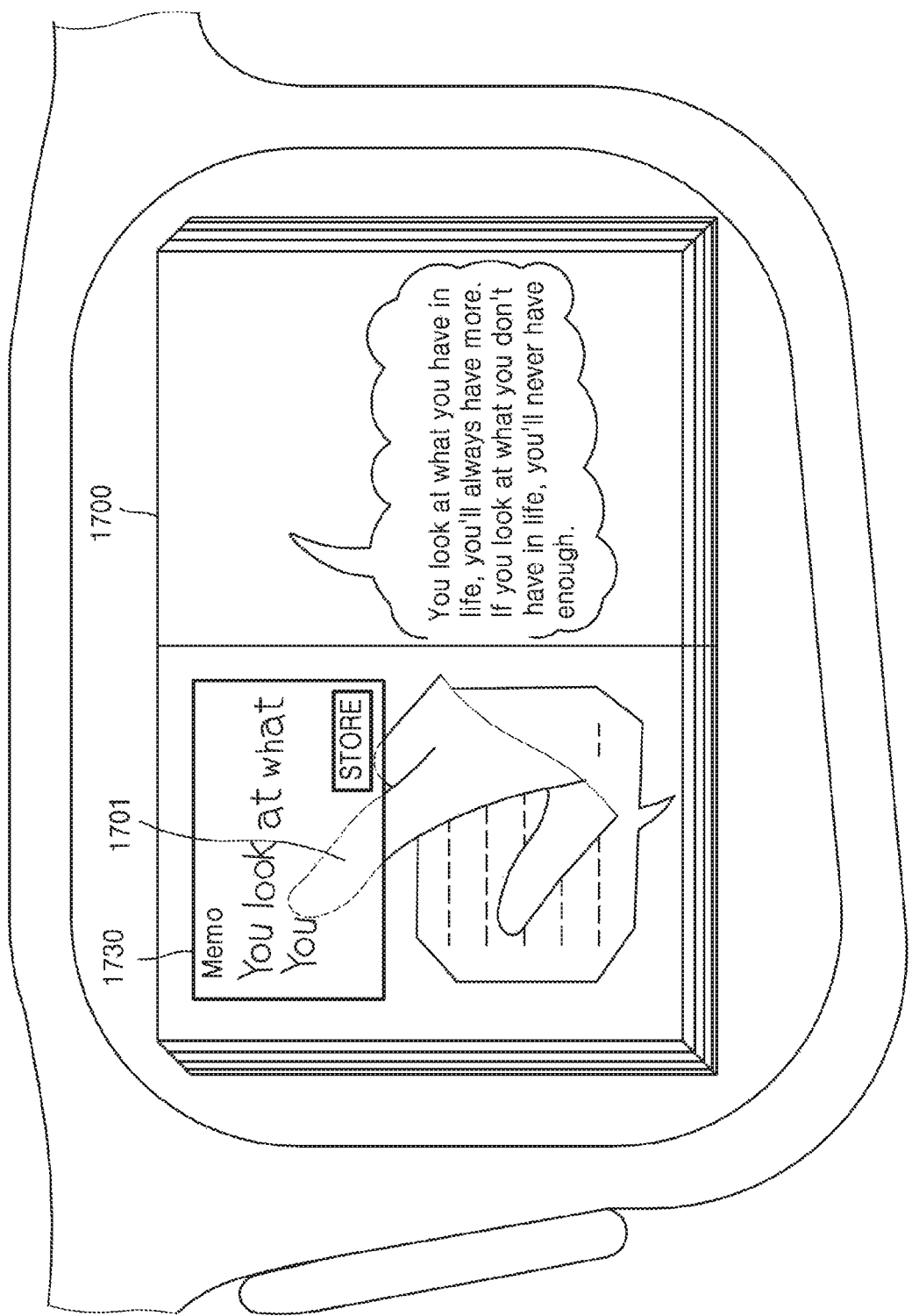

FIGS. 17A through 17C are diagrams describing a virtual input interface provided by the wearable device 100, the virtual input interface determined based on a type of an actual object where an input region is set, according to an exemplary embodiment.

As shown in FIGS. 17A through 17C, it is assumed that the user wearing the wearable device 100 performs a gesture of setting an input region on a book 1700 while reading the book 1700.

The wearable device 100, according to an exemplary embodiment, may recognize a type of an actual object where an input region is set, by using the image sensor 111. For example, as shown in FIG. 17A, the wearable device 100 may detect a gesture of the user drawing a rectangle 1710 on the book 1700 by using an input tool 1701, by using the image sensor 111. At this time, the wearable device 100 may identify that the book 1700 is an actual object on which the input region is drawn via an image process, and accordingly, determine a notepad as a virtual input interface corresponding to the book 1700.

As shown in FIG. 17B, the wearable device 100 may display a virtual notepad 1720 on the optical display 121 such that the virtual notepad 1720 overlaps the input region set on the book 1700 observed through the optical display 121.

Alternatively, the wearable device 100, according to an exemplary embodiment, may set a blank space of the book 1700, in which text or images are not displayed, as the input region via an image process, and display the virtual notepad 1720 on the optical display 121 such that the virtual notepad 1720 overlaps the blank space observed through the optical display 121.

Also, the wearable device 100 may obtain a first depth value of the book 1700 and a second depth value of the input tool 1701, and display an input on the virtual notepad 1720 when it is determined that the input is generated based on the first and second depth values.

Also, as shown in FIG. 17C, the wearable device 100 may store input data 1730 displayed on a virtual notepad based on a user input.

As such, when the user reads the book 1700 while wearing the wearable device 100, the user may easily store important information by using a virtual notepad.

Figure 18A:
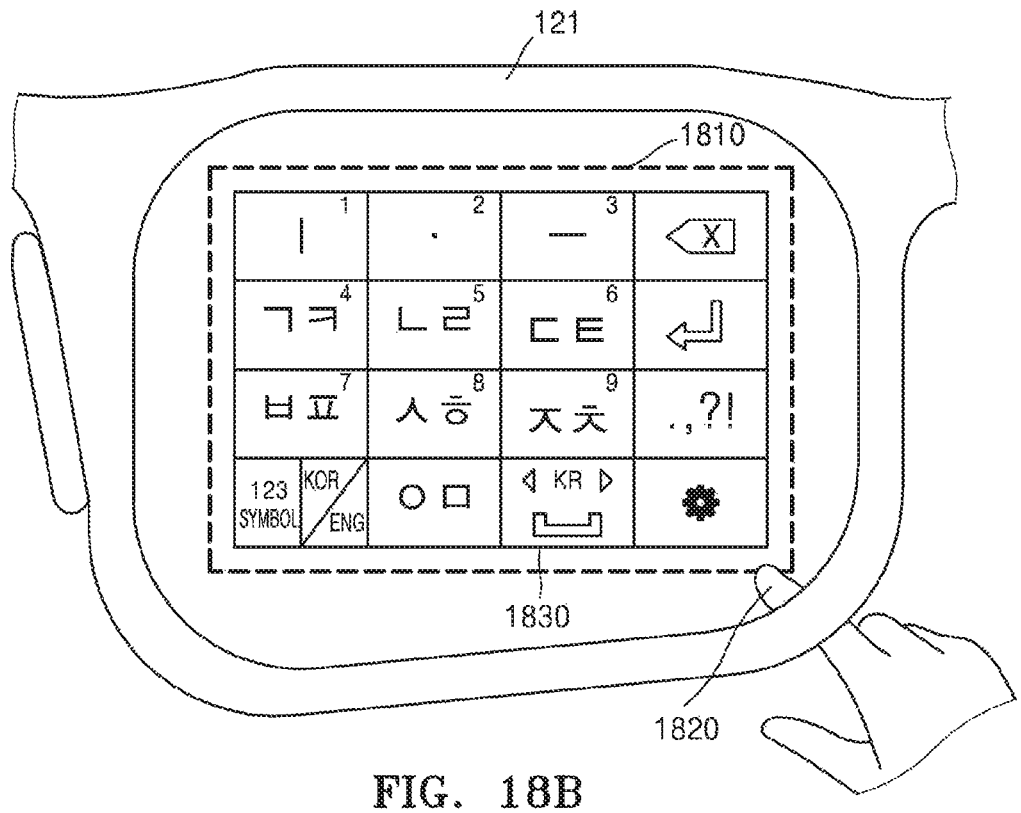
FIGS. 18A and 18B are diagrams describing a virtual input interface, the virtual input interface determined based on an input tool that sets an input region, according to an exemplary embodiment.
Figure 18B:
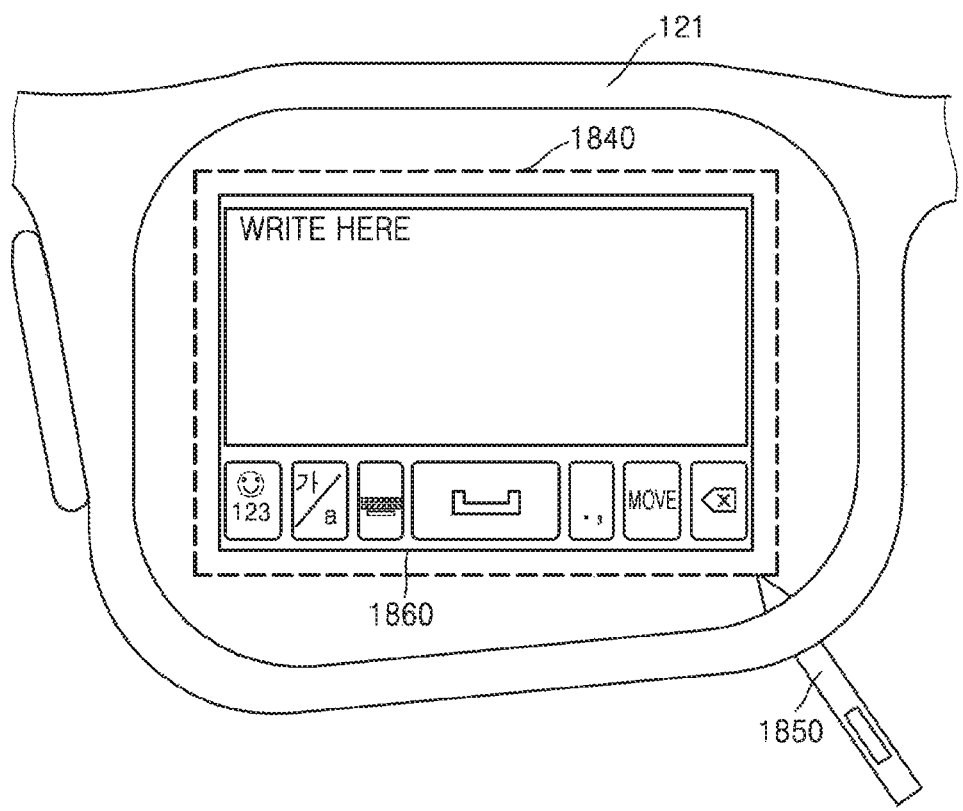

FIGS. 18A and 18B are diagrams describing a virtual input interface, the virtual input interface determined based on an input tool that sets an input region, according to an exemplary embodiment.

Referring to FIGS. 18A and 18B, the user may draw a figure (for example, a rectangle) for setting an input region in the air or on an actual object, by using an input tool, such as a finger or a pen.

The wearable device 100 may recognize a gesture of drawing the rectangle by using the input tool, as a gesture of setting an input region, and set the rectangle drawn in the air or on the actual object as the input region.

When the input region is set, the wearable device 100 may determine a virtual input interface based on the input tool setting the input region.

For example, as shown in FIG. 18A, when a finger 1820 is used as an input tool to set an input region 1810, the wearable device 100 may determine a mobile terminal keyboard 1830 that is easily touched by the finger 1820 as a virtual input interface.

As such, the wearable device 100 may display the mobile terminal keyboard 1830 on the optical display 121 to overlap the input region 1810 observed through the optical display 121. Alternatively, the wearable device 100 may display the mobile terminal keyboard 1830 on an opaque display.

Meanwhile, as shown in FIG. 18B, when a pen 1850 is used as an input tool to set an input region 1840, the wearable device 100 may determine a handwriting input window 1860 easily used by the pen 1850 as a virtual input interface.

As such, the wearable device 100 may display the handwriting input window 1860 on the optical display 121 to overlap the input region 1840 observed through the optical display 121. Alternatively, the wearable device 100 may display the handwriting input window 1860 on an opaque display.

Figure 19:
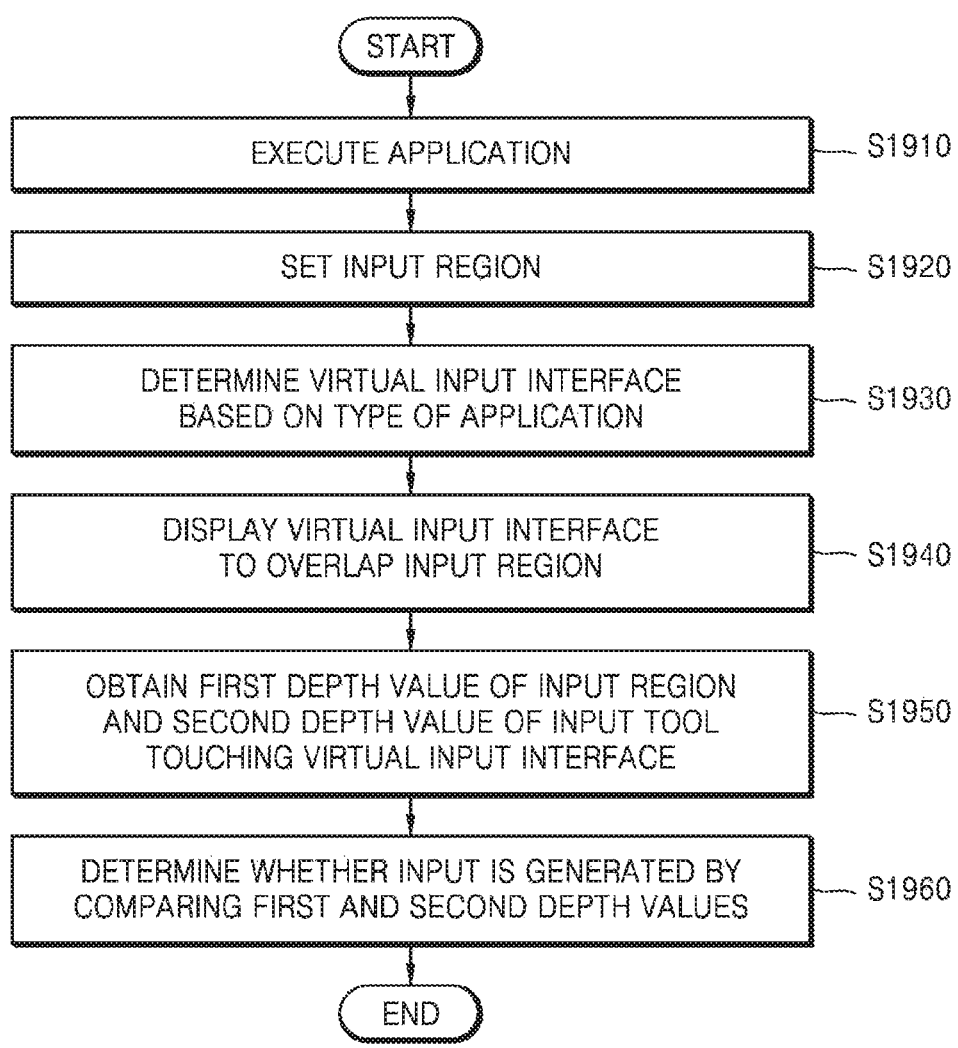
FIG. 19 is a flowchart illustrating a method of providing a virtual input interface determined based on an application being executed by a wearable device, according to an exemplary embodiment.

FIG. 19 is a flowchart illustrating a method of providing a virtual input interface determined based on an application being executed by the wearable device 100, according to an exemplary embodiment.

Referring to FIG. 19, the wearable device 100 may execute an application in operation S1910. For example, the wearable device 100 may select and execute any one of a plurality of applications provided in the wearable device 100. Here, the user may execute an application by using a voice input or a key input.

For example, when a message is to be transmitted to an external device, the wearable device 100 may execute a message application. At this time, the message may be a text message, an instant message, a chatting message, or an email.

Alternatively, the wearable device 100 may receive a message from the external device, and execute the message application in order to respond to or view the received message.

When an application that requires input of text or numbers, such as the message application, is executed (when a virtual input interface is to be displayed), the wearable device 100 may receive a gesture and, in operation S1920, set an input region based on the gesture. Because operation S1920 has been described above in detail with reference to operation S210 of FIG. 2 and FIGS. 3A through 5B, details thereof are not repeated.

In operation S1930, the wearable device 100 may determine a virtual input interface based on a type of the application being executed.

For example, when the message application is executed and a text input is required to prepare a message, the wearable device 100 may determine a virtual keyboard, such as a QWERTY keyboard or a mobile terminal keyboard, as a virtual input interface. Alternatively, when the message application requires a numerical input, such as a phone number of a receiver, the wearable device 100 may determine a virtual dial pad as a virtual input interface, as will be described in detail later with reference to FIGS. 20A and 20B.

The wearable device 100 may display the virtual input interface to overlap the input region, in operation S1940.

Here, the wearable device 100 may display the virtual input interface in the form of AR, MR, or VR.

For example, when the wearable device 100 displays the virtual input interface in the form of AR or MR, the virtual input interface may be displayed on a transparent display to overlap the input region.

Alternatively, when the wearable device 100 displays the virtual input interface in the form of VR, the virtual input interface may be displayed on an opaque display to overlap the input region.

The wearable device 100 may obtain a first depth value of the input region and a second depth value of the input tool touching the virtual input interface, in operation S1950.

The wearable device 100 may determine whether an input is generated through the virtual input interface by comparing the first and second depth values, in operation S1960.

Because operations S1940 through S1960 of FIG. 19 correspond to operations S230 through S250 of FIG. 2, details thereof are not repeated.

Figure 20A:
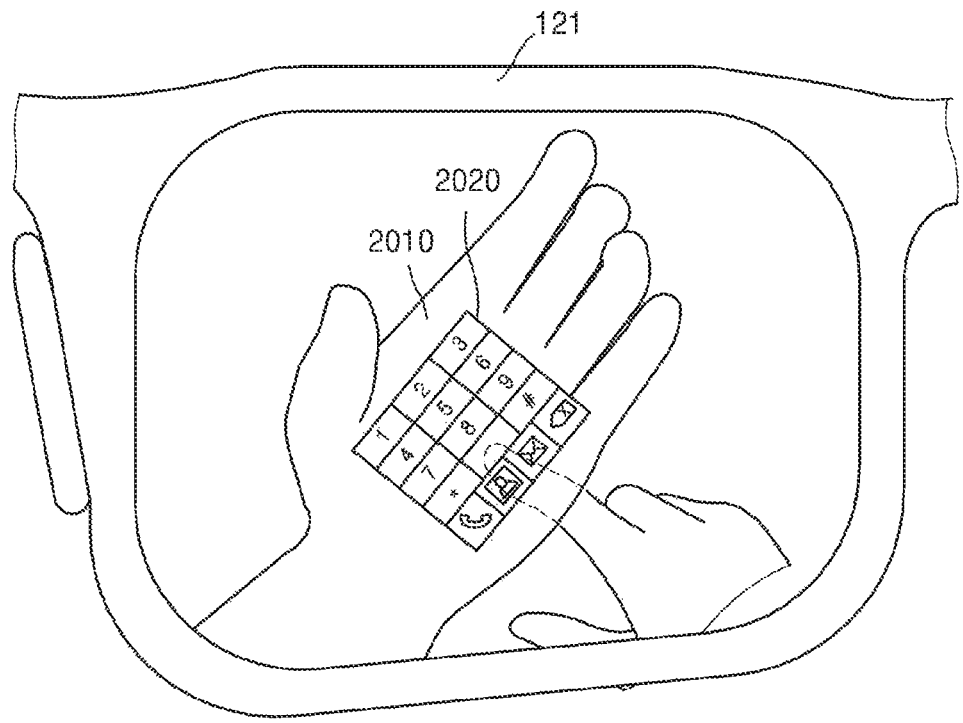
FIGS. 20A and 20B are diagrams describing providing a virtual input interface determined based on a type of an application being executed, according to an exemplary embodiment.
Figure 20B:
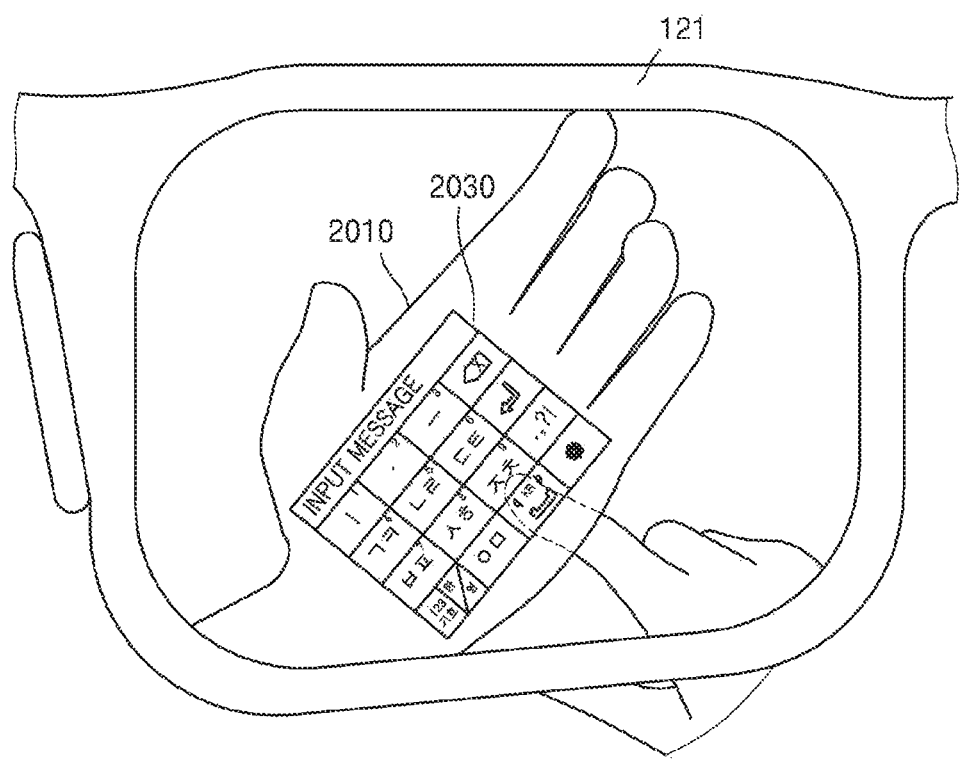

FIGS. 20A and 20B are diagrams describing providing a virtual input interface determined based on a type of an application being executed, according to an exemplary embodiment.

The wearable device 100 may execute a call application based on a user input. For example, the call application may be executed by using a voice input or a key input.

When the call application is executed, the user may set an input region to display a virtual input interface to input a phone number of a person the user wants to call. For example, the wearable device 100 may recognize a gesture of the user drawing the input region on a palm 2010, and set the input region on the palm 2010.

Then, the wearable device 100 may determine a virtual input interface corresponding to the call application being executed, and as shown in FIG. 20A, display a virtual dial pad 2020 that is the virtual input interface on the optical display 121 such that the virtual dial pad 2020 overlaps the palm 2010 observed through the optical display 121.

Alternatively, the wearable device 100 may execute a notepad application based on a user input. For example, the user may execute the notepad application by using a voice input or a key input.

When the notepad application is executed, the user may set an input region to display a virtual input interface for inputting text. For example, the wearable device 100 may recognize a gesture of setting the input region on the palm 2010, and set the input region on the palm 2010.

Then, the wearable device 100 may determine a virtual input interface corresponding to the notepad application, and as shown in FIG. 20B, display a virtual mobile terminal keyboard 2030 that is the virtual input interface on the optical display 121, such that the virtual mobile terminal keyboard 2030 overlaps the palm 2010 observed through the optical display 121. However, an exemplary embodiment is not limited thereto.

Figure 21:
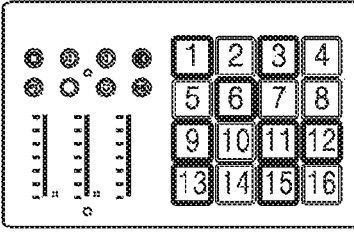
FIG. 21 is a diagram describing a virtual input interface determined based on a type of content being executed, according to an exemplary embodiment.
Figure 21:
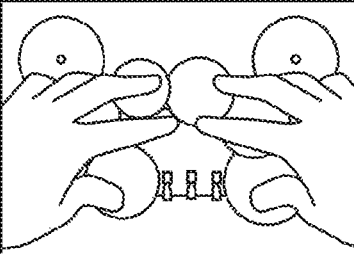
Figure 21:
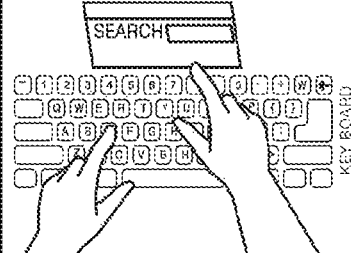

FIG. 21 is a diagram describing a virtual input interface determined based on a type of content being executed, according to an exemplary embodiment.

The wearable device 100, according to an exemplary embodiment, may determine a virtual input interface to be displayed based on a type of content being executed by the wearable device 100.

Examples of the content include a still image, a moving image, text, and a webpage, but are not limited thereto. For example, the content may be educational content, movie content, broadcast content, game content, commercial content, picture content, or news content.

Executing of content may mean that the content is displayed, output, or reproduced.

Referring to FIG. 21, the wearable device 100 may detect a gesture setting an input region while executing game content 2110. At this time, the wearable device 100 may display a virtual game control panel 2115 corresponding to the game content 2110 on a transparent or opaque display to overlap the input region.

Alternatively, the wearable device 100 may detect a gesture setting an input region while executing music content 2120, such as drum playing content. At this time, the wearable device 100 may display a drum playing panel 2125 corresponding to the music content 2120 on a transparent or opaque display to overlap the input region.

Alternatively, the wearable device 100 may detect a gesture setting an input region while displaying a webpage 2130. At this time, the wearable device 100 may display a virtual keyboard 2135 to search for information from the webpage 2130 on a transparent or opaque display to overlap the input region.

FIGS. 22A through 23B are diagrams describing virtual input interfaces that are same as previous virtual input interfaces provided when the wearable device 100 recognizes actual objects where the previous virtual input interfaces were provided, according to exemplary embodiments.

Figure 22A:
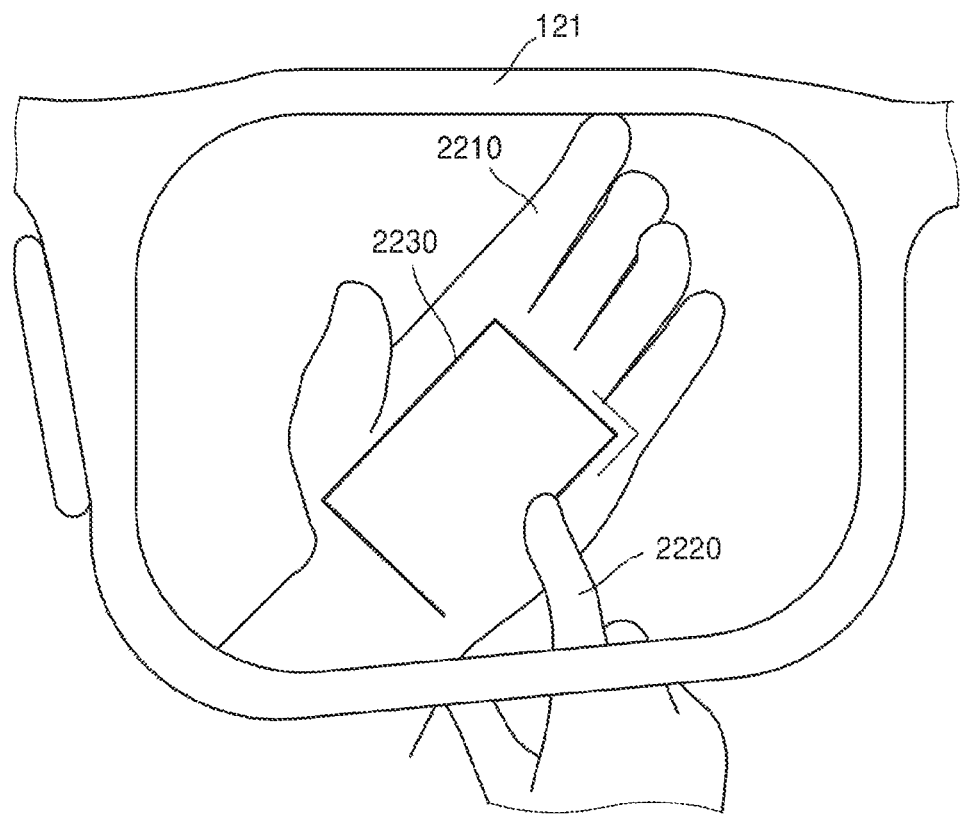
FIGS. 22A through 23B are diagrams describing virtual input interfaces that are the same as previous virtual input interfaces provided when a wearable device recognizes actual objects where the previous virtual input interfaces were provided, according to exemplary embodiments.

As shown in FIG. 22A, when the user draws a rectangle 2230 on a palm 2210 by using a finger 2220, the wearable device 100 may recognize a gesture of drawing the rectangle 2230 by using the image sensor 111, and set a region corresponding to the rectangle 2230 as an input region.

Here, the wearable device 100 may determine a type of a virtual input interface to be displayed, based on a type of an application currently being executed. For example, when a notepad application that requires a text input is being executed, the wearable device 100 may determine a mobile terminal keyboard 2250 as the virtual input interface, but an exemplary embodiment is not limited thereto.

Figure 22B:
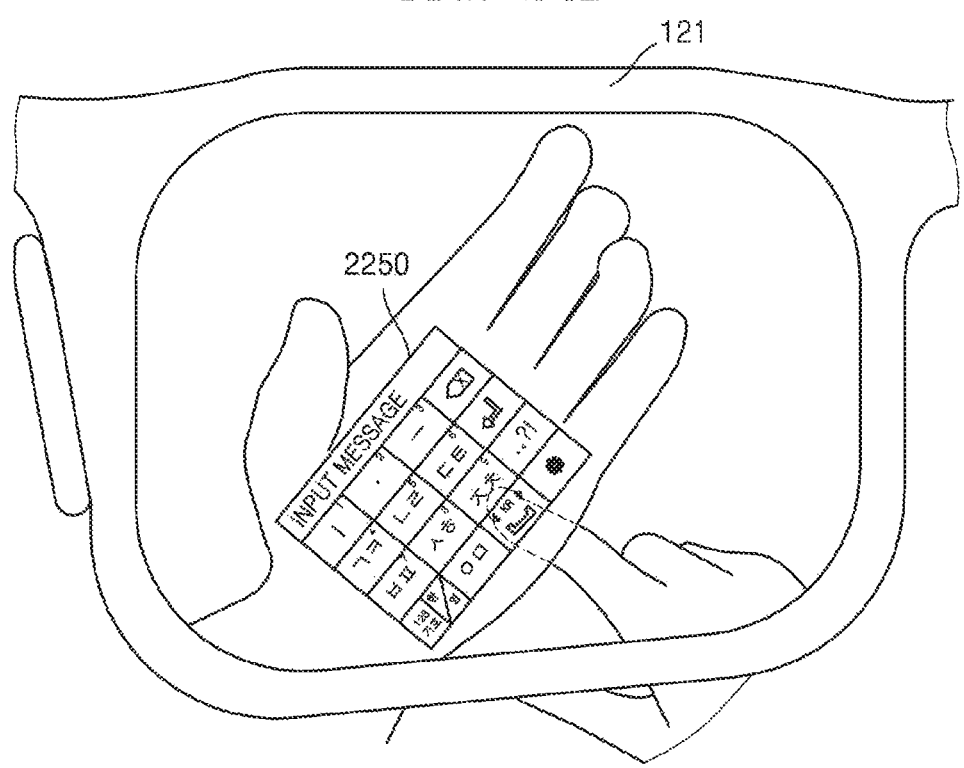

As shown in FIG. 22B, the wearable device 100 may display the mobile terminal keyboard 2250 on the optical display 121 such that the mobile terminal keyboard 2250 overlaps a rectangular region observed through the optical display 121. Alternatively, the wearable device 100 may display the mobile terminal keyboard 2250 on an opaque display.

Then, the wearable device 100 may recognize an object that is the same as an actual object (the palm 2210 of FIG.

22B) on which the virtual input interface was provided, while executing the notepad application.

Figure 23A:
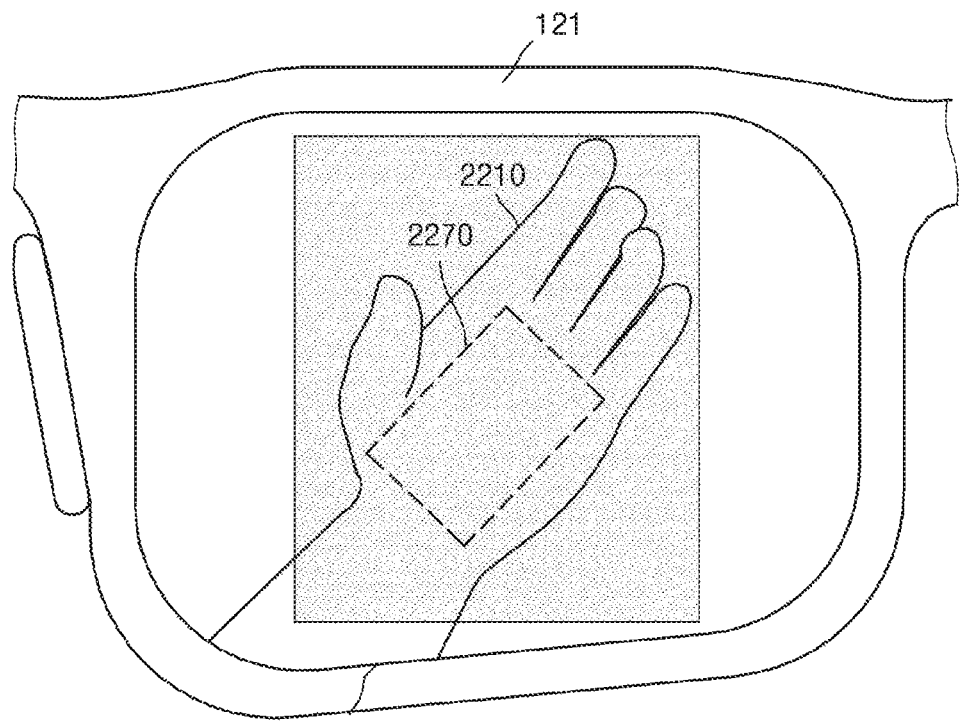

For example, as shown in FIG. 23A, the wearable device 100 may detect the palm 2210 of the user by using the image sensor 111. At this time, the wearable device 100 may identify that the palm 2210 is the actual object (the palm 2210 of FIG. 22B) on which the virtual input interface was provided, via an image process.

Figure 23B:
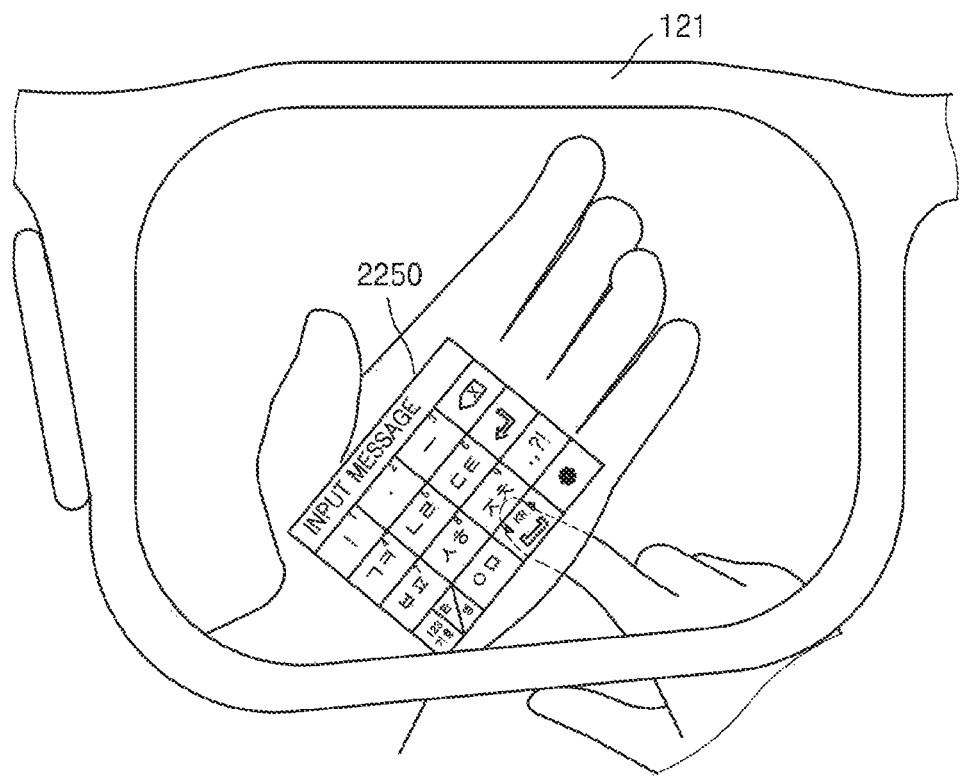

When the actual object is recognized, the wearable device 100 may provide a virtual input interface the same as that previously provided in the input region, as shown in FIG. 23B.

For example, the wearable device 100 may display the mobile terminal keyboard 2250 previously provided on the optical display 121 to overlap an input region 2270 observed through the optical display 121, even when the user does not draw a rectangle by using an input tool to set an input region.

As such, the user may enable the wearable device 100 to recognize an actual object where a virtual input interface was displayed such that the wearable device 100 provides a virtual input interface that was provided.

Figure 24:
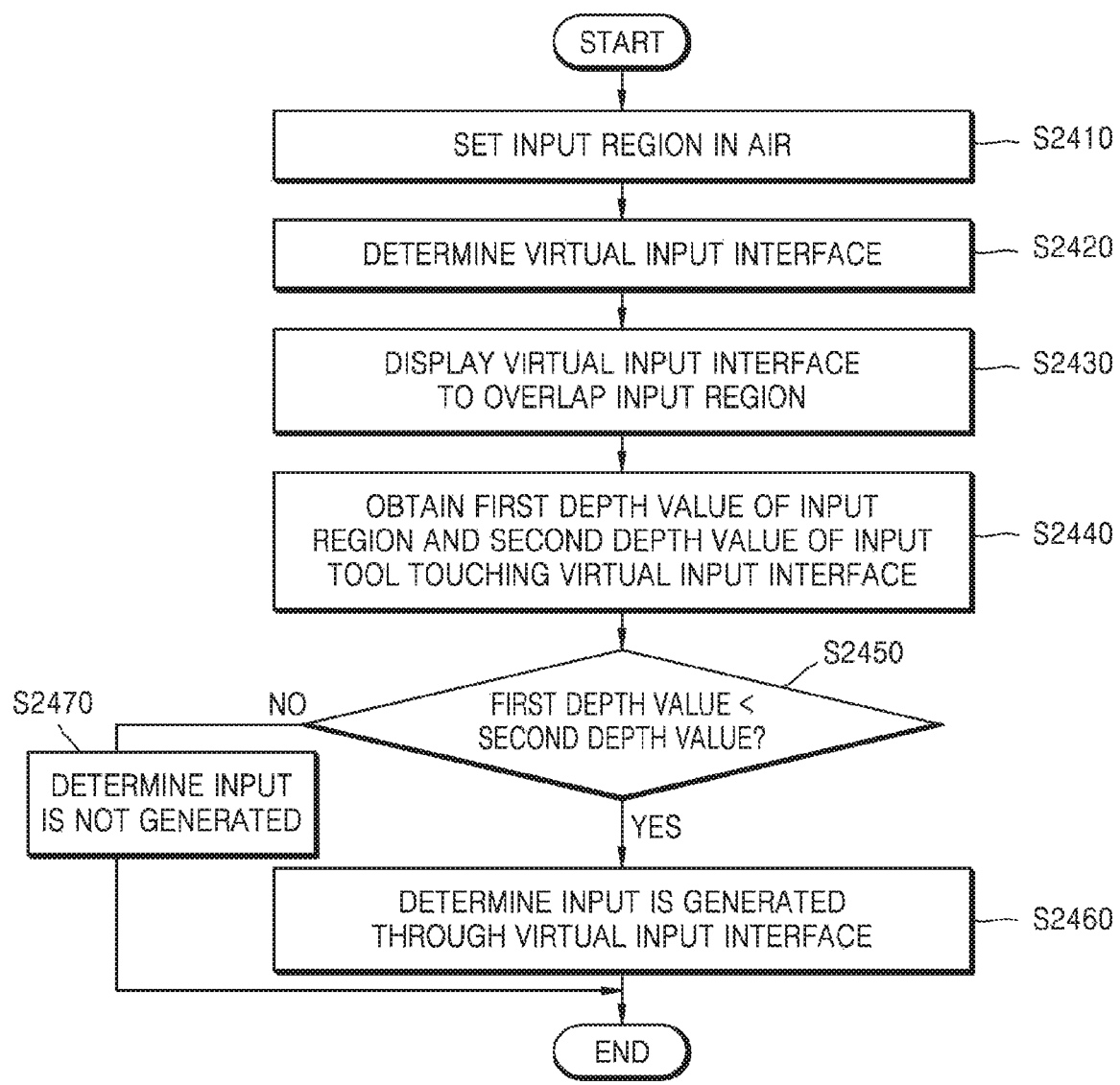
FIG. 24 is a flowchart illustrating a method of providing a virtual input interface in an input region set in the air, according to an exemplary embodiment.

FIG. 24 is a flowchart illustrating a method of providing a virtual input interface in an input region set in the air, according to an exemplary embodiment.

Referring to FIG. 24, the wearable device 100 may set an input region in the air in operation S2410. For example, as described above with reference to FIG. 3A, the wearable device 100 may recognize a figure drawn by the user in the air by using an input tool, such as a finger, a pen, a stylus or a stick, and set a region corresponding to the figure as an input region.

The wearable device 100 may determine a virtual input interface in operation S2420.

For example, the wearable device 100 may determine the virtual input interface based on attributes of the input region. The wearable device 100 may determine the virtual input interface to be displayed on the optical display 121 based on at least one of a size of the input region, a shape of the input region, a distance between the input region and the wearable device 100 (a first depth value of the input region), and a gesture of setting the input region.

Alternatively, the wearable device 100 may determine the virtual input interface based on a type of application or content being executed. For example, when the application being executed requires a text input, the wearable device 100 may determine a virtual keyboard, such as a QWERTY keyboard or a mobile terminal keyboard, as the virtual input interface. Alternatively, when the application being executed requires a numerical input, the wearable device 100 may determine a virtual dial pad as the virtual input interface.

In operation S2430, wearable device 100 may display the virtual input interface to overlap the input region.

At this time, the wearable device 100 may display the virtual input interface in the form of AR, MR, or VR.

For example, when the virtual input interface is displayed in the form of AR or MR, the wearable device 100 may display the virtual input interface on a transparent display such that the virtual input interface overlaps the input region (a 2D or 3D space of the real world) observed through the transparent display.

Alternatively, when the virtual input interface is displayed in the form of VR, the wearable device 100 may capture a first image (an actual image) including the input region (the 2D or 3D space of the real world), and generate a second image by adding the virtual input interface (a virtual image) to the input region of the first image. The wearable device 100 may display the second image in which the virtual input interface overlaps the input region on an opaque display.

The wearable device 100 may obtain a first depth value of the input region and a second depth value of the input tool touching the virtual input interface, in operation S2440.

The wearable device 100 may measure a distance (a depth value of the input region, i.e., the first depth value) from the wearable device 100 to the input region by using the depth sensor 112.

For example, when the input region is set in the air, the wearable device 100 may obtain the first depth value of the input region by measuring a depth value of the input tool setting the input region in the air.

Meanwhile, if the input region is on an uneven surface and the input region does not exist on the same plane, there may be a plurality of depth values of the input region. When there are the plurality of depth values of the input region, the first depth value may be one of an average depth value of the plurality of depth values, a minimum depth value of the plurality of depth values, or a maximum depth value of the plurality of depth values, but is not limited thereto.

Also, the wearable device 100 may measure a distance (a depth value of the input tool, i.e., the second depth value) from the wearable device 100 to the input tool touching the virtual input interface, by using the depth sensor 112.

When the input tool is a 3D object, there may be a plurality of depth values of the input tool. When there are a plurality of values of the input tool, the second depth value may be one of an average depth value of the plurality of depth values, a minimum depth value of the plurality of depth values, or a maximum depth value of the plurality of depth values, but is not limited thereto.

For example, when the virtual input interface is touched by using the input tool, a point (an end point of the input tool) where the input tool and the virtual input interface contact each other may be the second depth value.

Also, the wearable device 100 may track the input tool that is moving in real-time by using the depth sensor 112, and calculate the second depth value that changes in real-time.

The wearable device 100 may compare the first and second depth values in operation S2450.

For example, the wearable device 100 may determine whether the second depth value is greater than the first depth value, and when it is determined that the second depth value is greater than the first depth value, determine that an input is generated through the virtual input interface, in operation S2460.

However, when it is determined that the second depth value is smaller than the first depth value, the wearable device 100 may determine that an input is not generated through the virtual input interface, in operation S2470.

The determining of whether an input is generated will now be described in detail with reference to FIGS. 25A and 25B.

Figure 25A:
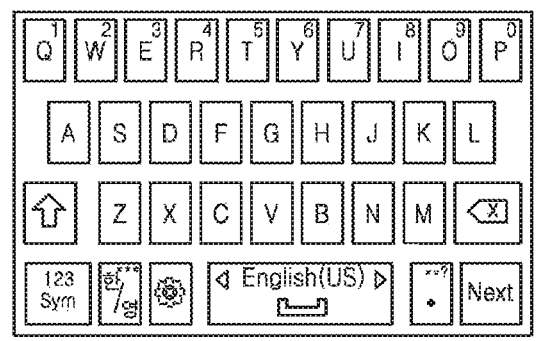
FIGS. 25A and 25B are diagrams describing a method of determining whether an input is generated through a virtual input interface, when an input region is set in the air.
Figure 25A:
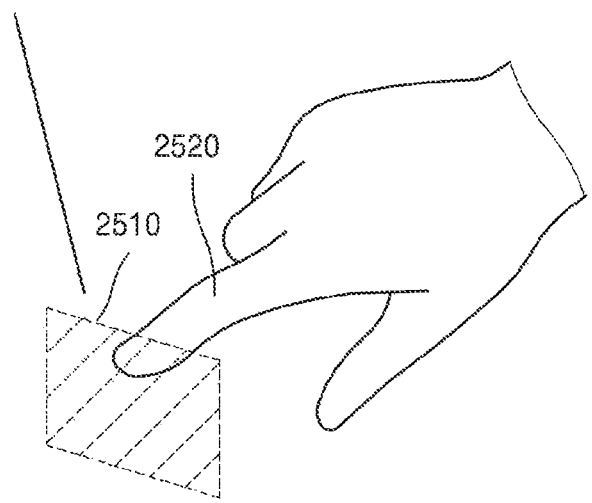
Figure 25B:
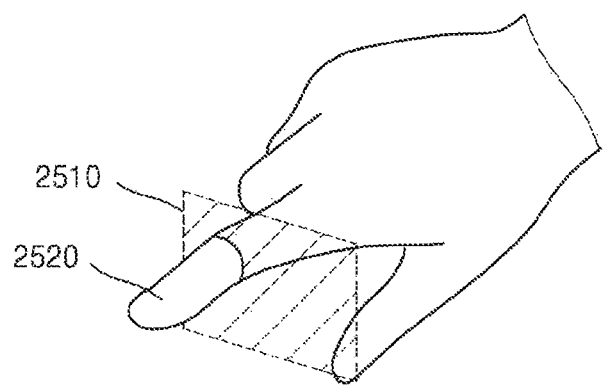

FIGS. 25A and 25B are diagrams describing a method of determining whether an input is generated through a virtual input interface, when an input region is set in the air.

Referring to FIGS. 25A and 25B, the wearable device 100 may display a virtual keyboard 2510 on a transparent or opaque display such that the virtual keyboard 2510 overlaps an input region set in the air.

The wearable device 100 may also measure a first depth value of the virtual keyboard 2510 by using the depth sensor 112.

Meanwhile, even when the user wearing the wearable device 100 moves, the wearable device 100 is able to display the virtual keyboard 2510 on the transparent or opaque display such that the virtual keyboard 2510 continuously overlaps the input region having the first depth value. For example, even when the user is walking, the wearable device 100 may adjust the virtual keyboard 2510 to be continuously displayed in a region away from the wearable device 100 by a certain distance (the first depth value) by using the depth sensor 112.

Also, referring to FIGS. 25A and 25B, the user may input data by touching the virtual keyboard 2510 in the air, by using a finger 2520.

Here, the wearable device 100 may determine whether an input is generated through the virtual keyboard 2510 by measuring a depth value (a second depth value) of the finger 2520 touching the virtual keyboard 2510.

For example, as shown in FIG. 25A, the finger 2520 may approach the virtual keyboard 2510 in order to select a button displayed on the virtual keyboard 2510. At this time, when the finger 2520 does not pass through the input region where the virtual keyboard 2510 is displayed, the second depth value of the finger 2520 may be smaller than the first depth value.

When the second depth value of the finger 2520 is smaller than the first depth value, the wearable device 100 may recognize that the user is not touching the virtual keyboard 2510, and determine that an input is not generated through the virtual keyboard 2510.

On the other hand, as shown in FIG. 25B, when the finger 2520 passes through the input region where the virtual keyboard 2510 is displayed, the second depth value of the finger 2520 may be greater than the first depth value.

When the second depth value of the finger 2520 is greater than the first depth value, the wearable device 100 may recognize that the user is touching the virtual keyboard 2510.

When it is determined that the user is touching the virtual keyboard 2510, the wearable device 100 may detect a location of the finger 2520 on the virtual keyboard 2510 by using the image sensor 111. The wearable device 100 may determine input data of the user based on the detected location of the finger 2520. For example, when the finger 2520 is passing through an "enter" button on the virtual keyboard 2510, the wearable device 100 may determine that the user selected the "enter" button.

According to an exemplary embodiment, the wearable device 100 may accurately determine whether an input is generated through a virtual input interface provided in the air by comparing a first depth value of an input region set in the air to a second depth value of an input tool (for example, a finger or a pen) touching the virtual input interface.

Figure 26:
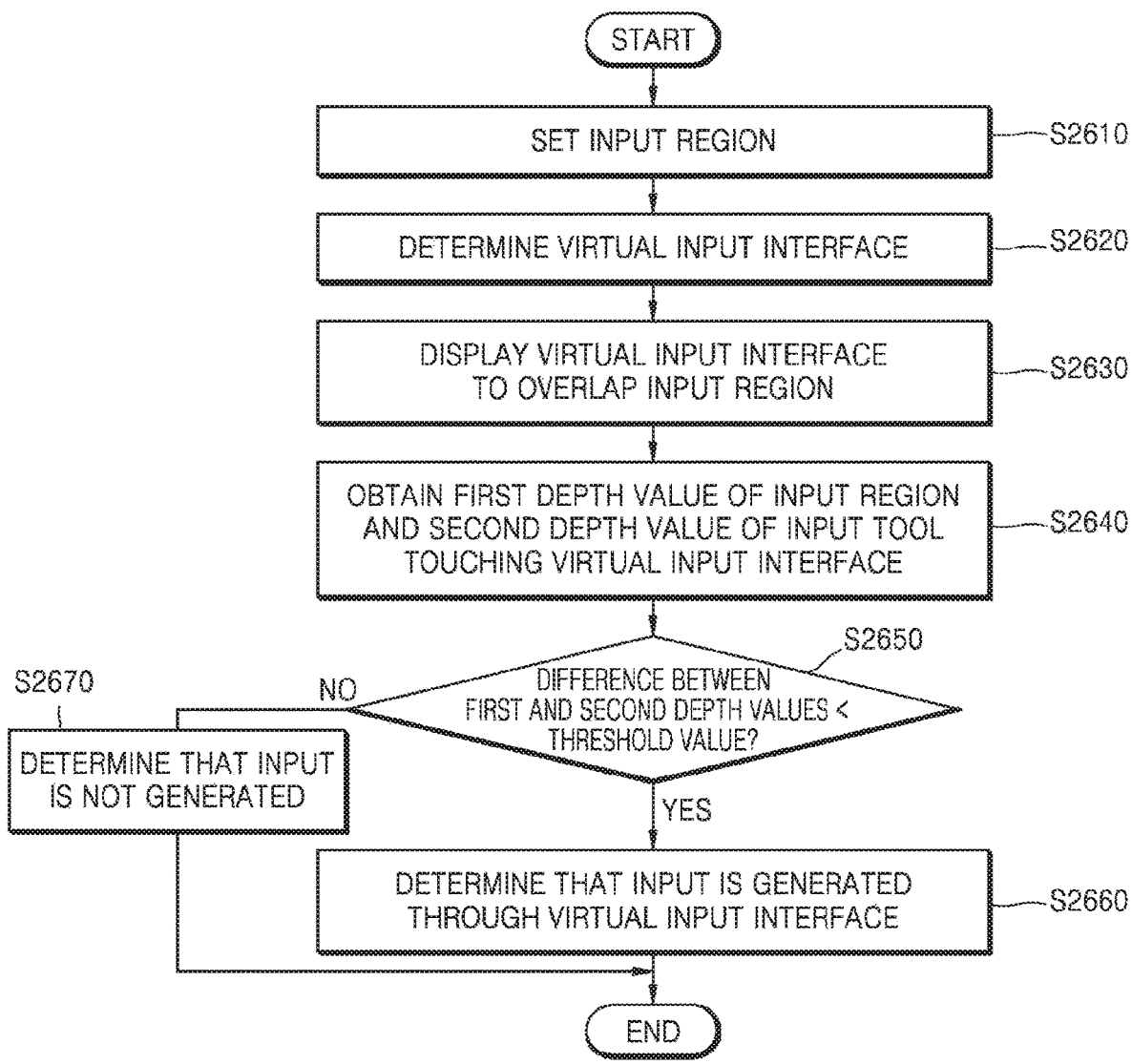
FIG. 26 is a flowchart illustrating a method of providing a virtual input interface in an input region set in the air or on an actual object, according to an exemplary embodiment.

FIG. 26 is a flowchart illustrating a method of providing a virtual input interface in an input region set in the air or on an actual object, according to an exemplary embodiment.

Referring to FIG. 26, the wearable device 100 may set an input region in the air or on an actual object, in operation S2610. For example, as described above with reference to FIG. 3, the wearable device 100 may recognize a figure drawn by the user in the air or on the actual object, such as a palm, a desk, or a wall, by using an input tool, such as a finger, a pen, a stylus or a stick, and set a region corresponding to the figure as the input region.

Alternatively, as described above with reference to FIG. 4, the wearable device 100 may recognize a pre-set object, and set a region corresponding to the pre-set object as the input region.

Alternatively, as described above with reference to FIG. 5, the wearable device 100 may recognize an operation of the user touching a pre-set object by using the input tool, and set a region corresponding to the touched pre-set object as the input region.

The wearable device 100 may determine a virtual input interface, in operation S2620.

For example, the wearable device 100 may determine the virtual input interface based on attributes of the input region. The wearable device 100 may determine the virtual input interface to be displayed on the optical display 121 based on at least one of a size of the input region, a shape of the input region, a distance (a first depth value of the input region) between the input region and the wearable device 100, a type of the actual object where the input region is set, and a gesture of setting the input region.

Alternatively, the wearable device 100 may determine the virtual input interface based on a type of application or content being executed. For example, when the application being executed requires a text input, the wearable device 100 may determine a virtual keyboard, such as a QWERTY keyboard or a mobile terminal keyboard, as the virtual input interface. Alternatively, when the application being executed requires a numerical input, the wearable device 100 may determine a virtual dial pad as the virtual input interface.

The wearable device 100 may display the virtual input interface to overlap the input region, in operation S2630.

At this time, the wearable device 100 may display the virtual input interface in the form of AR, MR, or VR.

For example, when the wearable device 100 displays the virtual input interface in the form of AR or MR, the wearable device 100 may display the virtual input interface on a transparent display such that the virtual input interface overlaps the input region.

Alternatively, when the wearable device 100 displays the virtual input interface in the form of VR, the wearable device 100 may display the virtual input interface on an opaque display such that the virtual input interface overlaps the input region.

Because operation S2630 of FIG. 26 is the same as operation S2430 of FIG. 24, details thereof are not repeated.

The wearable device 100 may obtain a first depth value of the input region and a second depth value of the input tool touching the virtual input interface, in operation S2640.

For example, when the input region is set in the air, the wearable device 100 may obtain the first depth value of the input region by measuring a depth value of the input tool while setting the input region in the air.

Alternatively, when the input region is set on an actual object, the wearable device 100 may obtain the first depth value of the input region by measuring a depth value of the actual object (a distance from the wearable device 100 to the actual object).

Also, the wearable device 100 may measure a distance (a depth value of the input tool, i.e., the second depth value) from the wearable device 100 to the input tool touching the virtual input interface by using the depth sensor 112.

Also, the wearable device 100 may track the input tool that is moving in real-time and calculate the second depth value in real-time, by using the depth sensor 112.

In operation S2650, the wearable device 100 may compare a difference between the first and second values with a threshold value.

For example, in operation S2660, the wearable device 100 may determine whether the difference is smaller than the threshold value, and when it is determined that the difference is smaller than the threshold value, determine that an input is generated through the virtual input interface.

In operation S2670, when it is determined that the difference is equal to or greater than the threshold value, the wearable device 100 may determine that an input is not generated through the virtual input interface.

The determining of whether an input is generated will now be described in detail with reference to FIGS. 27A and 27B.

Figure 27A:
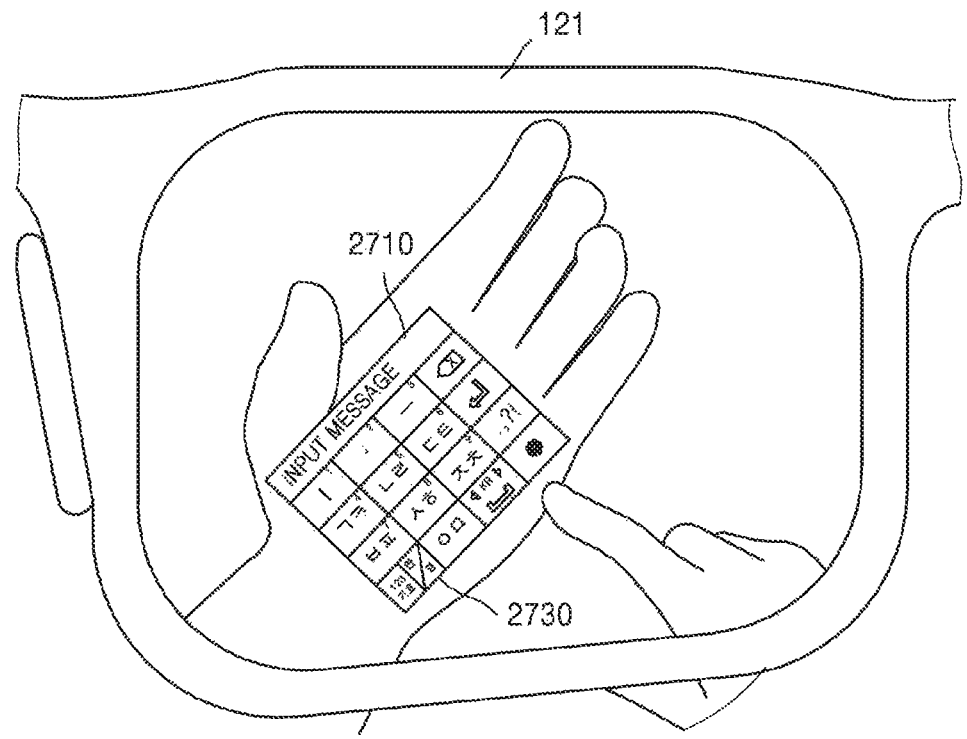
FIGS. 27A and 27B are diagrams describing a method of determining whether an input is generated through a virtual input interface, when an input region is set on an actual object.
Figure 27B:
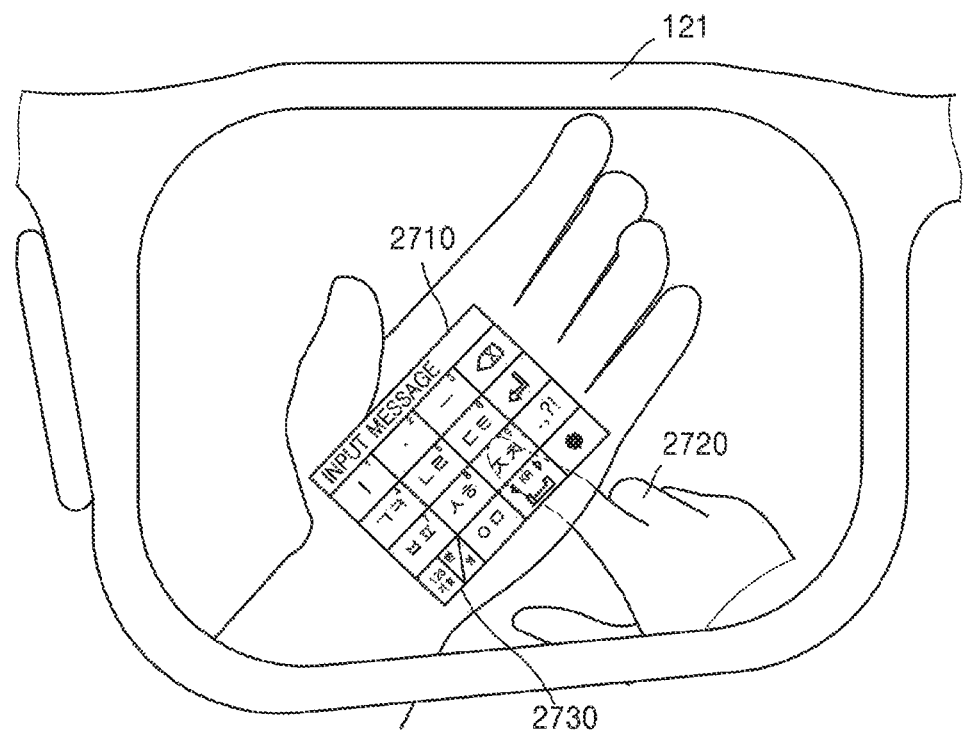

FIGS. 27A and 27B are diagrams describing a method of determining whether an input is generated through a virtual input interface, when an input region is set on an actual object.

Referring to FIGS. 27A and 27B, the wearable device 100 may display a virtual keyboard 2730 on the optical display 121 such that the virtual keyboard 2730 overlaps an actual object, such as a palm 2710, observed through the optical display 121.

Also, the wearable device 100 may measure a first depth value of the palm 2710 by using the depth sensor 112.

Meanwhile, the wearable device 100 may track the palm 2710 in real-time, even if a location of the palm 2710 changes, and continuously adjust the virtual keyboard 2730 to overlap the palm 2710 observed through the optical display 121 by continuously calculating the first depth value as it changes in real-time.

Also, referring to FIG. 27B, the user may input data by touching the virtual keyboard 2730 shown on the palm 2710 by using a finger 2720.

At this time, the wearable device 100 may measure a depth value (a second depth value) of the finger 2720 touching the virtual keyboard 2730 to determine whether an input is generated through the virtual keyboard 2730.

As shown in FIG. 27A, when the finger 2720 is away from the palm 2710 by at least a certain distance, the wearable device 100 may determine that an input is not generated through the virtual keyboard 2730.

For example, when a difference between the first depth value of the palm 2710 where the virtual keyboard 2730 is shown and the second depth value of the finger 2720 is equal to or greater than a threshold value, it may be determined that the user is not touching the virtual keyboard 2730, and that an input is not generated through the virtual keyboard 2730.

As shown in FIG. 27B, the user may approach the finger 2720 near the virtual keyboard 2730 to select a button displayed on the virtual keyboard 2730. Here, when the difference between the first and second depth values is smaller than the threshold value, it may be determined that the user is touching the virtual keyboard 2730.

Also, when the difference between the first and second depth values is smaller than the threshold value, the wearable device 100 may detect a location of the finger 2720 on the virtual keyboard 2730 by using the image sensor 111. The wearable device 100 may determine input data based on the location of the finger 2720. For example, when the finger 2720 passes through an "enter" button on the virtual keyboard 2730, the wearable device 100 may determine that the user selected the "enter" button.

According to an exemplary embodiment, the wearable device 100 may accurately determine whether an input is generated through a virtual input interface provided in the air, or on an actual object, by comparing a first depth value of an input region set by the user in the air or on the actual object and a second depth value of an input tool (for example, a finger or a pen) touching the virtual input interface.

Figure 28A:
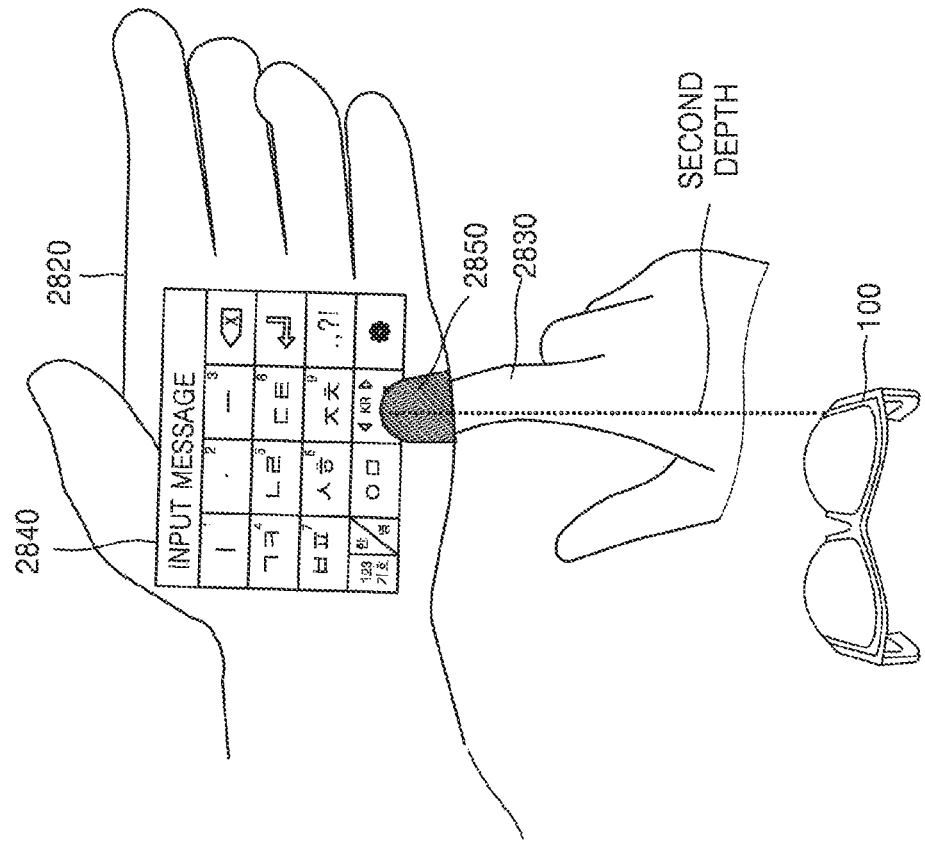
FIGS. 28A and 28B are diagrams describing a method of obtaining a first depth value of an input region and a second depth value of an input tool, according to an exemplary embodiment.
Figure 28B:
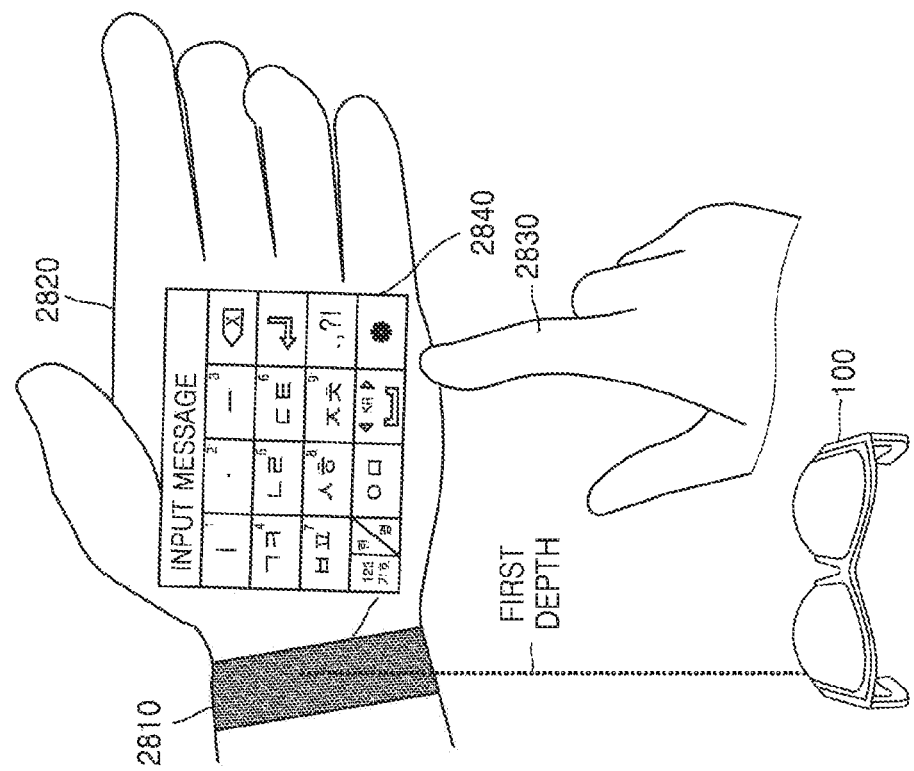

FIGS. 28A and 28B are diagrams describing a method of obtaining a first depth value of an input region and a second depth value of an input tool, according to an exemplary embodiment.

As shown in FIGS. 28A and 28B, it is assumed that a virtual keyboard is displayed by using a palm of a user as an input region, when a keyboard input is required.

Referring to FIG. 28A, the user may set an input region on a left palm 2820 while wearing the wearable device (the first wearable device) 100 in a glasses type, and may be wearing a second wearable device 2810 on a left wrist. Here, the second wearable device 2810 may be wearable on a wrist of the user, like a watch, a bracelet, or a band, but is not limited thereto.

The second wearable device 2810 may include a location sensor, and may sense location information of the second wearable device 2810 by using the location sensor. Also, the first and second wearable devices 100 and 2810 may transmit and receive data to and from each other by including a communicator, and the second wearable device 2810 may transmit the sensed location information of the second wearable device to the first wearable device 100.

Meanwhile, the first wearable device 100 may include a location sensor, and may sense location information of the first wearable device 100 by using the location sensor.

The first wearable device 100 may compare the sensed location information of the first wearable device 100 with the received location information of the second wearable device 2810 to calculate a distance between the first and second wearable devices 100 and 2810.

A distance between the left wrist wearing the second wearable device 2810 and the first wearable device 100 may be similar to a distance between the left palm 2820, set as an input region where a virtual keyboard 2840 is displayed, and the first wearable device 100. Accordingly, the first wearable device 100 may determine the distance between the first and second wearable devices 100 and 2810 as a first depth value.

As such, the first wearable device 100 may accurately obtain the first depth value by using the location information of the second wearable device 2810.

Also, the second wearable device 2810 may include a motion sensor, and recognize a touch input by detecting motion, such as vibration, generated when the left palm 2820 is touched, by using the motion sensor. When the touch input is recognized, the second wearable device 2810 may transmit data about the touch input to the first wearable device 100 through the communicator. Accordingly, the first wearable device 100 may accurately recognize that the touch input is generated by using sensing information of the second wearable device 2810.

Meanwhile, referring to FIG. 28B, the user may set the input region on the left palm 2820 while wearing the first wearable device 100 in a glasses type, and may be wearing a third wearable device 2850 on a right finger 2830. Here, the third wearable device 2850 may be wearable on a finger, like a thimble or a ring, but is not limited thereto.

The third wearable device 2850 may include a location sensor, and sense location information of the third wearable device 2850 by using the location sensor.

Also, the first and third wearable devices 100 and 2850 may transmit and receive data to and from each other by using an included communicator, and the third wearable device 2850 may transmit the sensed location information of the third wearable device 2850 to the first wearable device 100.

The first wearable device 100 may include a location sensor, and may sense the location information of the first wearable device 100 by using the location sensor.

The first wearable device 100 may compare the sensed location information of the first wearable device 100 with the received location information of the third wearable device 2850 to calculate a distance between the first and third wearable devices 100 and 2850.

As shown in FIG. 28B, when the right finger 2830 wearing the third wearable device 2850, such as a thimble, is used as an input tool touching the virtual keyboard 2840, a depth value of the third wearable device 2850 may be a depth value of the right finger 2830, and the distance between the first and third wearable devices 100 and 2850 may be determined as a second depth value.

As such, the first wearable device 100 may accurately obtain the second depth value by using the location information of the third wearable device 2850.

Also, the third wearable device 2850 may include a pressure sensor, and may recognize a touch input by detecting pressure generated when the left palm 2820 is touched, by using the pressure sensor. When the touch input is recognized, the third wearable device 2850 may transmit data about the touch input to the first wearable device 100 through the communicator. As such, the first wearable device 100 may accurately recognize whether the touch input is generated by using sensing information of the third wearable device 2850.

Figure 29:
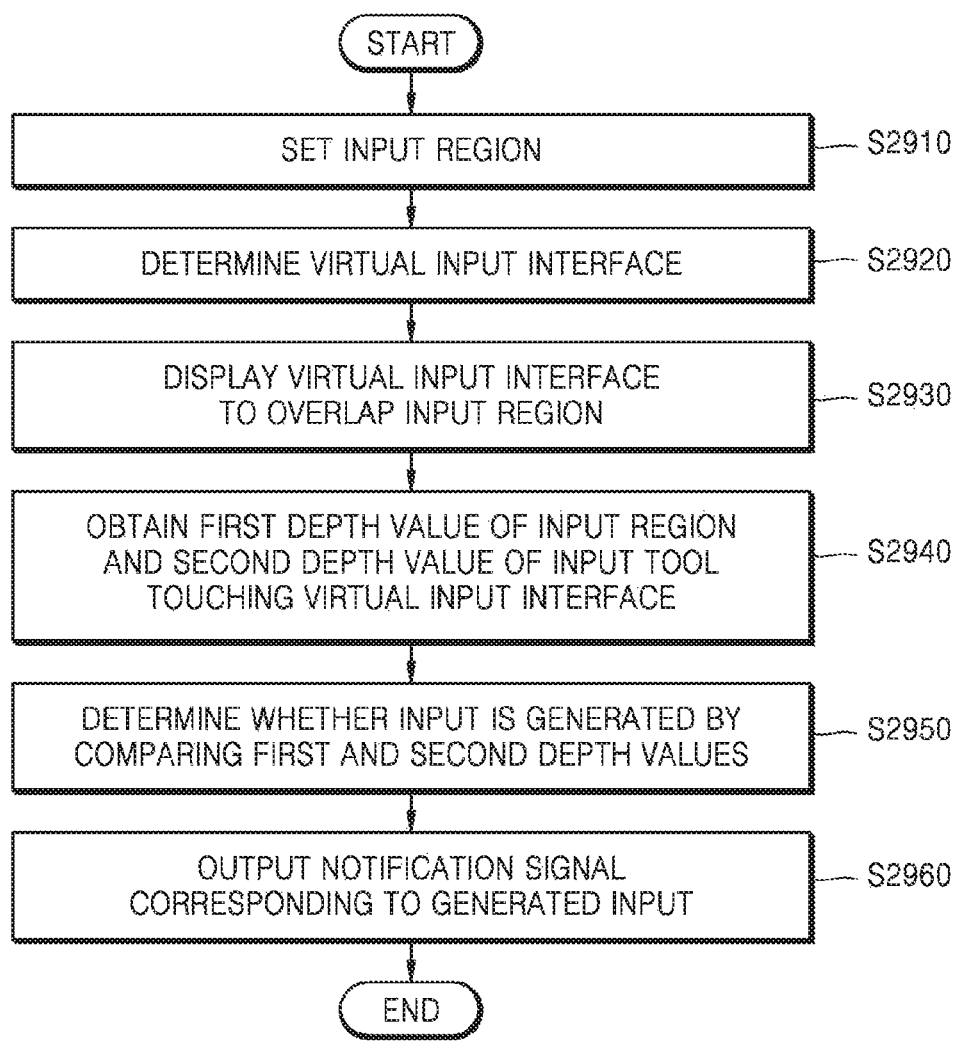
FIG. 29 is a flowchart illustrating a method of providing feedback about whether an input is generated through a virtual input interface, according to an exemplary embodiment.

FIG. 29 is a flowchart illustrating a method of providing feedback about whether an input is generated through a virtual input interface, according to an exemplary embodiment.

Referring to FIG. 29, the wearable device 100 may set an input region, in operation S2910.

When the input region is set, the wearable device 100 may determine a virtual input interface in operation S2920.

For example, the wearable device 100 may determine the virtual input interface based on attributes of the input region. The wearable device 100 may determine the virtual input interface to be displayed on the optical display 121 based on at least one of a size of the input region, a shape of the input region, a distance (a first depth value of the input region) between the input region and the wearable device 100, and a gesture of setting the input region.

Alternatively, the wearable device 100 may determine the virtual input interface based on a type of application or content being executed. For example, when an application being executed requires a text input, the wearable device 100 may determine a virtual keyboard, such as a QWERTY keyboard or a mobile terminal keyboard, as the virtual input interface. Alternatively, when an application being executed requires a numerical input, the wearable device 100 may determine a virtual dial pad as the virtual input interface.

In operation S2930, the wearable device 100 may display the virtual input interface to overlap the input region.

At this time, the wearable device 100 may display the virtual input interface in the form of AR, MR, or VR.

For example, when the wearable device 100 displays the virtual input interface in the form of AR or MR, the virtual input interface may be displayed on a transparent display to overlap the input region.

Alternatively, when the wearable device 100 displays the virtual input interface in the form of VR, the virtual input interface may be displayed on an opaque display to overlap the input region.

The wearable device 100 may obtain the first depth value of the input region and a second depth value of an input tool touching the virtual input interface, in operation S2940.

The wearable device 100 may determine whether an input is generated through the virtual input interface by comparing the first and second depth values, in operation S2950.

Because operations S2930 through S2950 of FIG. 29 correspond to operations S230 through S250 of FIG. 2, additional details thereof are not repeated.

In operation S2960, when it is determined that an input is generated through the virtual input interface, the wearable device 100 may output a notification signal corresponding to the generated input. Examples of the notification signal include a video signal, an audio signal, and a haptic signal, but are not limited thereto.

The outputting of the notification signal will be described in detail with reference to FIGS. 30 through 32.

Figure 30:
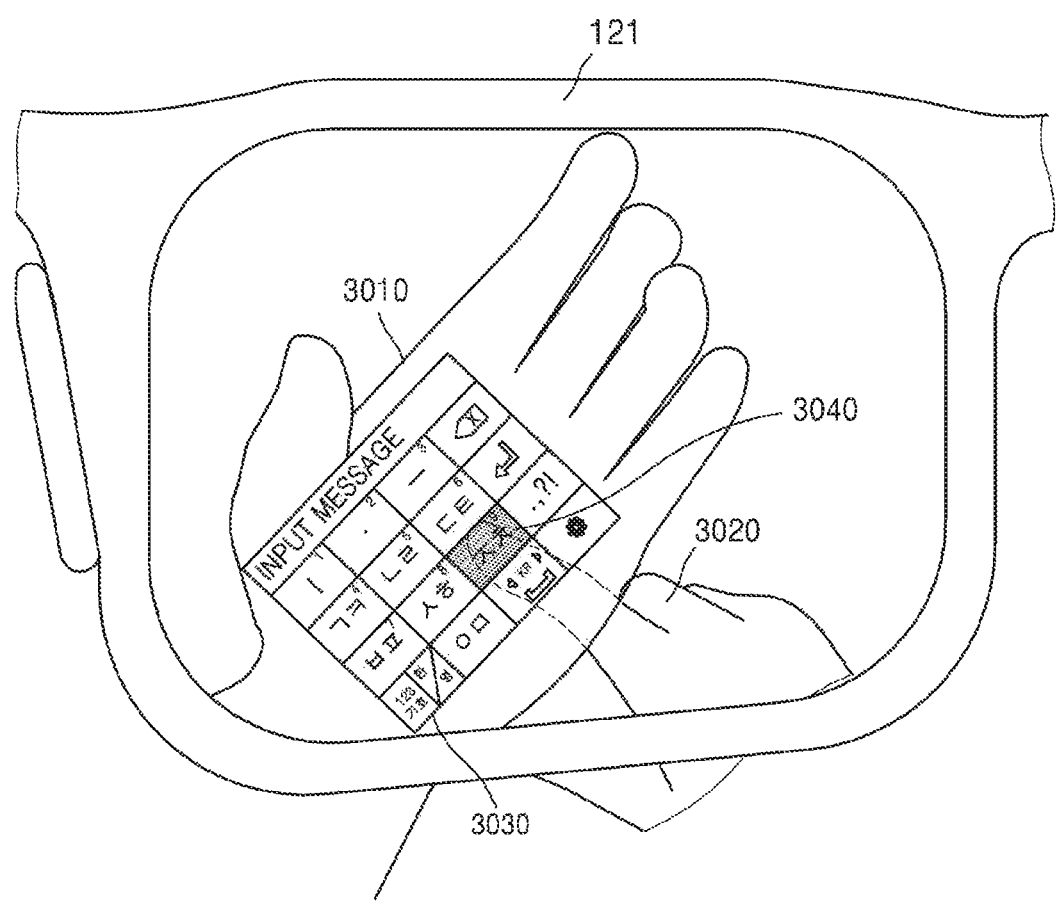
FIGS. 30 and 31 are diagrams describing outputting notification signals corresponding to whether inputs are generated by wearable devices, according to exemplary embodiments.
Figure 31:
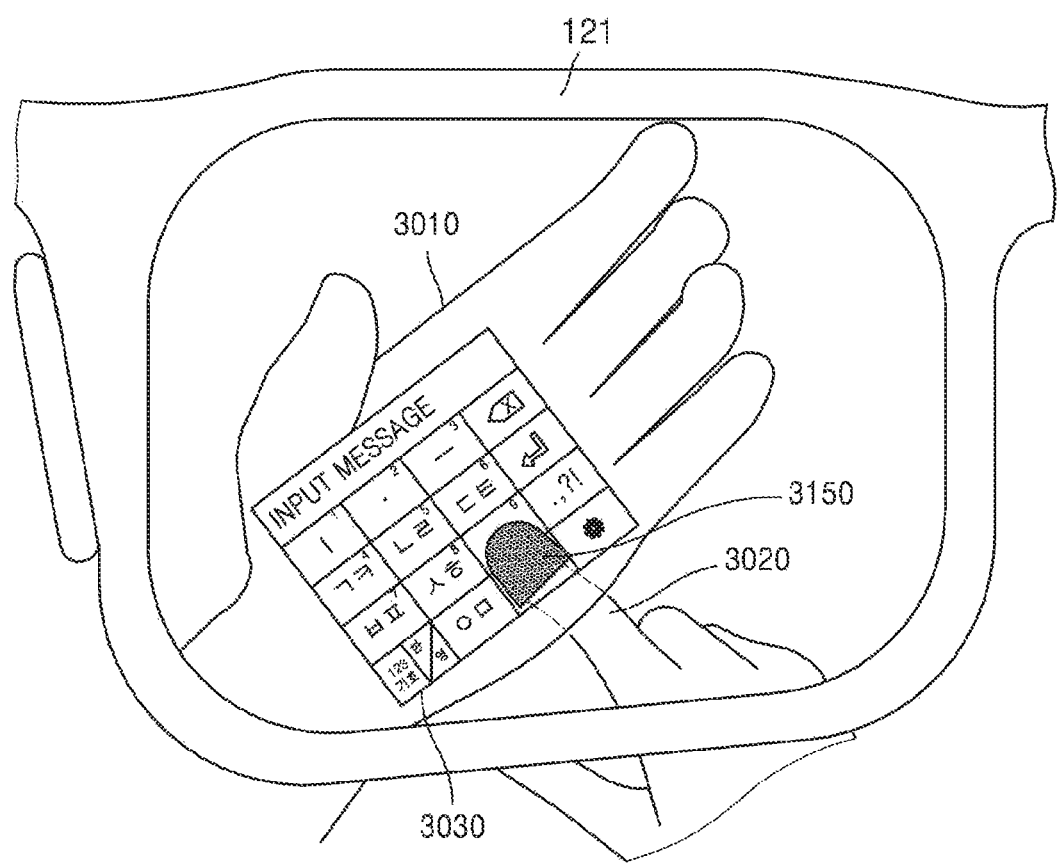

FIGS. 30 and 31 are diagrams describing outputting notification signals corresponding to whether inputs are generated by wearable devices, according to exemplary embodiments.

As shown in FIGS. 30 and 31, the wearable device 100 may recognize a gesture setting an input region on a palm 3010, and display a virtual keyboard 3030 on the optical display 121 to overlap the palm 3010 observed through the optical display 121.

At this time, the user may touch a button displayed on the virtual keyboard 3030 by using a finger 3020 to generate an input.

The wearable device 100 may compare a depth value (a second depth value) of the finger 3020 with a depth value (a first depth value) of the finger 3010 and determine that the input is generated by the finger 3020 when a difference between the first and second depth values is smaller than a threshold value.

When the input is generated, the wearable device 100 may detect a location of the finger 3020 on the virtual keyboard 3030, and generate input data about a button 3040 at the location of the finger 3020. Also, the wearable device 100 may provide feedback to the user such that the user easily recognizes the input.

For example, a color of the button 3040 may be changed. Alternatively, when the input is generated through the virtual keyboard 3030, an alarm may be output.

Alternatively, when an input is generated through a virtual input interface, the wearable device 100 may output a haptic signal by using a peripheral device.

As shown in FIG. 31, the user may be wearing a second wearable device 3150 on the finger 3020 touching the virtual keyboard 3030. Here, the second wearable device 3150 may be wearable on the finger 3020, such as a thimble or a ring, but is not limited thereto, as long as the second wearable device 3150 is wearable.

Also, the second wearable device 3150 may include a haptic module. The haptic module may generate various tactile effects. An example of the tactile effect generated by the haptic module includes a vibration effect. When the haptic module generates vibration as a tactile effect, strength and pattern of the vibration may be changed, and different types of vibration may be output, either in combination or sequentially.

When an input is generated on a button displayed on the virtual keyboard 3030, the wearable device 100 may request the second wearable device 3150 to output a haptic signal through a communicator.

Then, in response, the second wearable device 3150 may output a haptic signal through the haptic module.

Figure 32:
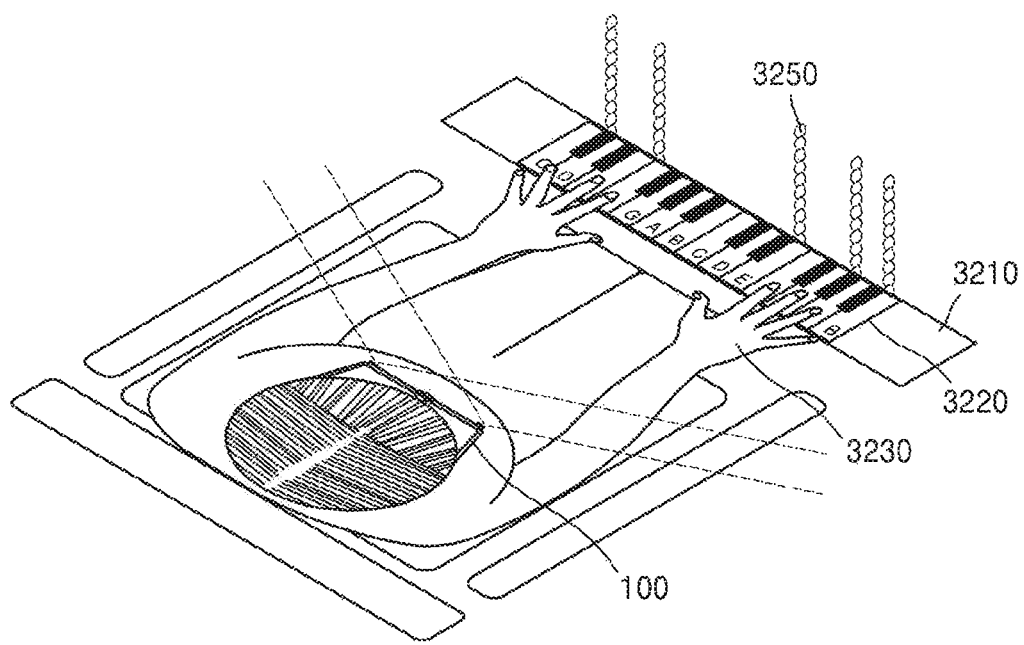
FIG. 32 is a diagram describing outputting of a notification signal corresponding to whether an input is generated through a virtual input interface, according to an exemplary embodiment.

FIG. 32 is a diagram describing outputting of a notification signal corresponding to whether an input is generated through a virtual input interface, according to an exemplary embodiment.

As shown in FIG. 32, the wearable device 100 may recognize a gesture of a user setting an input region on a desk 3210, and display a virtual plano keyboard 3220 on a transparent or opaque display to overlap the desk 3210.

At this time, the user may generate an input by touching the virtual plano keyboard 3220 by using a finger 3230.

The wearable device 100 may compare a depth value (a second depth value) of the finger 3230 with a depth value (a first depth value) of the desk 3210, and determine that an input is generated by the finger 3230 when a difference between the first and second depth values is smaller than a threshold value.

When it is determined that an input is generated, the wearable device 100 may detect a location of the finger 3230 on the virtual plano keyboard 3220, and display a virtual image 3250 on the virtual plano keyboard 3220 at the location of the finger 3230. As such, the user may easily recognize that the input is generated at a location where the virtual image 3250 is displayed.

Figure 33:
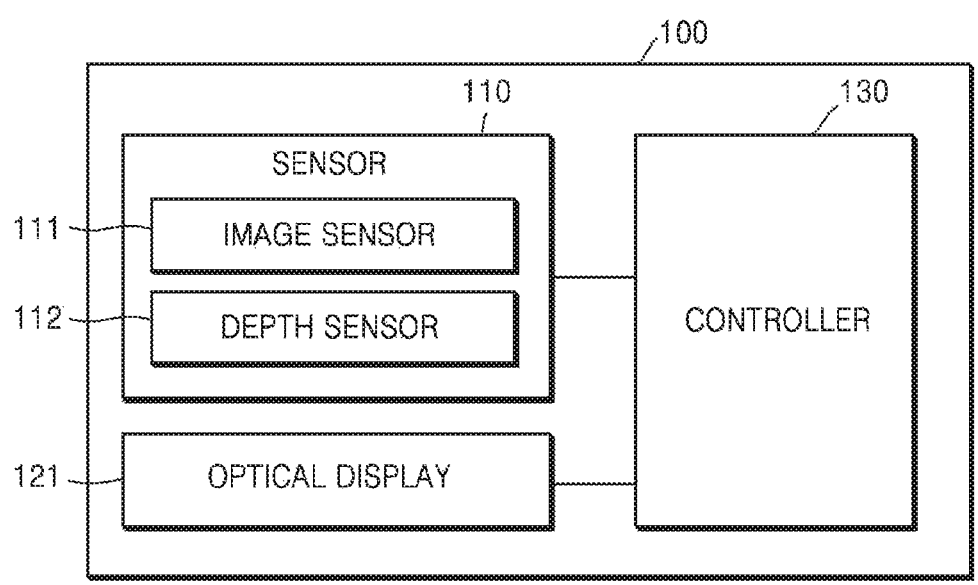
FIGS. 33 and 34 are block diagrams of a wearable device according to exemplary embodiments.
Figure 34:
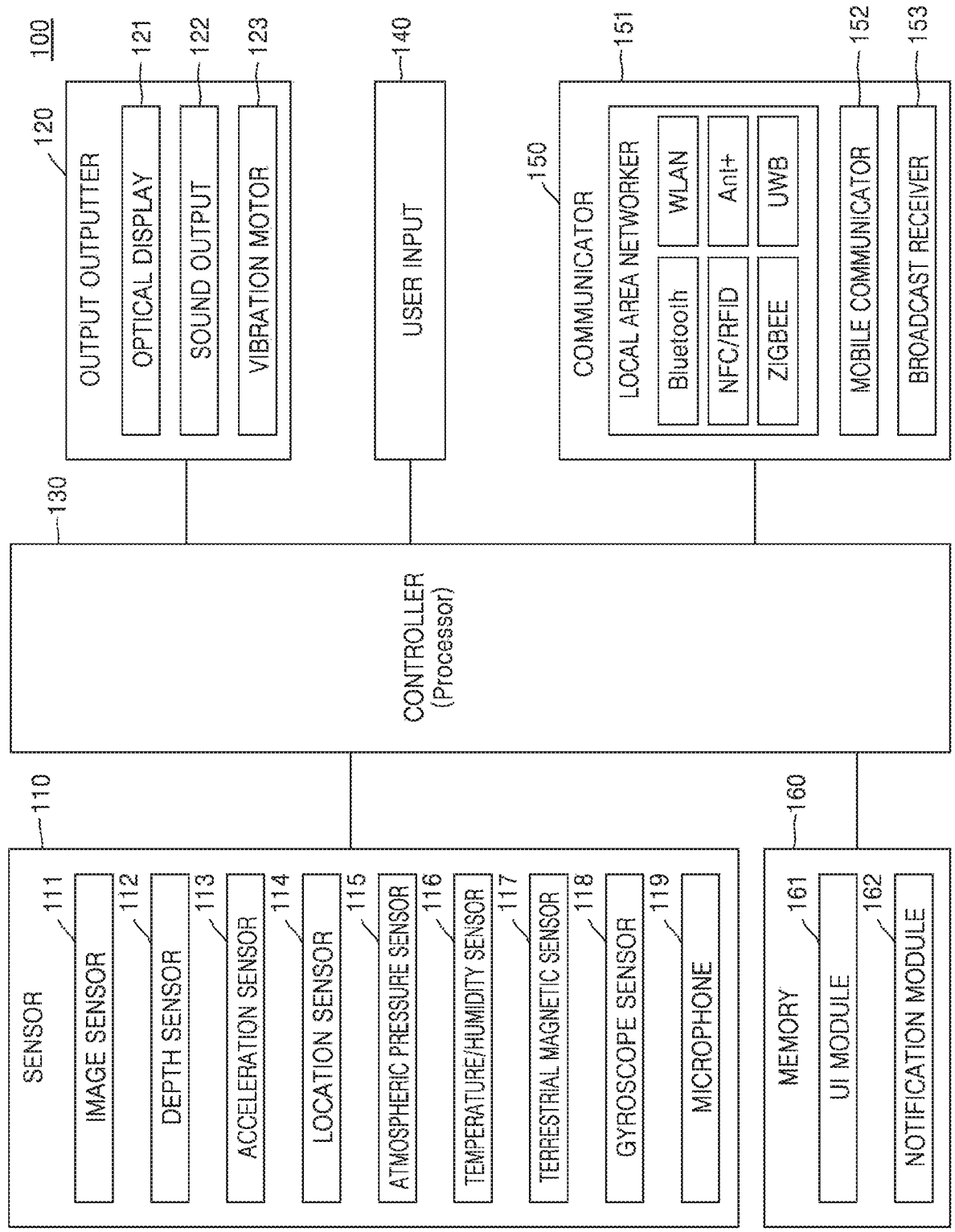

FIGS. 33 and 34 are block diagrams of the wearable device 100 according to exemplary embodiments.

As shown in FIG. 33, the wearable device 100, according to an exemplary embodiment, may include a sensor 110, the optical display 121, and a controller 130. However, components shown in FIG. 33 are not all essential. The wearable device 100 may include more or less components than those shown in FIG. 33.

For example, as shown in FIG. 34, the wearable device 100, according to an exemplary embodiment, may further include a user input 140, a communicator 150, and a memory 160, as well as the sensor 110, an outputter 120, and the controller 130.

The above components will now be described in detail.

The sensor 110 may detect a state of the wearable device 100 or a state around the wearable device 100, and transmit information about the detected state to the controller 130.

The sensor 110 may include the image sensor 111 and the depth sensor 112. The wearable device 100 may obtain an image frame of a still image or a moving image through the image sensor 111. Here, an image captured through the image sensor 111 may be processed by the controller 130 or a separate image processor.

According to an exemplary embodiment, the image sensor 111 may recognize a gesture of setting an input region in the air or on an actual object. For example, the image sensor 111 may recognize a gesture of setting an input region in the air, or on an actual object, by using an input tool.

Alternatively, the image sensor 111 may recognize a pre-set object to be set as an input region, and recognize a gesture of touching the pre-set object by using an input tool. Alternatively, the image sensor 111 may capture a first image including an input region.

According to an exemplary embodiment, the depth sensor 112 may obtain a first depth value of an input region and a second depth value of an input tool touching a virtual input interface. For example, the depth sensor 112 may measure a distance from the wearable device 100 to an input region and a distance from the wearable device 100 to an input tool.

Alternatively, when an input region is set on an actual object, the depth sensor 112 may measure a distance from the wearable device 100 to the actual object, and obtain a first depth value of an input region by using the measured distance.

According to an exemplary embodiment, the sensor 110 may include at least one of an acceleration sensor 113, a location sensor 114, such as a global positioning system (GPS), an atmospheric pressure sensor 115, a temperature/humidity sensor 116, a terrestrial magnetic sensor 117, a gyroscope sensor 118, and a microphone 119, as well as the image sensor 111 and the depth sensor 112.

The microphone 119 receives an external sound signal and processes the external audio signal to electric voice data. For example, the microphone 119 may receive the external sound signal from an external device or a person. The microphone 119 may use any one of various noise removing algorithms to remove noise generated while receiving the external sound signal.

Because functions of the acceleration sensor 113, the location sensor 114, the atmospheric pressure sensor 115, the temperature/humidity sensor 116, the terrestrial magnetic sensor 117, and the gyroscope sensor 118 are intuitively inferable by one of ordinary skill in the art, details thereof are not provided here.

The outputter 120 may output an audio signal, a video signal, or a vibration signal, and include the optical display 121, a sound output 122, and a vibration motor 123.

The optical display 121 may display information processed by the wearable device 100. For example, the optical display 121 may display a user interface (UI) or a graphical user interface (GUI) related to a phone call in a call mode, and display a virtual input interface in an input mode.

According to an exemplary embodiment, the optical display 121 may be a transparent display or an opaque display. The transparent display is an information display apparatus in which a rear surface of a screen displaying information is transparent. The transparent display includes a transparent device, and transparency may be adjusted by adjusting light transmittance of the transparent device or adjusting an RGB value of each pixel.

When the optical display 121 forms a touch screen by forming a layer structure with a touch pad, the optical display 121 may be used as an input device as well as an output device. The touch screen may detect a touch gesture of a user on the touch screen, and transmit information about the touch gesture to the controller 130. Examples of the touch gesture include tap, touch and hold, double tap, drag, panning, flick, drag and drop, and swipe.

The optical display 121 may include at least one of a liquid crystal display, a thin-film transistor-liquid crystal display, an organic light-emitting diode, a flexible display, a 3D display, and an electrophoretic display. Also, the wearable device 100 may include at least two of the optical displays 121 according to a structure of the wearable device 100.

The sound output 122 outputs audio data received from the communicator 150 or stored in the memory 160. Also, the sound output 122 outputs a sound signal related to a function performed by the wearable device 100, such as a call signal reception sound or a message reception sound. The sound output 122 may include a speaker or a buzzer.

According to an exemplary embodiment, when an input is generated through a virtual input interface, the sound output 122 may output an audio signal corresponding to the input.

The vibration motor 123 may output a vibration signal. For example, the vibration motor 123 may output a vibration signal corresponding to an output of audio data or video data, such as a call signal reception sound or a message reception sound. Also, when an input is generated through a virtual input interface, the vibration motor 123 may output a vibration signal.

The controller 130 generally controls overall operations of the wearable device 100. For example, the controller 130 may execute programs stored in the memory 160 to control the sensor 110, the outputter 120, the user input 140, the communicator 150, and the memory 160.

The controller 130 may set an input region based on a gesture recognized by the image sensor 111. For example, when the image sensor 111 recognizes a gesture of drawing a figure in the air or on an actual object, the controller 130 may set a region corresponding to the figure as an input region.

The controller 130 may determine a virtual input interface to be displayed on the optical display 121 based on attributes of an input region.

The controller 130 may determine a type of a virtual input interface based on a first depth value of an input region, and display the virtual input interface on the optical display 121 to overlap the input region.

The controller 130 may determine a type of a virtual input interface based on a type of an actual object where an input region is set, and display the virtual input interface on the optical display 121 to overlap the input region.

The controller 130 may determine a type of a virtual input interface based on a type of a gesture setting an input region or a size of the input region, and display the virtual input interface on the optical display 121 to overlap the input region.

The controller 130 may determine a virtual input interface based on a type of an application being executed by the wearable device 100, and display the virtual input interface on the optical display 121 to overlap an input region.

The controller 130 may display a virtual input interface on a transparent display such that the virtual input interface is displayed on an input region observed through the transparent display.

The controller 130 may generate a second image in which a virtual input interface overlaps an input region included in a first image, and display the second image including the virtual input interface on the optical display 121.

The controller 130 may determine whether an input is generated through a virtual input interface based on a result of comparing a first depth value and a second depth value. For example, the controller 130 may determine that an input is generated through a virtual input interface when a difference between first and second depth values is within a threshold value.

When a second depth value is greater than a first depth value the controller 130 may determine that an input is generated through a virtual input interface.

The controller 130 may control the outputter 120 to output a notification signal corresponding to generation of an input.

A user inputs data via the user input 140 to control the wearable device 100. For example, the user input 140 may be a keypad, a dome switch, a touch pad (contact capacitance type, pressure resistance film type, infrared light detecting type, acoustic surface wave conducting type, integral tension measuring type, or a piezo-effect type), a jog wheel, or a jog switch, but is not limited thereto. According to an exemplary embodiment, the user input 140 may include a virtual input interface.

The communicator 150 may include at least one component enabling the wearable device 100 to communicate with an external device or a server. For example, the communicator 150 may include a local area networker 151, a mobile communicator 152, and a broadcast receiver 153.

The local area networker 151 may be a Bluetooth communicator, a near field communication/radio frequency identification (NFC/RFID) unit, a wireless local area network (WiFi) communicator, a Zigbee communicator, an infrared data association (IrDA) communicator, an ultra wideband (UWB) communicator, or an Ant+ communicator, but is not limited thereto.

For example, the local area networker 151 may receive location information of a second wearable device or a third wearable device.

The mobile communicator 152 transmits and receives a wireless signal to and from at least one of a base station, an external terminal, and a server, on a mobile communication network. Here, the wireless signal may include various types of data according to transmission and reception of a voice call signal, an image call signal, or a text/multimedia message.

The broadcast receiver 153 receives a broadcast signal and/or information related to a broadcast from an external source through a broadcast channel. The broadcast channel may be a satellite channel or a terrestrial wave channel. According to an exemplary embodiment, the wearable device 100 may not include the broadcast receiver 153.

The memory 160 may store a program for processes and control of the controller 130, and may store input/output data, such as gesture information corresponding to an input mode, a virtual input interface, data input through a virtual input interface, sensing information measured by a sensor, and content.

The memory 160 may include at least one of a flash memory, a hard disk, a micro type multimedia card, a card type memory, such as a secure digital (SD) or extreme digital (XD) memory, a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. Also, the wearable device 100 may operate a web storage or a cloud server that performs a storage function of the memory 160 on the Internet.

Programs stored in the memory 160 may be classified into a plurality of modules based on functions, such as a UI module 161 and a notification module 162.

The UI module 161 may provide a specialized UI or GUI interworking with the wearable device 100, according to applications. Also, according to an exemplary embodiment, the UI module 161 may select and provide a virtual input interface based on situations.

The notification module 162 may generate a signal for notifying generation of an event in the wearable device 100. Examples of the event generated in the wearable device 100 may include call signal reception, message reception, an input of a key signal through a virtual input interface, and schedule notification. The notification module 162 may output a notification signal in the form of a video signal through the optical display 121, in the form of an audio signal through the sound output 122, or in the form of a vibration signal through the vibration motor 123. Alternatively, the notification module 162 may output a haptic signal by using an external wearable device, such as a ring, a thimble, a bracelet, or a glove.

The methods described above may be recorded on a computer-readable recording medium by being realized in computer programs to be executed by using various computers. The computer-readable recording medium may include at least one of a program command, a data file, and a data structure. The program commands recorded in the computer-readable recording medium may be specially designed or well known to one of ordinary skill in the computer software field. Examples of the computer-readable recording medium include read-only memory (ROM), random-access memory (RAM), CD-ROMs, magnetic tapes, floppy disks, optical data storage devices, etc. Examples of the computer command include mechanical codes prepared by a compiler, and high-level languages executable by a computer by using an interpreter.

As described above, according to one or more exemplary embodiments, the wearable device 100 may accurately determine whether an input is generated through a virtual input interface by comparing a depth value of an input tool touching the virtual input interface, and a reference depth value defined by a user.

While one or more exemplary embodiments have been described with reference to the figures, it will be understood by those of ordinary skill in the art that various changes in form and details may be made therein without departing from the spirit and scope as defined by the following claims.

What is claimed is:

1. A glass type wearable device comprising:
   an image sensor;
   a display; and
   a processor configured to:
   control the image sensor to capture one or more images to sense a gesture of a user selecting a partial region on a physical object by using an input tool;
   determine the partial region on the physical object as a user input region;
   determine a virtual input interface based on at least one of a size and a shape of the user input region; and
   control the display to provide the determined virtual input interface based on the user input region, wherein the virtual input interface corresponds to the size and the shape of the user input region.

2. The glass type wearable device of claim 1, wherein the virtual input interface is determined based on a type of an application being executed by the glass type wearable device.

3. The glass type wearable device of claim 1, wherein the display comprises a transparent display configured to provide the virtual input interface on a region of the transparent display corresponding to the user input region as observed through the transparent display.

4. The glass type wearable device of claim 1, wherein the image sensor is configured to capture a first image of the user input region, and
   the display is configured to display a second image of the virtual input interface over the user input region of the first image.

5. The glass type wearable device of claim 1, further comprising:
   a depth sensor configured to sense a first depth value corresponding to a distance from the glass type wearable device to the user input region, and a second depth value corresponding to a distance from the glass type wearable device to the input tool,
   wherein the processor is further configured to determine whether an input is generated through the virtual input interface based on the first depth value and the second depth value.

6. The glass type wearable device of claim 5, wherein a displayed size of the virtual input interface is determined based on the first depth value.

7. The glass type wearable device of claim 5, wherein the processor is configured to determine that an input is generated through the virtual input interface when a difference between the first and second depth values is less than a threshold value.

8. The glass type wearable device of claim 5, wherein the processor is configured to determine that an input is generated through the virtual input interface when the second depth value is greater than the first depth value.

9. The glass type wearable device of claim 1, wherein the processor is further configured to:
   compare a distance from the glass type wearable device to the user input region with a threshold value, and
   control the display, based on the distance being less than the threshold value, to provide a first type virtual input interface on the display in the determined user input region, and
   control the display, based on the distance being greater than or equal to the threshold value, to provide a second type virtual input interface on the display in the determined user input region.

10. The glass type wearable device of claim 1, wherein the processor is further configured to determine a type of the input tool and to control the display to provide the virtual input interface based on the user input region, a type of the physical object, and the type of the input tool.

11. A method of providing, by a glass type wearable device, a virtual input interface, the method comprising:
    capturing one or more images to sense a gesture of a user selecting a partial region on a physical object by using an input tool;
    determining the partial region on the physical object as a user input region;
    determining the virtual input interface based on at least one of a size and a shape of the user input region; and
    providing the determined virtual input interface based on the user input region, wherein the virtual input interface corresponds to the size and the shape of the user input region.

12. The method of claim 11, wherein the virtual input interface is determined based on a type of an application being executed by the glass type wearable device.

13. The method of claim 11, wherein the providing of the virtual input interface comprises:
    capturing a first image of the user input region by using an image sensor;
    generating a second image of the virtual input interface; and
    displaying the second image over the user input region of the first image.

14. The method of claim 11, further comprising:
    obtaining a first depth value corresponding to a distance from the glass type wearable device to the user input region, and a second depth value corresponding to a distance from the glass type wearable device to the input tool; and
    determining whether an input is generated through the virtual input interface based on the first depth value and the second depth value.

15. The method of claim 14, wherein a displayed size of the virtual input interface is determined based on a size of the first depth value.

16. The method of claim 14, wherein the determining of whether the input is generated comprises determining that a difference between the first and second depth values is less than a threshold value.

17. The method of claim 14, wherein the determining of whether the input is generated comprises determining that the second depth value is greater than the first depth value.

18. The method of claim 11, further comprising:
comparing a distance from the glass type wearable device to the user input region with a threshold value;
based on the distance being less than the threshold value, providing a first type virtual input interface in the user input region; and
based on the distance being greater than or equal to the threshold value, providing a second type virtual input interface in the user input region.

19. The method of claim 11, further comprising:
determining a type of the input tool; and
providing the virtual input interface based on the user input region, a type of the physical object, and the type of the input tool.

20. A computer program product comprising a computer readable storage medium having a computer readable program stored therein, wherein the computer readable program, when executed on a computing device of a glass type wearable device, causes the computing device to:
capture one or more images to sense a gesture of a user selecting a partial region on a physical object by using an input tool;
determine the partial region on the physical object as a user input region;
determine a virtual input interface based on at least one of a size and a shape of the user input region; and
provide the determined virtual input interface, wherein the virtual input interface corresponds to the size and the shape of the user input region.

* * * * *